US010207772B2

(12) United States Patent
Johnson et al.

(10) Patent No.: US 10,207,772 B2
(45) Date of Patent: Feb. 19, 2019

(54) GEAR TRANSMISSION AND DERAILLEUR SYSTEM

(71) Applicant: Paha Designs, LLC, Denver, CO (US)

(72) Inventors: Lee Johnson, Absarokee, MT (US); Benjamin Meager, Bozeman, MT (US)

(73) Assignee: PAHA DESIGNS, LLC, Felt, ID (US)

( * ) Notice: Subject to any disclaimer, the term of this patent is extended or adjusted under 35 U.S.C. 154(b) by 0 days.

(21) Appl. No.: 15/144,308

(22) Filed: May 2, 2016

(65) Prior Publication Data

US 2016/0318582 A1    Nov. 3, 2016

Related U.S. Application Data

(63) Continuation-in-part of application No. 14/058,983, filed on Oct. 21, 2013, now Pat. No. 9,327,792, which is a continuation-in-part of application No. 13/622,725, filed on Sep. 19, 2012, now Pat. No. 9,033,833, which is a continuation-in-part of (Continued)

(51) Int. Cl.

| *F16H 9/00* | (2006.01) |
|---|---|
| *F16H 59/00* | (2006.01) |
| *F16H 61/00* | (2006.01) |
| *F16H 63/00* | (2006.01) |
| *B62M 25/04* | (2006.01) |
| *B62M 9/121* | (2010.01) |
| *B62M 9/124* | (2010.01) |
| *B62M 9/1242* | (2010.01) |

(Continued)

(52) U.S. Cl.
CPC ............. *B62M 25/04* (2013.01); *B62K 23/04* (2013.01); *B62K 23/06* (2013.01); *B62M 9/121* (2013.01); *B62M 9/124* (2013.01); *B62M 9/1242* (2013.01); *B62M 2009/12413* (2013.01)

(58) Field of Classification Search
CPC .................. B62K 23/04; B62K 23/06; B62M 2009/12413; B62M 25/04; B62M 9/121
USPC ...................................... 474/80, 82
See application file for complete search history.

(56) References Cited

U.S. PATENT DOCUMENTS

| 493,832 A | 3/1893 | Martin |
|---|---|---|
| 493,873 A | 3/1893 | McFarlane |

(Continued)

FOREIGN PATENT DOCUMENTS

| CN | 1305917 | 8/2001 |
|---|---|---|
| CN | 1950249 | 4/2007 |

(Continued)

OTHER PUBLICATIONS

International Search Report and Written Opinion for International Patent Application No. PCT/US2012/022932, dated May 8, 2012, 11 pages.

(Continued)

*Primary Examiner* — Henry Y Liu
(74) *Attorney, Agent, or Firm* — Sheridan Ross P.C.

(57) ABSTRACT

A transmission system for vehicles, including bicycles, is disclosed. The system aligns a chain or other drive means to a center of each of a plurality of provided sprockets, allows for a smaller, lighter and more durable shifter/controller, and reduces various complications associated with cable slack and shifting. A derailleur is provided with linear actuated features to directly translate drive means from one position to another along a desired path.

19 Claims, 52 Drawing Sheets

Related U.S. Application Data application No. 13/360,164, filed on Jan. 27, 2012, now abandoned.

(60) Provisional application No. 61/484,037, filed on May 9, 2011, provisional application No. 61/437,565, filed on Jan. 28, 2011.

(51) Int. Cl.
*B62K 23/04* (2006.01)
*B62K 23/06* (2006.01)

(56) References Cited

U.S. PATENT DOCUMENTS

| | | | |
|---|---|---|---|
| 513,544 A | 1/1894 | Wallace | |
| 3,394,604 A * | 7/1968 | Kimura | B62M 9/1242 474/82 |
| 3,728,912 A | 4/1973 | Darnell | |
| 3,774,732 A | 11/1973 | Basek | |
| 3,830,521 A | 8/1974 | Gardel et al. | |
| 3,837,234 A | 9/1974 | Chao | |
| 3,850,044 A | 11/1974 | Hagen | |
| 3,899,932 A | 8/1975 | Durham | |
| 3,972,244 A | 8/1976 | Bieser et al. | |
| 3,973,447 A | 8/1976 | Nagano | |
| 3,974,707 A | 8/1976 | Nagano | |
| 3,979,962 A | 9/1976 | Kebsch | |
| 3,994,180 A | 11/1976 | Ackerman | |
| 4,002,080 A | 1/1977 | Huret et al. | |
| 4,027,542 A | 6/1977 | Nagano | |
| 4,030,374 A | 6/1977 | Isobe | |
| 4,030,375 A * | 6/1977 | Nagano | B62M 9/1246 474/82 |
| 4,041,788 A * | 8/1977 | Nininger, Jr. | B62M 9/122 474/110 |
| 4,106,356 A * | 8/1978 | Nagano | B62M 9/1244 474/82 |
| 4,124,107 A | 11/1978 | Kine | |
| 4,132,119 A * | 1/1979 | Nagano | B62M 9/1244 280/236 |
| 4,183,255 A | 1/1980 | Leiter | |
| 4,193,324 A | 3/1980 | Marc | |
| 4,194,408 A | 3/1980 | Hedrich | |
| 4,198,873 A * | 4/1980 | Nagano | B62M 9/1244 474/82 |
| 4,198,874 A | 4/1980 | Nagano et al. | |
| 4,199,997 A | 4/1980 | Isobe | |
| 4,199,998 A | 4/1980 | Isobe | |
| 4,201,094 A | 5/1980 | Rathmell | |
| 4,223,562 A | 9/1980 | Nagano et al. | |
| 4,226,130 A | 10/1980 | Isobe | |
| 4,226,131 A | 10/1980 | Yamasaki | |
| 4,226,132 A | 10/1980 | Nagano et al. | |
| 4,229,987 A * | 10/1980 | Fujimoto | B62M 9/1244 280/236 |
| 4,235,118 A | 11/1980 | Huret | |
| 4,237,743 A | 12/1980 | Nagano | |
| 4,241,617 A | 12/1980 | Nagano et al. | |
| 4,245,521 A | 1/1981 | Osborn | |
| RE30,524 E | 2/1981 | Nagano | |
| 4,259,873 A | 4/1981 | Nagano et al. | |
| 4,269,601 A | 5/1981 | Nagano | |
| 4,273,546 A | 6/1981 | Bergles | |
| 4,279,172 A | 7/1981 | Nagano et al. | |
| 4,279,174 A | 7/1981 | Ross | |
| 4,279,605 A | 7/1981 | Egami | |
| 4,283,969 A | 8/1981 | Lapeyre | |
| 4,305,312 A | 12/1981 | Lapeyre | |
| 4,305,712 A | 12/1981 | Nagano | |
| D264,069 S | 4/1982 | Ozaki | |
| 4,330,137 A | 5/1982 | Nagano | |
| D265,817 S | 8/1982 | Hahn | |
| 4,348,198 A | 9/1982 | Shimano | |
| 4,352,503 A | 10/1982 | Cotter | |
| 4,355,706 A | 10/1982 | Pan | |
| 4,362,523 A | 12/1982 | Huret | |
| 4,384,864 A * | 5/1983 | Bonnard | B62M 9/1242 474/80 |
| 4,384,865 A | 5/1983 | Ueno | |
| D269,864 S | 7/1983 | Watanabe | |
| 4,403,977 A | 9/1983 | Bergles | |
| 4,403,978 A | 9/1983 | Huret | |
| 4,406,643 A | 9/1983 | Shimano | |
| 4,410,313 A | 10/1983 | Shimano | |
| 4,416,646 A | 11/1983 | Bergles | |
| 4,424,048 A | 1/1984 | Shimano | |
| 4,425,824 A | 1/1984 | Koch | |
| 4,437,848 A | 3/1984 | Shimano | |
| 4,439,171 A | 3/1984 | Bergles | |
| 4,460,347 A | 7/1984 | Bergles | |
| 4,469,479 A | 9/1984 | Ozaki | |
| 4,486,182 A | 12/1984 | Coue | |
| RE31,796 E | 1/1985 | Nagano et al. | |
| 4,493,678 A | 1/1985 | Husted | |
| RE31,854 E | 3/1985 | Egami | |
| 4,507,101 A * | 3/1985 | Nagano | B62M 9/1244 474/128 |
| 4,515,033 A | 5/1985 | Carlo | |
| 4,519,791 A | 5/1985 | Nagano | |
| 4,530,677 A | 7/1985 | Nagano | |
| 4,551,121 A | 11/1985 | Nagano | |
| 4,566,349 A | 1/1986 | Van der Loon et al. | |
| 4,573,949 A | 3/1986 | Nagano | |
| 4,573,951 A | 3/1986 | Nagano | |
| 4,575,365 A | 3/1986 | Nagano | |
| D283,415 S | 4/1986 | Ishikawa | |
| 4,586,913 A | 5/1986 | Nagano | |
| 4,601,682 A | 7/1986 | Nagano | |
| 4,610,644 A | 9/1986 | Nagano | |
| 4,612,004 A | 9/1986 | Nagano | |
| 4,617,006 A | 10/1986 | Nagano | |
| 4,618,332 A | 10/1986 | Nagano | |
| 4,618,333 A | 10/1986 | Nagano | |
| 4,619,632 A | 10/1986 | Nagano | |
| 4,619,633 A | 10/1986 | Nagano | |
| 4,626,229 A | 12/1986 | Nagano | |
| 4,637,808 A | 1/1987 | Nakamura | |
| 4,637,809 A | 1/1987 | Nagano | |
| 4,642,072 A | 2/1987 | Nagano | |
| 4,644,828 A | 2/1987 | Kozakae | |
| 4,674,995 A | 6/1987 | Iwasaki | |
| D290,831 S | 7/1987 | Juy | |
| 4,684,281 A | 8/1987 | Patterson | |
| 4,690,663 A | 9/1987 | Nagano | |
| 4,692,131 A | 9/1987 | Nagano | |
| 4,693,700 A | 9/1987 | Chappell | |
| D292,503 S | 10/1987 | Juy | |
| 4,701,152 A * | 10/1987 | Dutil | B62M 9/123 280/236 |
| 4,713,042 A * | 12/1987 | Imhoff | B62M 9/14 474/69 |
| 4,731,045 A | 3/1988 | Nagano | |
| 4,734,083 A | 3/1988 | Nagano | |
| 4,734,084 A | 3/1988 | Nagano | |
| 4,744,784 A | 5/1988 | Nagano | |
| 4,755,162 A | 7/1988 | Nagano | |
| 4,756,205 A | 7/1988 | Dickinson | |
| 4,756,704 A | 7/1988 | Nagano | |
| 4,773,662 A | 9/1988 | Phillips | |
| 4,778,436 A | 10/1988 | Nagano | |
| 4,810,235 A | 3/1989 | Husted et al. | |
| 4,824,420 A * | 4/1989 | Romano | B62M 9/124 474/78 |
| RE32,924 E | 5/1989 | Nagano | |
| 4,832,662 A | 5/1989 | Nagano | |
| 4,836,046 A | 6/1989 | Chappel | |
| 4,838,837 A | 6/1989 | Testa | |
| 4,840,605 A * | 6/1989 | Testa | B62M 9/124 474/80 |
| 4,842,568 A | 6/1989 | Marchigiano | |
| 4,861,320 A * | 8/1989 | Nagano | B62M 9/127 474/80 |
| 4,878,884 A | 11/1989 | Romano | |

(56) References Cited

U.S. PATENT DOCUMENTS

| | | | | |
|---|---|---|---|---|
| 4,887,990 A | * | 12/1989 | Bonnard | B62K 23/06 474/78 |
| 4,889,521 A | | 12/1989 | Nagano | |
| 4,891,036 A | | 1/1990 | Stammetti | |
| 4,894,046 A | | 1/1990 | Browning | |
| 4,895,553 A | | 1/1990 | Nagano | |
| 4,898,047 A | | 2/1990 | Cropek | |
| 4,900,291 A | | 2/1990 | Patterson | |
| D307,735 S | | 5/1990 | Chappell | |
| 4,938,324 A | | 7/1990 | Van Dyke | |
| 4,946,425 A | * | 8/1990 | Buhlmann | B62M 9/122 192/142 R |
| 4,954,121 A | | 9/1990 | Juy | |
| 4,955,849 A | | 9/1990 | Nagano | |
| 4,960,402 A | | 10/1990 | Klein et al. | |
| 4,961,720 A | | 10/1990 | Juy | |
| 5,002,520 A | | 3/1991 | Greenlaw | |
| 5,020,819 A | | 6/1991 | D'Aluisio et al. | |
| 5,033,991 A | * | 7/1991 | McLaren | B62M 9/123 474/78 |
| D318,836 S | | 8/1991 | Hsu | |
| 5,037,355 A | | 8/1991 | Kobayashi | |
| 5,052,241 A | * | 10/1991 | Nagano | B62K 23/06 74/473.13 |
| 5,059,158 A | * | 10/1991 | Bellio | B62M 9/12 474/103 |
| 5,073,151 A | | 12/1991 | Nagano | |
| 5,073,152 A | | 12/1991 | Browning | |
| 5,078,653 A | | 1/1992 | Nagano | |
| 5,085,621 A | | 2/1992 | Nagano | |
| 5,087,226 A | | 2/1992 | Nagano | |
| 5,094,120 A | * | 3/1992 | Tagawa | B62M 25/04 74/141.5 |
| 5,102,372 A | | 4/1992 | Patterson et al. | |
| 5,104,358 A | | 4/1992 | Kobayashi | |
| 5,127,884 A | | 7/1992 | Seymour | |
| 5,135,441 A | * | 8/1992 | Gelbien | B62M 25/04 474/78 |
| 5,136,892 A | | 8/1992 | Ochs | |
| 5,140,736 A | | 8/1992 | Hsiao | |
| 5,152,720 A | | 10/1992 | Browning et al. | |
| 5,162,022 A | | 11/1992 | Kobayashi | |
| 5,163,881 A | * | 11/1992 | Chattin | B62M 9/123 474/78 |
| 5,171,187 A | | 12/1992 | Nagano | |
| 5,188,569 A | | 2/1993 | Kobayashi | |
| 5,192,248 A | | 3/1993 | Nagano | |
| 5,192,249 A | | 3/1993 | Nagano | |
| 5,192,250 A | | 3/1993 | Kobayashi | |
| 5,197,927 A | * | 3/1993 | Patterson | B62K 23/04 474/80 |
| 5,205,794 A | | 4/1993 | Browning | |
| 5,213,549 A | | 5/1993 | Blanchard | |
| D339,770 S | | 9/1993 | Noami | |
| 5,246,405 A | | 9/1993 | Nagano | |
| 5,287,743 A | | 2/1994 | Doolittle et al. | |
| 5,295,916 A | * | 3/1994 | Chattin | B62M 9/123 474/78 |
| 5,302,155 A | | 4/1994 | Ishibashi | |
| 5,312,301 A | | 5/1994 | Kobayashi | |
| 5,314,366 A | | 5/1994 | Palm | |
| 5,316,327 A | | 5/1994 | Bell | |
| 5,346,434 A | | 9/1994 | Hsu | |
| 5,354,243 A | | 10/1994 | Kriek | |
| 5,356,348 A | * | 10/1994 | Bellio | B62M 9/12 280/238 |
| 5,356,349 A | | 10/1994 | Browning | |
| 5,358,451 A | * | 10/1994 | Lacombe | B62M 9/122 474/78 |
| 5,380,253 A | | 1/1995 | Iwasaki | |
| 5,389,043 A | | 2/1995 | Hsu | |
| 5,397,273 A | | 3/1995 | Ando | |
| 5,397,275 A | | 3/1995 | McJunkin, Jr. | |
| 5,407,396 A | | 4/1995 | Gilbert | |
| 5,413,534 A | | 5/1995 | Nagano | |
| 5,421,219 A | | 6/1995 | Tagawa et al. | |
| 5,425,678 A | | 6/1995 | Richardson | |
| 5,426,997 A | | 6/1995 | Brion | |
| 5,438,889 A | | 8/1995 | Tagawa | |
| 5,458,543 A | | 10/1995 | Kobayashi | |
| 5,460,396 A | | 10/1995 | Sutter et al. | |
| 5,464,373 A | | 11/1995 | Leng | |
| 5,470,277 A | * | 11/1995 | Romano | B62M 9/122 474/110 |
| 5,474,318 A | | 12/1995 | Castellano | |
| 5,480,356 A | * | 1/1996 | Campagnolo | B62M 9/122 280/238 |
| 5,481,934 A | | 1/1996 | Tagawa | |
| 5,494,307 A | * | 2/1996 | Anderson | B62M 9/122 280/236 |
| 5,496,222 A | | 3/1996 | Kojima et al. | |
| 5,498,211 A | | 3/1996 | Hsu | |
| 5,514,041 A | | 5/1996 | Hsu | |
| 5,518,456 A | * | 5/1996 | Kojima | B62M 9/1242 474/77 |
| 5,522,611 A | | 6/1996 | Schmidt et al. | |
| 5,524,501 A | * | 6/1996 | Patterson | B62K 21/26 74/473.25 |
| 5,533,937 A | | 7/1996 | Patterson et al. | |
| 5,538,477 A | * | 7/1996 | Bellio | B62M 9/12 474/103 |
| 5,553,960 A | | 9/1996 | Turer et al. | |
| 5,564,310 A | | 10/1996 | Kishimoto | |
| 5,564,316 A | | 10/1996 | Larson et al. | |
| 5,571,056 A | | 11/1996 | Gilbert | |
| 5,584,213 A | | 12/1996 | Larson et al. | |
| 5,588,331 A | | 12/1996 | Huang et al. | |
| 5,588,925 A | * | 12/1996 | Arbeiter | B62K 23/04 474/128 |
| 5,590,564 A | | 1/1997 | Kishimoto | |
| 5,597,366 A | | 1/1997 | Ozaki | |
| 5,599,244 A | | 2/1997 | Ethington | |
| 5,607,367 A | * | 3/1997 | Patterson | B62M 9/134 474/80 |
| 5,609,064 A | | 3/1997 | Abe | |
| 5,617,761 A | | 4/1997 | Kawakami | |
| 5,618,241 A | * | 4/1997 | Ose | B62K 23/06 474/127 |
| 5,620,383 A | | 4/1997 | Patterson et al. | |
| 5,620,384 A | | 4/1997 | Kojima et al. | |
| 5,624,334 A | | 4/1997 | Lumpkin | |
| 5,624,335 A | | 4/1997 | Ando | |
| 5,630,338 A | | 5/1997 | Patterson et al. | |
| 5,649,877 A | * | 7/1997 | Patterson | B62M 9/134 474/80 |
| 5,666,859 A | * | 9/1997 | Arbeiter | B62K 23/04 74/489 |
| 5,667,449 A | | 9/1997 | Dalton | |
| 5,669,840 A | | 9/1997 | Liao | |
| 5,672,133 A | | 9/1997 | Eden | |
| D384,926 S | | 10/1997 | Wallace | |
| 5,681,234 A | | 10/1997 | Ethington | |
| 5,685,198 A | | 11/1997 | Hawkins | |
| 5,688,200 A | * | 11/1997 | White | B62M 9/124 474/119 |
| 5,701,786 A | | 12/1997 | Kawakami | |
| D389,391 S | | 1/1998 | Duston | |
| D391,824 S | | 3/1998 | Larson | |
| D391,825 S | | 3/1998 | Larson | |
| 5,728,018 A | | 3/1998 | Terada et al. | |
| 5,732,598 A | | 3/1998 | Shoge et al. | |
| 5,733,215 A | | 3/1998 | Hsu et al. | |
| 5,738,603 A | | 4/1998 | Schmidt et al. | |
| 5,771,754 A | | 6/1998 | Smeeth | |
| D396,205 S | | 7/1998 | Kojima | |
| D396,396 S | | 7/1998 | Larson | |
| 5,779,580 A | | 7/1998 | White et al. | |
| 5,779,581 A | | 7/1998 | Fujii | |
| 5,787,757 A | | 8/1998 | Ozaki | |
| 5,791,195 A | | 8/1998 | Campagnolo | |
| 5,797,296 A | | 8/1998 | Ozaki | |
| 5,799,541 A | | 9/1998 | Arbeiter | |

(56) References Cited

U.S. PATENT DOCUMENTS

| | | |
|---|---|---|
| 5,799,542 A | 9/1998 | Yamane |
| 5,806,372 A | 9/1998 | Campagnolo |
| 5,816,968 A | 10/1998 | Watson |
| 5,823,058 A | 10/1998 | Arbeiter |
| 5,836,844 A | 11/1998 | Yoshida |
| 5,845,537 A | 12/1998 | Campagnolo |
| 5,846,148 A | 12/1998 | Fujii |
| 5,857,387 A | 1/1999 | Larson et al. |
| 5,860,326 A | 1/1999 | Lussier |
| D406,041 S | 2/1999 | Hsu |
| 5,865,062 A * | 2/1999 | Lahat ............... B62M 25/045 474/81 |
| 5,865,698 A | 2/1999 | Huang et al. |
| 5,881,602 A | 3/1999 | Cirami |
| 5,919,106 A | 7/1999 | Ichida |
| 5,921,139 A | 7/1999 | Yamane |
| 5,921,140 A * | 7/1999 | Lemmens ............. B62K 23/04 474/128 |
| 5,921,363 A | 7/1999 | Chiang et al. |
| 5,924,946 A | 7/1999 | Calendrille, Jr. |
| 5,935,033 A | 8/1999 | Tseng et al. |
| 5,961,409 A | 10/1999 | Ando |
| 5,964,123 A | 10/1999 | Arbeiter |
| 5,971,878 A | 10/1999 | Leng |
| 6,012,999 A * | 1/2000 | Patterson ............. B62M 9/122 474/104 |
| 6,023,646 A * | 2/2000 | Kubacsi ................ B62J 99/00 340/432 |
| 6,029,990 A | 2/2000 | Busby |
| 6,042,132 A | 3/2000 | Suenaga et al. |
| 6,042,133 A | 3/2000 | Leiter et al. |
| 6,042,495 A | 3/2000 | Patterson et al. |
| D424,984 S | 5/2000 | Hanamura |
| 6,055,882 A | 5/2000 | Arbeiter et al. |
| 6,067,875 A | 5/2000 | Ritchey et al. |
| 6,093,122 A | 7/2000 | McLaughlin et al. |
| RE36,830 E | 8/2000 | Lumpkin |
| 6,099,425 A | 8/2000 | Kondo |
| 6,102,821 A | 8/2000 | Nakamura |
| D432,056 S | 10/2000 | Hanamura |
| 6,135,904 A | 10/2000 | Guthrie |
| 6,139,456 A | 10/2000 | Lii et al. |
| 6,146,297 A | 11/2000 | Kimura |
| 6,149,541 A | 12/2000 | Campbell |
| 6,158,294 A * | 12/2000 | Jung ..................... B62M 9/123 474/70 |
| 6,159,118 A | 12/2000 | Campbell |
| 6,190,275 B1 | 2/2001 | Ciancio et al. |
| 6,199,447 B1 | 3/2001 | Lump et al. |
| 6,209,413 B1 | 4/2001 | Chang |
| 6,213,905 B1 | 4/2001 | White et al. |
| 6,216,553 B1 | 4/2001 | Wessel et al. |
| 6,234,927 B1 | 5/2001 | Peng |
| 6,264,576 B1 | 7/2001 | Lien |
| D447,986 S | 9/2001 | Hsu |
| 6,287,228 B1 | 9/2001 | Ichida |
| 6,290,621 B1 | 9/2001 | Ichida |
| 6,293,883 B1 | 9/2001 | Ichida |
| 6,325,733 B1 * | 12/2001 | Patterson ............. B62M 9/122 280/216 |
| 6,340,338 B1 | 1/2002 | Kamada |
| 6,343,524 B1 | 2/2002 | Lien |
| 6,350,212 B1 | 2/2002 | Campagnolo |
| D454,102 S | 3/2002 | Iteya |
| D454,103 S | 3/2002 | Iteya |
| 6,352,486 B1 * | 3/2002 | Wesling ............... B62M 9/122 474/70 |
| 6,354,971 B1 | 3/2002 | Howell et al. |
| 6,354,973 B1 | 3/2002 | Barnett |
| 6,368,243 B1 | 4/2002 | Liu |
| 6,383,111 B1 | 5/2002 | Liu |
| 6,406,048 B1 | 6/2002 | Castellano |
| 6,447,413 B1 | 9/2002 | Turer et al. |
| 6,453,764 B1 | 9/2002 | Ose |
| 6,454,671 B1 * | 9/2002 | Wickliffe ............. B62M 9/1342 474/80 |
| 6,460,673 B2 | 10/2002 | Hsu |
| 6,467,368 B1 | 10/2002 | Feng et al. |
| 6,471,610 B1 | 10/2002 | Tseng et al. |
| 6,484,603 B2 | 11/2002 | Wessel et al. |
| 6,494,112 B2 | 12/2002 | Chen |
| 6,510,757 B1 | 1/2003 | Wessel |
| 6,513,405 B1 | 2/2003 | Sturmer et al. |
| 6,533,690 B2 | 3/2003 | Barnett |
| 6,537,173 B2 | 3/2003 | Mercat et al. |
| 6,553,861 B2 | 4/2003 | Ose |
| 6,557,679 B1 | 5/2003 | Warner et al. |
| 6,557,684 B1 | 5/2003 | Jager et al. |
| 6,565,466 B2 | 5/2003 | Liu et al. |
| 6,572,500 B2 | 6/2003 | Tetsuka |
| 6,629,903 B1 | 10/2003 | Kondo |
| 6,631,655 B2 | 10/2003 | Blaschke et al. |
| 6,638,190 B2 | 10/2003 | Patterson et al. |
| 6,644,143 B2 | 11/2003 | Feng et al. |
| 6,666,786 B2 | 12/2003 | Yahata |
| 6,692,389 B2 | 2/2004 | Yin |
| 6,694,840 B2 | 2/2004 | Kawakami |
| 6,695,729 B2 | 2/2004 | Ozaki |
| 6,698,307 B2 | 3/2004 | Westing et al. |
| 6,718,844 B2 | 4/2004 | Hanatani |
| 6,726,586 B2 | 4/2004 | Fukuda |
| 6,726,587 B2 | 4/2004 | Kawakami |
| 6,729,203 B2 | 5/2004 | Wesling et al. |
| 6,755,431 B2 | 6/2004 | Chang |
| 6,761,657 B2 | 7/2004 | Young |
| 6,767,308 B2 | 7/2004 | Kitamura |
| 6,792,825 B2 | 9/2004 | Kawakami |
| 6,829,963 B2 | 12/2004 | Liao |
| 6,837,815 B2 | 1/2005 | Meggiolan |
| 6,843,149 B2 | 1/2005 | Gavillucci |
| 6,848,335 B1 | 2/2005 | Kawakami |
| 6,868,752 B2 * | 3/2005 | Tetsuka ................ B62M 25/02 474/80 |
| 6,877,393 B2 | 4/2005 | Takachi |
| 6,899,649 B2 * | 5/2005 | Ichida ................. B62M 25/02 474/70 |
| 6,902,503 B2 | 6/2005 | Nanko |
| 6,923,740 B2 | 8/2005 | Nanko |
| 6,923,741 B2 | 8/2005 | Wei |
| 6,949,040 B2 | 9/2005 | Ando |
| 6,959,939 B2 | 11/2005 | Fujii et al. |
| 6,962,544 B2 | 11/2005 | Nanko |
| 6,979,009 B2 | 12/2005 | Ichida et al. |
| 6,986,723 B2 | 1/2006 | Valle |
| 6,993,995 B2 | 2/2006 | Fujii |
| 6,997,835 B2 * | 2/2006 | Fukuda ................ B62M 9/122 474/80 |
| 7,004,867 B2 | 2/2006 | Wei |
| 7,011,592 B2 | 3/2006 | Shahana et al. |
| 7,013,751 B2 | 3/2006 | Hilsky et al. |
| 7,025,698 B2 * | 4/2006 | Wickliffe ............. B62M 9/134 474/80 |
| 7,044,874 B2 | 5/2006 | Shahana et al. |
| 7,048,660 B2 | 5/2006 | Shahana |
| 7,051,829 B2 | 5/2006 | Wahl |
| 7,059,618 B2 | 6/2006 | Mallard |
| 7,059,983 B2 | 6/2006 | Heim |
| 7,066,857 B2 | 6/2006 | DeRosa |
| 7,081,058 B2 | 7/2006 | Nankou |
| 7,090,602 B2 * | 8/2006 | Tetsuka ................ B62M 25/02 474/78 |
| 7,104,154 B2 | 9/2006 | Hilsky et al. |
| 7,104,908 B2 | 9/2006 | Nagano |
| 7,119,668 B2 * | 10/2006 | Kitamura ............... B62J 6/001 340/432 |
| 7,125,354 B2 | 10/2006 | Shahana |
| 7,125,356 B2 | 10/2006 | Todd |
| D531,944 S | 11/2006 | Okada |
| D533,124 S | 12/2006 | Hanamura |
| D534,102 S | 12/2006 | Arakawa |
| D534,103 S | 12/2006 | Arakawa |
| 7,150,205 B2 | 12/2006 | Takachi |
| 7,153,229 B2 | 12/2006 | Matsumoto et al. |

(56)  References Cited

U.S. PATENT DOCUMENTS

| | | | |
|---|---|---|---|
| D534,460 S | 1/2007 | Hanamura |
| 7,156,764 B2 | 1/2007 | Mercat et al. |
| 7,166,048 B2 | 1/2007 | Shahana et al. |
| D536,282 S | 2/2007 | Masui |
| 7,186,194 B2 | 3/2007 | Nankou |
| 7,189,172 B2 | 3/2007 | Shahana et al. |
| 7,189,173 B2 | 3/2007 | Tsai et al. |
| 7,228,756 B2 | 6/2007 | Tsumiyama |
| D546,741 S | 7/2007 | Iteya et al. |
| 7,244,203 B2 | 7/2007 | Sze et al. |
| D548,655 S | 8/2007 | Barrow et al. |
| 7,258,637 B2 | 8/2007 | Thomasberg |
| D551,131 S | 9/2007 | Arakawa |
| 7,267,220 B2 | 9/2007 | Wang |
| 7,285,064 B2 | 10/2007 | Ichida et al. |
| D555,050 S | 11/2007 | Hanarnura |
| 7,294,076 B2 | 11/2007 | Matsumoto et al. |
| 7,302,874 B2 | 12/2007 | Chen |
| 7,305,903 B2 | 12/2007 | Kawakami |
| 7,306,531 B2 | 12/2007 | Ichida et al. |
| 7,318,784 B2 | 1/2008 | Onogi et al. |
| 7,320,655 B2 | 1/2008 | Fukuda |
| D561,075 S | 2/2008 | Arakawa |
| D561,076 S | 2/2008 | Arakawa |
| 7,326,137 B2 | 2/2008 | van der Linde |
| D563,295 S | 3/2008 | Mabuchi |
| 7,338,059 B2 | 3/2008 | Sugimoto |
| 7,341,532 B2 * | 3/2008 | Ichida | B62M 9/132 474/70 |
| 7,347,439 B2 | 3/2008 | Young et al. |
| 7,354,362 B2 | 4/2008 | Dal Pra' |
| 7,361,110 B2 | 4/2008 | Oishi et al. |
| 7,363,873 B2 | 4/2008 | Iteya et al. |
| 7,373,854 B2 | 5/2008 | Chen |
| 7,381,142 B2 * | 6/2008 | Campagnolo | B62M 9/122 474/70 |
| 7,396,304 B2 | 7/2008 | Shahana |
| 7,401,535 B2 | 7/2008 | Blaschke |
| 7,434,489 B1 | 10/2008 | Scranton |
| 7,437,969 B2 | 10/2008 | Ose |
| 7,438,657 B2 | 10/2008 | Nakai et al. |
| 7,438,658 B2 | 10/2008 | Tetsuka et al. |
| 7,442,136 B2 | 10/2008 | Ichida et al. |
| D579,833 S | 11/2008 | Acenbrak |
| D580,304 S | 11/2008 | Okada |
| D581,321 S | 11/2008 | Pang |
| D582,322 S | 12/2008 | Nguan |
| 7,462,120 B1 | 12/2008 | Thompson |
| 7,484,609 B2 | 2/2009 | Chen |
| 7,497,793 B2 | 3/2009 | Hee |
| 7,503,420 B2 | 3/2009 | Fujii |
| 7,503,863 B2 | 3/2009 | Ichida et al. |
| 7,503,864 B2 | 3/2009 | Nonoshita et al. |
| 7,526,979 B2 | 5/2009 | Tsumiyama |
| 7,527,571 B2 | 5/2009 | Shahana |
| 7,547,021 B2 | 6/2009 | Bon |
| 7,552,935 B2 | 6/2009 | McAndrews |
| 7,563,186 B2 * | 7/2009 | Mercat | B62M 9/12 474/70 |
| 7,565,848 B2 | 7/2009 | Fujii |
| 7,585,240 B2 | 9/2009 | Kameda |
| 7,614,972 B2 | 11/2009 | Oseto |
| 7,628,095 B2 | 12/2009 | Funai |
| 7,650,814 B2 | 1/2010 | Watarai |
| 7,651,424 B2 | 1/2010 | Yamamoto et al. |
| 7,654,925 B2 | 2/2010 | Todd |
| 7,665,382 B2 | 2/2010 | Kawakami |
| 7,665,383 B2 | 2/2010 | Kawakami |
| 7,665,384 B2 | 2/2010 | Sato et al. |
| 7,666,111 B2 | 2/2010 | Shahana et al. |
| 7,674,198 B2 | 3/2010 | Yamaguchi |
| 7,677,998 B2 | 3/2010 | Tetsuka |
| 7,681,472 B2 | 3/2010 | Weiss |
| 7,686,716 B2 | 3/2010 | Matsumoto et al. |
| 7,699,329 B2 | 4/2010 | Wesling et al. |
| 7,703,350 B2 | 4/2010 | Fujii |
| 7,703,785 B2 | 4/2010 | Colegrove et al. |
| 7,704,172 B2 | 4/2010 | Tetsuka et al. |
| 7,704,173 B2 | 4/2010 | Ichida et al. |
| 7,712,566 B2 | 5/2010 | Jordan et al. |
| 7,712,593 B2 | 5/2010 | Goring |
| 7,721,621 B2 | 5/2010 | Kawakami |
| 7,722,487 B2 | 5/2010 | Ichida |
| 7,722,488 B2 | 5/2010 | Kunisawa et al. |
| 7,722,489 B2 | 5/2010 | Tetsuka et al. |
| D617,690 S | 6/2010 | Tokumoto |
| 7,749,117 B2 | 7/2010 | Carrasco Vergara |
| 7,753,815 B2 | 7/2010 | Saifuddin et al. |
| 7,757,581 B2 | 7/2010 | Okamoto |
| 7,762,916 B2 | 7/2010 | Ichida et al. |
| 7,779,718 B2 | 8/2010 | Jordan et al. |
| 7,779,719 B2 | 8/2010 | Chiang |
| 7,779,724 B2 | 8/2010 | Fujii |
| 7,780,558 B2 | 8/2010 | Kunisawa |
| 7,805,268 B2 | 9/2010 | Takamoto |
| 7,806,022 B2 | 10/2010 | Hara |
| 7,824,285 B2 | 11/2010 | Tan |
| 7,841,255 B2 | 11/2010 | Fujii |
| 7,849,764 B2 | 12/2010 | Kua |
| 7,951,028 B2 * | 5/2011 | Wickliffe | B62M 9/134 474/80 |
| 7,980,974 B2 * | 7/2011 | Fukuda | B62M 25/08 474/70 |
| 8,500,581 B2 * | 8/2013 | Lin | B62M 9/124 474/80 |
| 9,033,833 B2 | 5/2015 | Johnson et al. |
| 9,327,792 B2 | 5/2016 | Johnson et al. |
| 2001/0023621 A1 | 9/2001 | Blaschke et al. |
| 2001/0027695 A1 | 10/2001 | Lumpkin |
| 2002/0000136 A1 | 1/2002 | Feng et al. |
| 2002/0006842 A1 | 1/2002 | Tetsuka |
| 2002/0058558 A1 | 5/2002 | Patterson et al. |
| 2002/0078781 A1 | 6/2002 | Chen |
| 2002/0094906 A1 | 7/2002 | Jordan |
| 2002/0119849 A1 | 8/2002 | Maynard |
| 2002/0160869 A1 | 10/2002 | Barnett |
| 2003/0000332 A1 | 1/2003 | Blaschke |
| 2003/0000333 A1 | 1/2003 | Kawakami |
| 2003/0032509 A1 | 2/2003 | Thompson |
| 2003/0060316 A1 | 3/2003 | Jiang |
| 2003/0071437 A1 * | 4/2003 | Takeda | B62M 25/08 280/260 |
| 2003/0074997 A1 | 4/2003 | Wesling et al. |
| 2003/0096669 A1 | 5/2003 | Kawakami |
| 2003/0100393 A1 | 5/2003 | Nanko |
| 2003/0141125 A1 | 7/2003 | Wahl |
| 2003/0150290 A1 | 8/2003 | Hanatani |
| 2003/0153423 A1 | 8/2003 | Smith |
| 2003/0171175 A1 | 9/2003 | Shahana et al. |
| 2003/0171176 A1 | 9/2003 | Shahana et al. |
| 2003/0171177 A1 | 9/2003 | Ando |
| 2003/0171180 A1 | 9/2003 | Shahana et al. |
| 2003/0188599 A1 | 10/2003 | Takachi |
| 2003/0220163 A1 * | 11/2003 | Yin | B62M 9/122 474/80 |
| 2003/0221507 A1 | 12/2003 | Wessel et al. |
| 2003/0228947 A1 | 12/2003 | Valle |
| 2003/0230160 A1 | 12/2003 | Ritchey |
| 2004/0005951 A1 | 1/2004 | Tsai et al. |
| 2004/0029667 A1 | 2/2004 | Mercat et al. |
| 2004/0036585 A1 * | 2/2004 | Kitamura | B62J 6/001 340/432 |
| 2004/0043852 A1 | 3/2004 | Chang |
| 2004/0043855 A1 | 3/2004 | Wei |
| 2004/0063528 A1 * | 4/2004 | Campagnolo | B62M 9/122 474/70 |
| 2004/0069090 A1 | 4/2004 | Iteya |
| 2004/0102270 A1 * | 5/2004 | Fukuda | B62M 9/122 474/82 |
| 2004/0106482 A1 | 6/2004 | Nagano |
| 2004/0110586 A1 | 6/2004 | Shahana et al. |
| 2004/0157690 A1 | 8/2004 | Nankou |
| 2004/0166973 A1 | 8/2004 | Nanko |

(56) References Cited

U.S. PATENT DOCUMENTS

| | | |
|---|---|---|
| 2004/0171446 A1 | 9/2004 | Nanko |
| 2004/0171454 A1 | 9/2004 | Itou et al. |
| 2004/0237696 A1 | 12/2004 | Hilsky et al. |
| 2004/0237698 A1 | 12/2004 | Hilsky et al. |
| 2005/0081672 A1 | 4/2005 | Chen |
| 2005/0119080 A1 | 6/2005 | Wei |
| 2005/0126329 A1 | 6/2005 | Blaschke |
| 2005/0143206 A1 | 6/2005 | Tetsuka et al. |
| 2005/0173890 A1 | 8/2005 | Matsumoto et al. |
| 2005/0176535 A1 | 8/2005 | Matsurnoto et al. |
| 2005/0187048 A1* | 8/2005 | Fukuda .......... B62M 9/122 474/70 |
| 2005/0187050 A1* | 8/2005 | Fukuda .......... B62M 9/122 474/80 |
| 2005/0187051 A1* | 8/2005 | Fujii .......... B62M 25/045 474/80 |
| 2005/0192137 A1* | 9/2005 | Ichida .......... B62M 9/132 474/70 |
| 2005/0192138 A1 | 9/2005 | Sze et al. |
| 2005/0192139 A1* | 9/2005 | Ichida .......... B62M 9/132 474/80 |
| 2005/0192140 A1* | 9/2005 | Meggiolan ........ B62M 9/122 474/80 |
| 2005/0192141 A1 | 9/2005 | Onogi et al. |
| 2005/0204854 A1 | 9/2005 | McLaughlin et al. |
| 2005/0205323 A1 | 9/2005 | Ichida et al. |
| 2005/0206123 A1 | 9/2005 | Young et al. |
| 2005/0215367 A1 | 9/2005 | Thomasberg |
| 2005/0215368 A1 | 9/2005 | Hoe |
| 2005/0218623 A1 | 10/2005 | Oishi et al. |
| 2005/0239587 A1 | 10/2005 | Ichida et al. |
| 2005/0284252 A1 | 12/2005 | Fukui |
| 2005/0288139 A1 | 12/2005 | Ichida et al. |
| 2006/0030440 A1 | 2/2006 | Zmurko |
| 2006/0035737 A1 | 2/2006 | Nankou |
| 2006/0053940 A1 | 3/2006 | McLaughlin et al. |
| 2006/0058133 A1 | 3/2006 | Tetsuka et al. |
| 2006/0058135 A1 | 3/2006 | Shahana |
| 2006/0096404 A1 | 5/2006 | Wessel et al. |
| 2006/0100045 A1* | 5/2006 | Fukuda .......... B62M 25/08 474/70 |
| 2006/0116227 A1* | 6/2006 | Mercat .......... B62M 9/12 474/82 |
| 2006/0122016 A1 | 6/2006 | Hee |
| 2006/0128511 A1 | 6/2006 | Oishi et al. |
| 2006/0135301 A1 | 6/2006 | Shahana |
| 2006/0172840 A1 | 8/2006 | Kamada |
| 2006/0183584 A1* | 8/2006 | Fukuda .......... B62M 9/12 474/70 |
| 2006/0189424 A1 | 8/2006 | Chamberlain et al. |
| 2006/0199688 A1* | 9/2006 | Dal Pra .......... B62M 9/122 474/70 |
| 2006/0205549 A1 | 9/2006 | Nonoshita et al. |
| 2006/0207375 A1 | 9/2006 | Jordan et al. |
| 2006/0211528 A1* | 9/2006 | Campagnolo ...... B62M 9/122 474/70 |
| 2006/0211529 A1 | 9/2006 | Vergara |
| 2007/0021246 A1 | 1/2007 | Shahana et al. |
| 2007/0021248 A1 | 1/2007 | Shahana et al. |
| 2007/0026985 A1 | 2/2007 | Yamaguchi |
| 2007/0049437 A1 | 3/2007 | Wickliffe |
| 2007/0068312 A1 | 3/2007 | Sato |
| 2007/0068315 A1 | 3/2007 | Oseto |
| 2007/0093327 A1 | 4/2007 | Florczyk |
| 2007/0117666 A1 | 5/2007 | Ichida et al. |
| 2007/0129191 A1 | 6/2007 | Florczyk |
| 2007/0135250 A1 | 6/2007 | Kamada |
| 2007/0137386 A1 | 6/2007 | Kawakami |
| 2007/0137387 A1 | 6/2007 | Dal Pra |
| 2007/0137389 A1 | 6/2007 | Wickliffe |
| 2007/0137390 A1 | 6/2007 | Dal Pra' et al. |
| 2007/0137987 A1 | 6/2007 | Wang |
| 2007/0173360 A1 | 7/2007 | Shahana et al. |
| 2007/0178998 A1 | 8/2007 | Tetsuka |
| 2007/0184925 A1* | 8/2007 | Ichida .......... B62M 9/132 474/80 |
| 2007/0191158 A1 | 8/2007 | Ichida et al. |
| 2007/0191159 A1 | 8/2007 | Fukuda |
| 2007/0193387 A1 | 8/2007 | Nakano |
| 2007/0193388 A1 | 8/2007 | Nakano |
| 2007/0193389 A1 | 8/2007 | Kawakami |
| 2007/0193497 A1 | 8/2007 | Iteya et al. |
| 2007/0199401 A1 | 8/2007 | Kawakami et al. |
| 2007/0202978 A1 | 8/2007 | Yamaguchi et al. |
| 2007/0207886 A1 | 9/2007 | Shahana |
| 2007/0214908 A1 | 9/2007 | Weiss |
| 2007/0219696 A1 | 9/2007 | Miller et al. |
| 2007/0221008 A1 | 9/2007 | Shipman et al. |
| 2007/0261507 A1 | 11/2007 | Funai |
| 2007/0261508 A1 | 11/2007 | Acenbrak |
| 2007/0293359 A1 | 12/2007 | Yamamoto et al. |
| 2007/0298920 A1 | 12/2007 | Nakai et al. |
| 2008/0004142 A1 | 1/2008 | Nakai et al. |
| 2008/0026888 A1 | 1/2008 | Yamamoto et al. |
| 2008/0026890 A1 | 1/2008 | Oseto |
| 2008/0026891 A1 | 1/2008 | Oseto |
| 2008/0032835 A1 | 2/2008 | Reynolds |
| 2008/0051237 A1 | 2/2008 | Shahana |
| 2008/0058136 A1 | 3/2008 | Muramoto et al. |
| 2008/0058144 A1 | 3/2008 | Oseto et al. |
| 2008/0064544 A1 | 3/2008 | Yamaguchi et al. |
| 2008/0064545 A1 | 3/2008 | Yamaguchi et al. |
| 2008/0081716 A1 | 4/2008 | Watarai et al. |
| 2008/0087131 A1 | 4/2008 | Tetsuka |
| 2008/0110288 A1 | 5/2008 | Okamoto |
| 2008/0115615 A1 | 5/2008 | Lim et al. |
| 2008/0121066 A1 | 5/2008 | Takebayashi et al. |
| 2008/0121452 A1 | 5/2008 | Bon |
| 2008/0125258 A1 | 5/2008 | Oseto |
| 2008/0125259 A1 | 5/2008 | Kunisawa et al. |
| 2008/0153639 A1 | 6/2008 | Tan |
| 2008/0153640 A1 | 6/2008 | Nagasawa |
| 2008/0153641 A1 | 6/2008 | Chen et al. |
| 2008/0167148 A1 | 7/2008 | Siah |
| 2008/0182689 A1 | 7/2008 | Fujii et al. |
| 2008/0188336 A1 | 8/2008 | Tokuyama |
| 2008/0194363 A1 | 8/2008 | Kunisawa |
| 2008/0196537 A1 | 8/2008 | Dal Pra' |
| 2008/0264748 A1 | 10/2008 | Chen |
| 2008/0272643 A1 | 11/2008 | Young et al. |
| 2008/0274845 A1 | 11/2008 | Valle et al. |
| 2008/0276748 A1 | 11/2008 | Chen |
| 2008/0300076 A1 | 12/2008 | Fukushima et al. |
| 2008/0305902 A1 | 12/2008 | Tetsuka et al. |
| 2008/0312799 A1* | 12/2008 | Miglioranza ...... B62M 9/122 701/66 |
| 2009/0031846 A1 | 2/2009 | Dal Pra' et al. |
| 2009/0042684 A1* | 2/2009 | Takahashi ........ B29C 33/42 474/263 |
| 2009/0045601 A1 | 2/2009 | Colegrove et al. |
| 2009/0062045 A1 | 3/2009 | Kunisawa |
| 2009/0062049 A1 | 3/2009 | Cranston et al. |
| 2009/0062057 A1 | 3/2009 | Fujiwara |
| 2009/0069135 A1 | 3/2009 | Chiang |
| 2009/0088284 A1 | 4/2009 | Patterson |
| 2009/0098963 A1 | 4/2009 | Watarai et al. |
| 2009/0111625 A1 | 4/2009 | Valle et al. |
| 2009/0111631 A1 | 4/2009 | Wickliffe et al. |
| 2009/0137354 A1 | 5/2009 | Oseto et al. |
| 2009/0197718 A1 | 8/2009 | Nagasawa |
| 2009/0209375 A1* | 8/2009 | Takamoto ........ B62M 9/122 474/18 |
| 2009/0211828 A1 | 8/2009 | Bon |
| 2009/0235772 A1 | 9/2009 | Naka et al. |
| 2009/0247334 A1 | 10/2009 | Takachi et al. |
| 2009/0275429 A1 | 11/2009 | Deguchi et al. |
| 2010/0004079 A1 | 1/2010 | Watarai |
| 2010/0051398 A1 | 3/2010 | Spacek |
| 2010/0071499 A1 | 3/2010 | Weiss |
| 2010/0081527 A1 | 4/2010 | Auer |
| 2010/0093472 A1 | 4/2010 | Oseta et al. |
| 2010/0125029 A1 | 5/2010 | Nielson et al. |
| 2010/0160099 A1 | 6/2010 | Colegrove et al. |

(56) References Cited

U.S. PATENT DOCUMENTS

| | | | |
|---|---|---|---|
| 2010/0184545 A1 | 7/2010 | Takachi et al. | |
| 2010/0190593 A1 | 7/2010 | Vrielink | |
| 2010/0218633 A1 | 9/2010 | Ichida et al. | |
| 2010/0227718 A1 | 9/2010 | Chen | |
| 2010/0234154 A1 | 9/2010 | Klieber | |
| 2010/0252389 A1 | 10/2010 | French | |
| 2010/0294068 A1 | 11/2010 | Fujii et al. | |
| 2012/0142466 A1* | 6/2012 | Lin | B62M 9/124 474/80 |
| 2012/0214628 A1 | 8/2012 | Meager et al. | |
| 2013/0008282 A1 | 1/2013 | Johnson et al. | |
| 2015/0122565 A1* | 5/2015 | Deleval | B62M 6/55 180/206.3 |
| 2015/0259025 A1* | 9/2015 | Sala | B62K 23/06 74/473.12 |

FOREIGN PATENT DOCUMENTS

| | | |
|---|---|---|
| EP | 0558425 | 9/1993 |
| EP | 0849157 | 6/1998 |
| FR | 2610061 | 7/1988 |
| FR | 2972704 | 9/2012 |
| GB | 616877 | 1/1949 |

OTHER PUBLICATIONS

International Preliminary Report on Patentability for International Patent Application No. PCT/US2012/022932, dated Aug. 8, 2013, 10 pages.
Official Action with English Translation for China Patent Application No. 201280015986.9, dated Apr. 3, 2015 28 pages.
Official Action with English Translation for China Patent Application No. 201280015986.9, dated Dec. 10, 2015 30 pages.
Extended Search Report for European Patent Application No. 12739576.2, dated Nov. 11, 2015 6 pages.
Extended Search Report for European Patent Application No. 13184967, completed Oct. 31, 2013 6 pages.
Extended Search Report for European Patent Application No. 14189503,7, dated Feb. 26, 2015 9 pages.
Official Action for U.S. Appl. No. 13/360,164, dated Aug. 14, 2014 Restriction Requirement.
Official Action for U.S. Appl. No. 13/360,164, dated Nov. 19, 2014, 5 pages.
Official Action for U.S. Appl. No. 13/360,164, dated May 19, 2015 14 pages.
Official Action for U.S. Appl. No. 13/360,164, dated Dec. 1, 2015 19 pages.
Official Action for U.S. Appl. No. 13/360,164, dated Jun. 17, 2016 17 pages.
Official Action for U.S. Appl. No. 13/622,725, dated Aug. 14, 2014 13 pages.
Notice of Allowance for U.S. Appl. No. 13/622,725, dated Nov. 7, 2014 5 pages.
Corrected Notice of Allowance for U.S. Appl. No. 13/622,725, dated Mar. 27, 2015 5 pages.
Official Action for U.S. Appl. No. 14/058,983, dated Feb. 27, 2015 6 pages Restriction Requirement.
Official Action for U.S. Appl. No. 14/058,983, dated Jul. 17, 2015 14 pages.
Notice of Allowance for U.S. Appl. No. 14/058,983, dated Dec. 18, 2015 11 pages.
Official Action with English Translation for China Patent Application No. 201280015986.9, dated Mar. 24, 2016 30 pages.
Official Action for European Patent Application No. 12739576.2, dated Dec. 13, 2016 4 pages.
Official Action for European Patent Application No. 13184967.1, dated Oct. 23, 2015 5 pages.
Official Action for European Patent Application No. 13184967.1, dated Jul. 20, 2016 7 pages.
Official Action for European Patent Application No. 14189503.7, dated Apr. 6, 2016 5 pages.
Official Action for European Patent Application No. 14189503,7, dated Nov. 22, 2016 8 pages.
Official Action for European Patent Application No. 14189503.7, dated Aug. 11, 2017 5 pages.
Extended Search Report for European Patent Application No. 17168490.5, dated Sep. 20, 2017 10 pages.
Official Action for European Patent Application No. 12739576.2, dated Nov. 21, 2017 5 pages.
Official Action for European Patent Application No. 13184967.1, dated Oct. 6, 2017 4 pages.

* cited by examiner

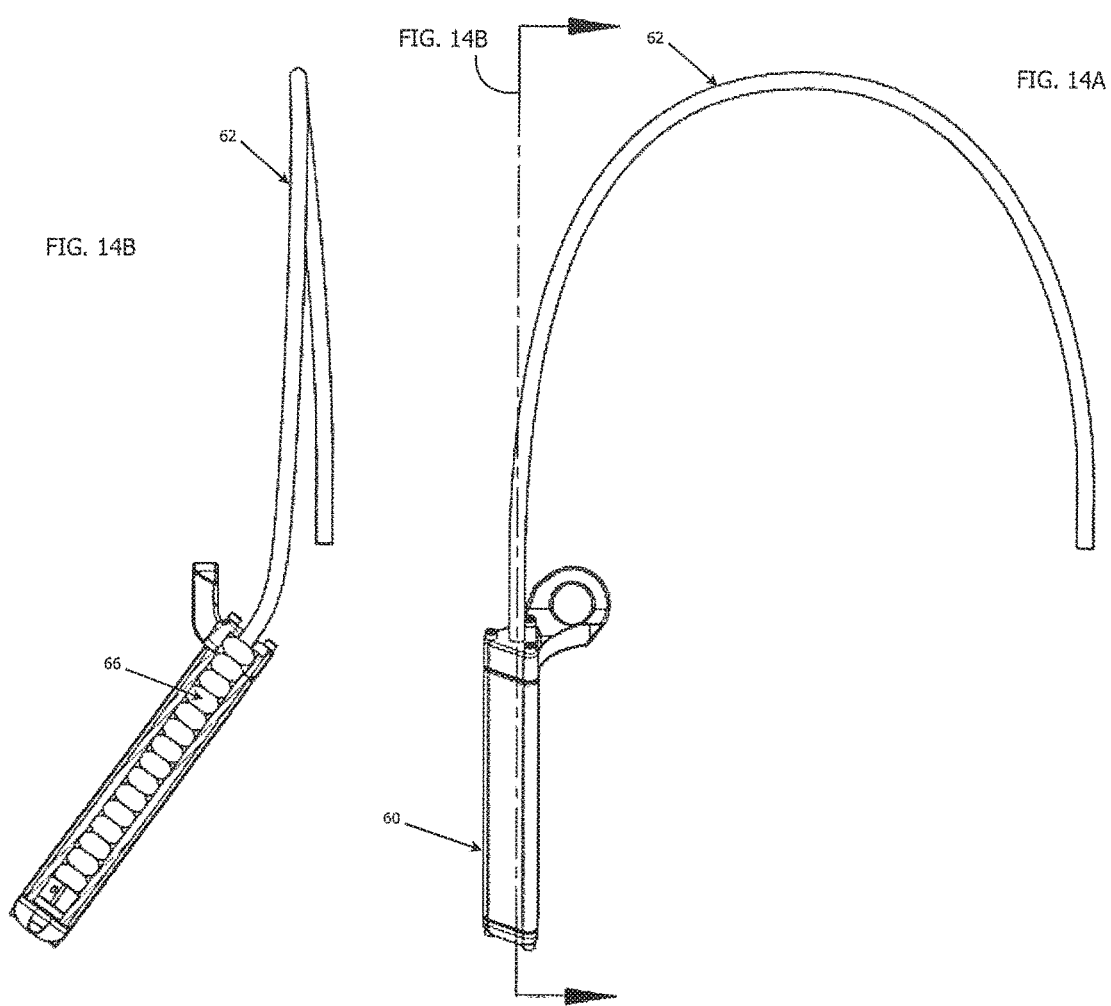

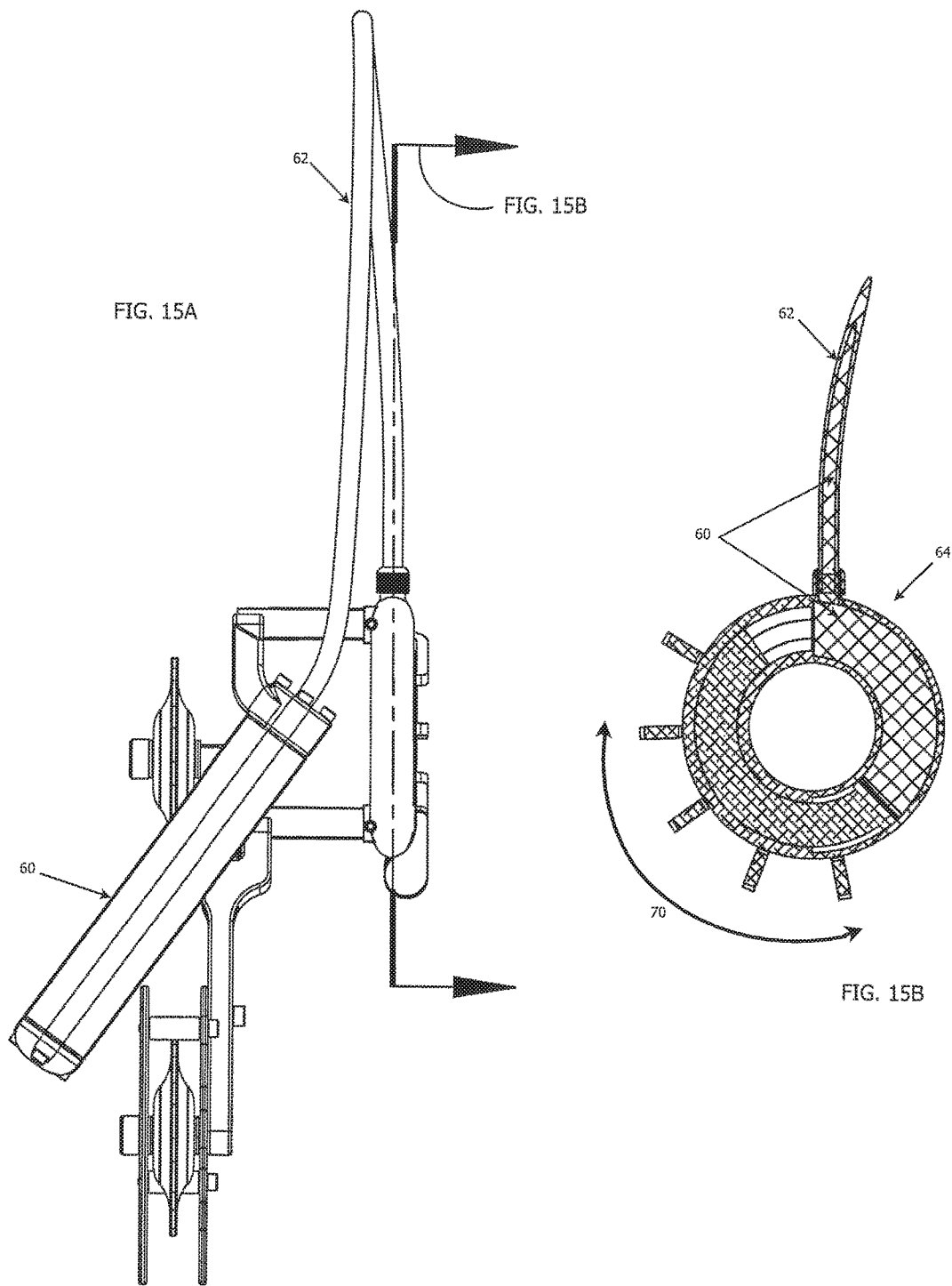

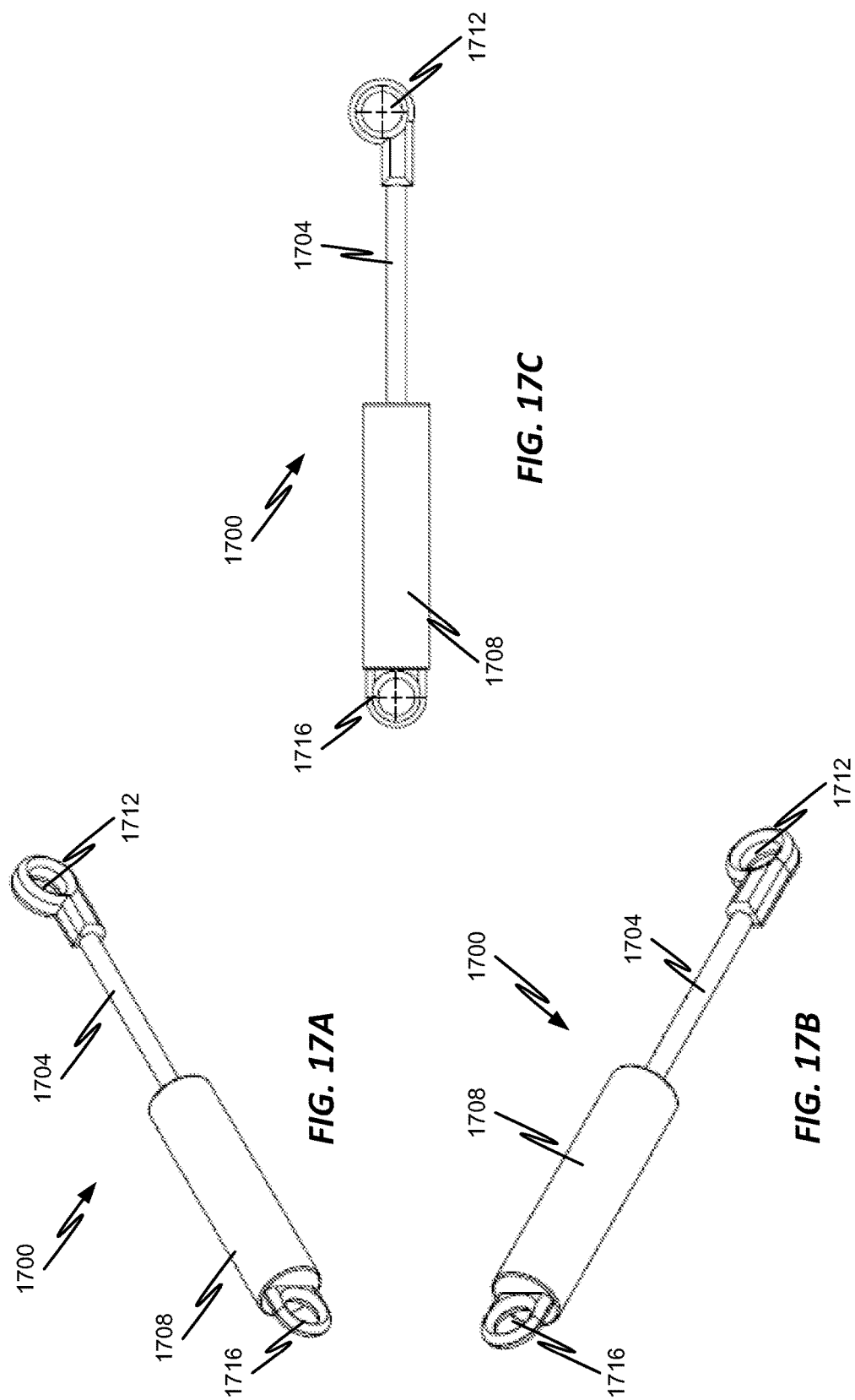

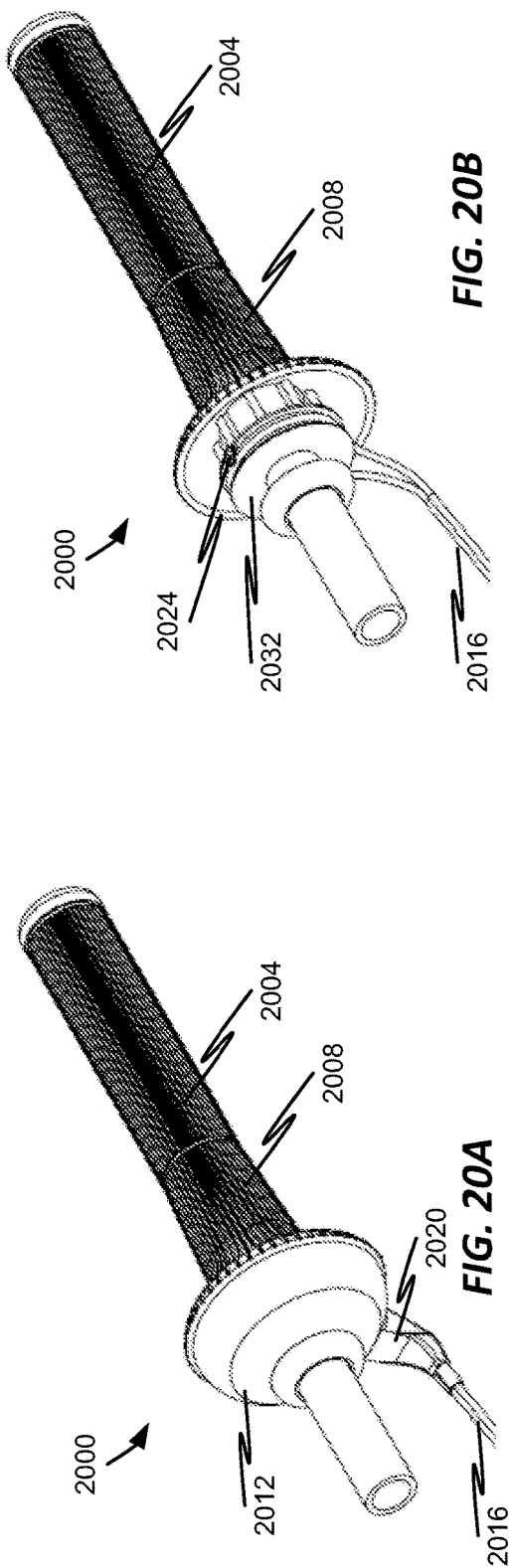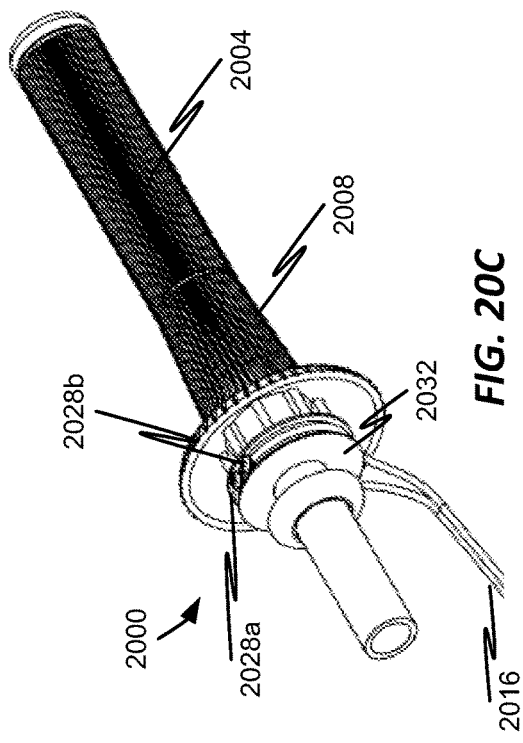

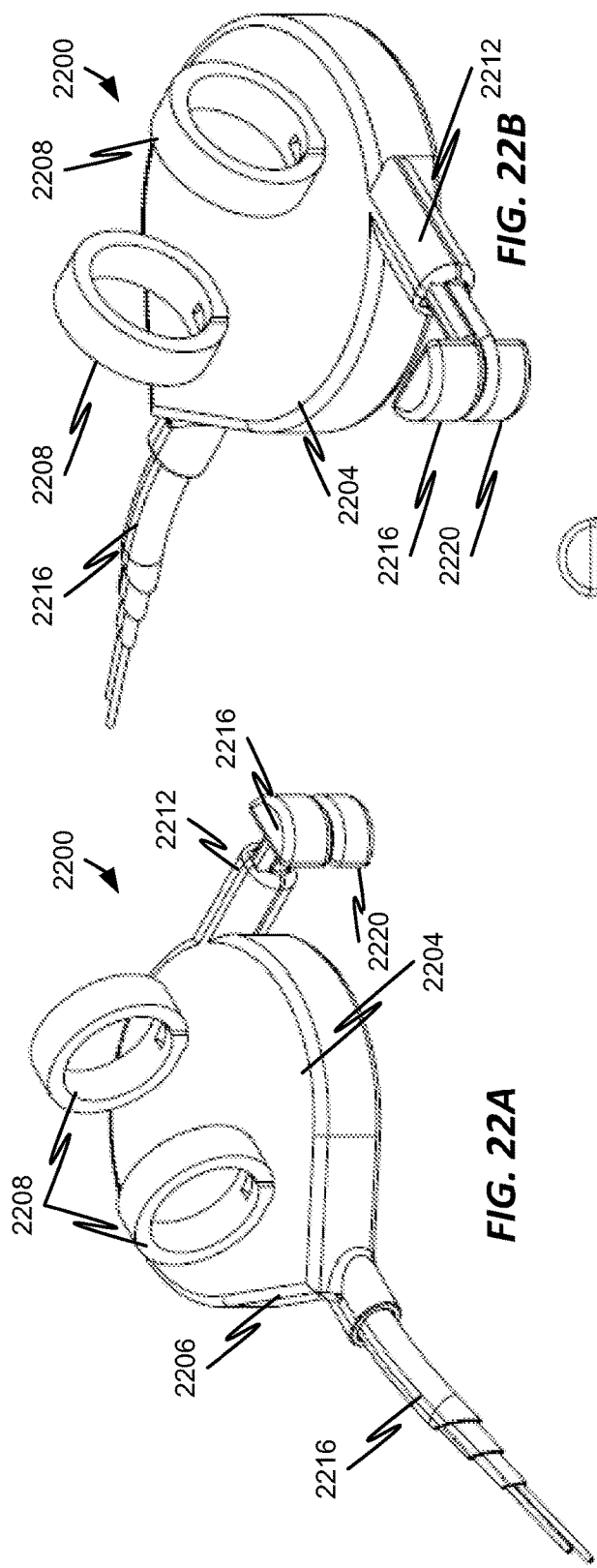

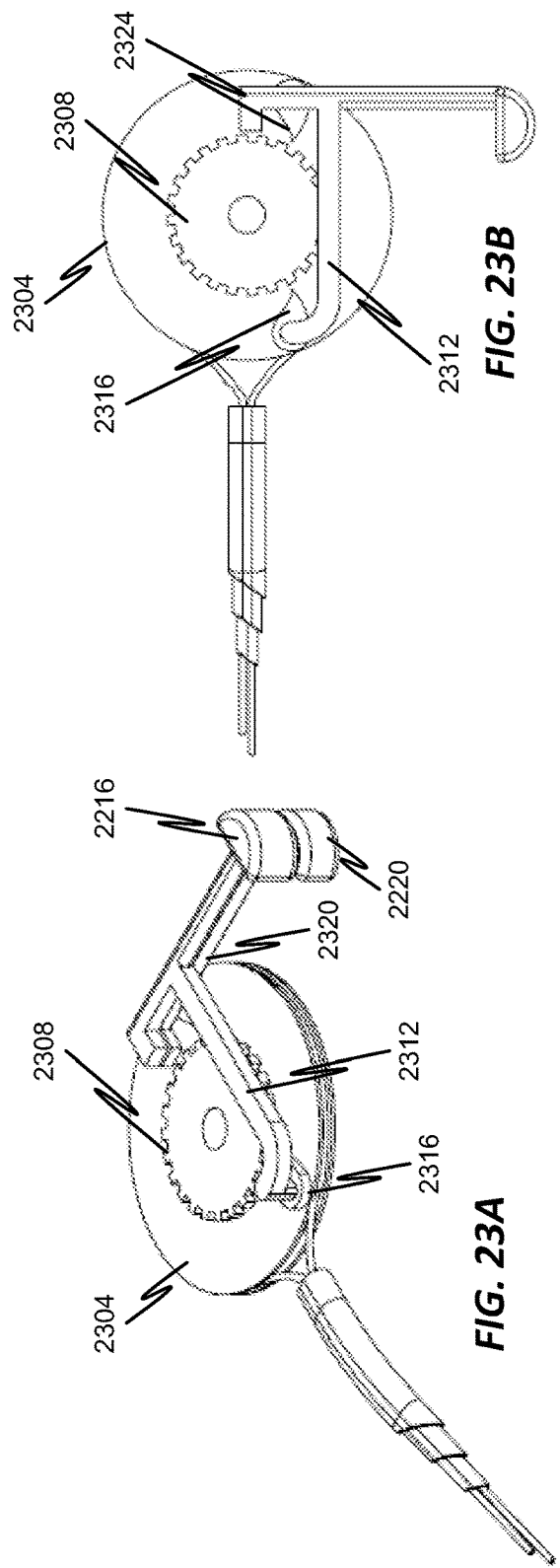

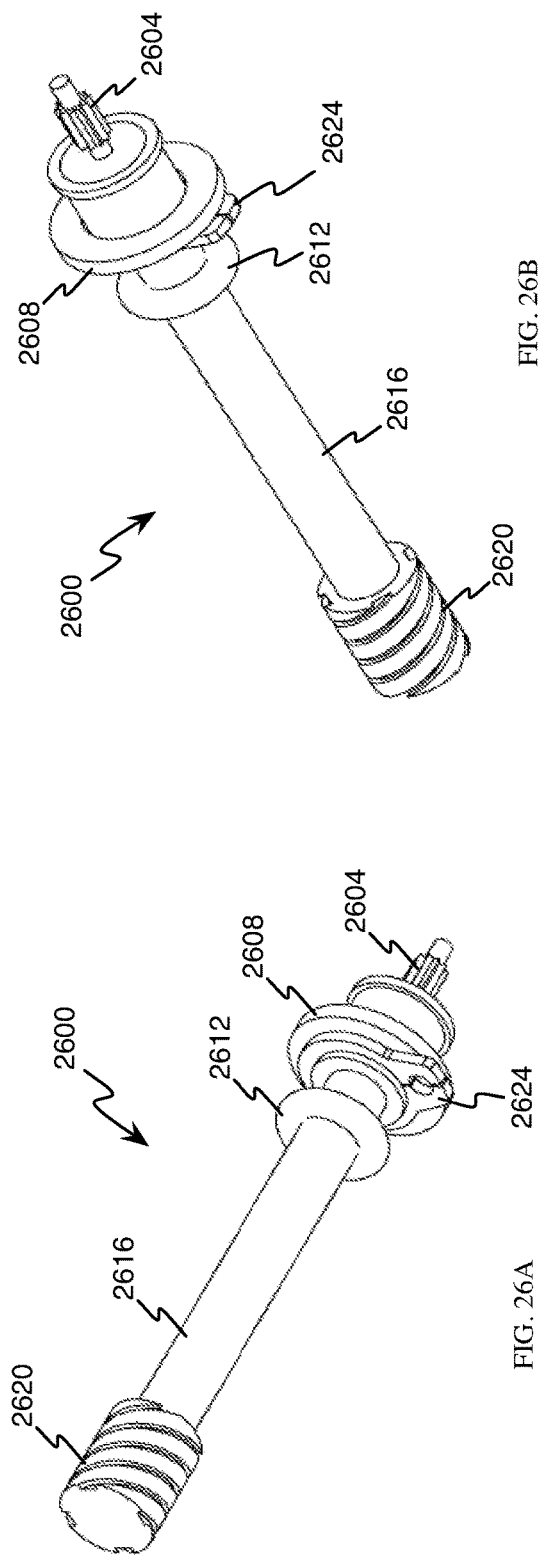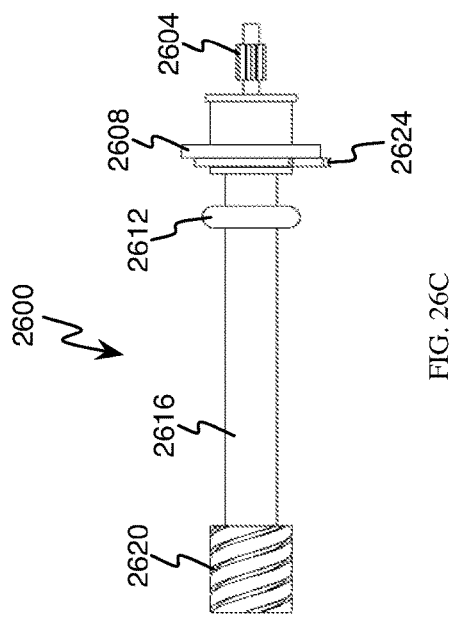

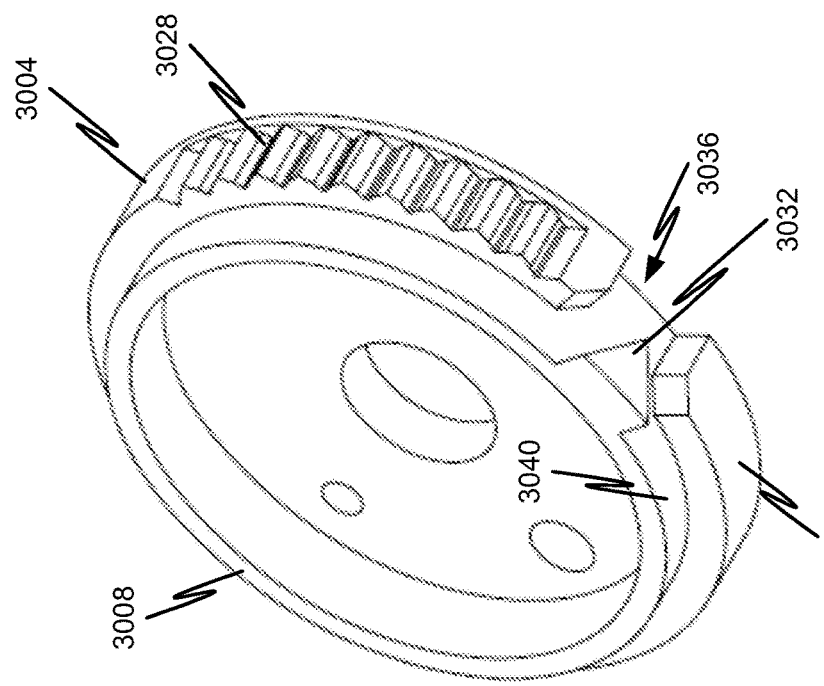
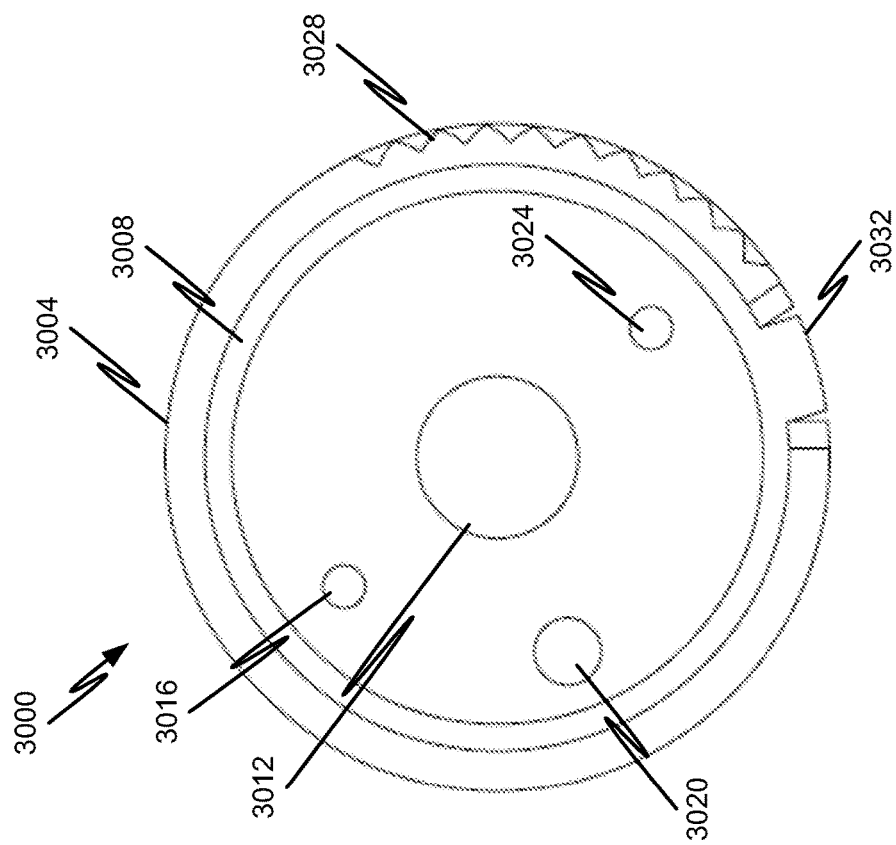

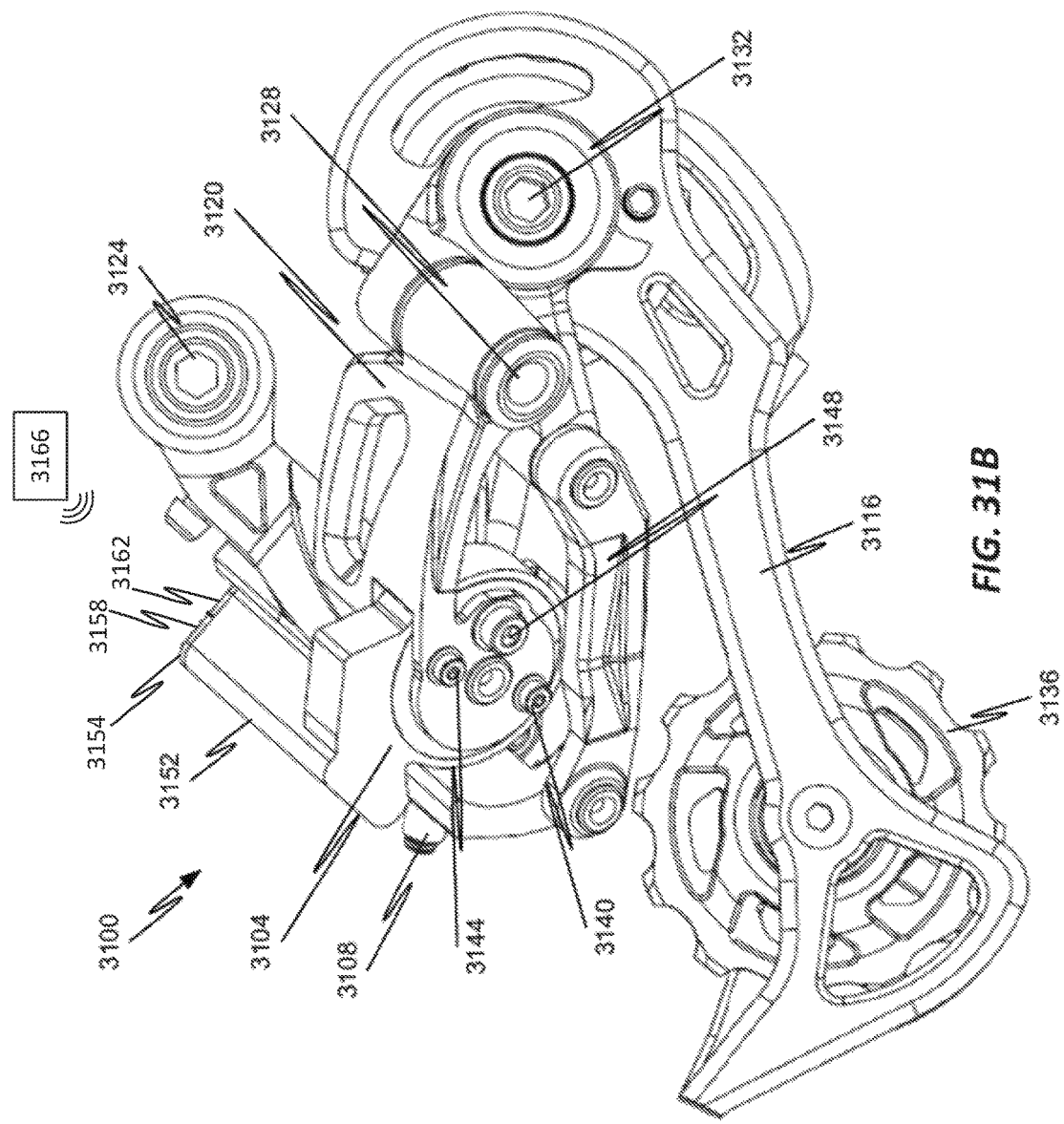

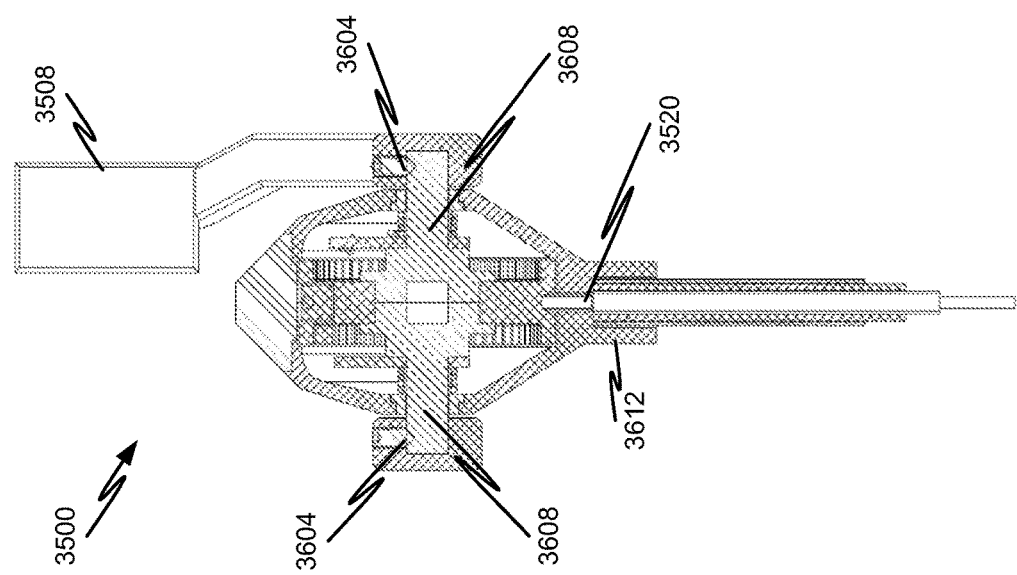
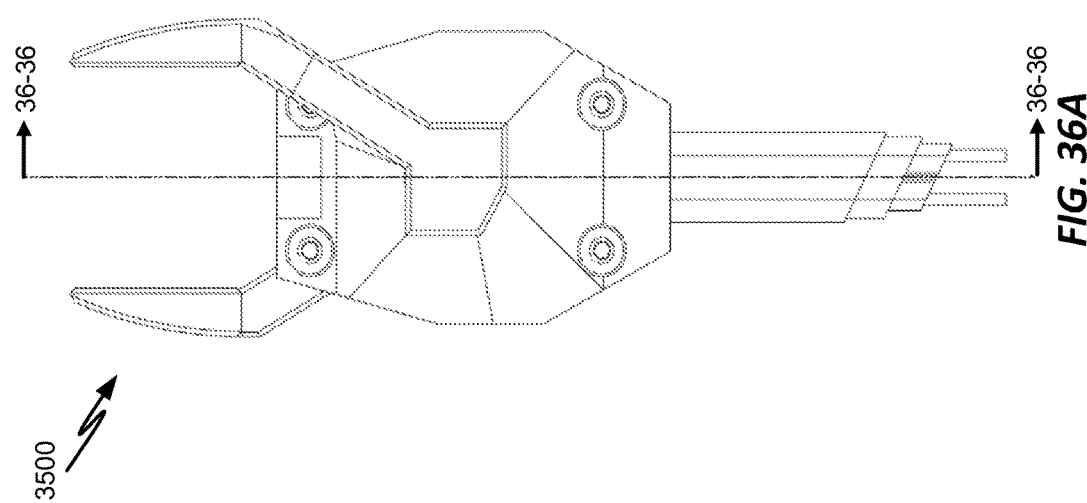

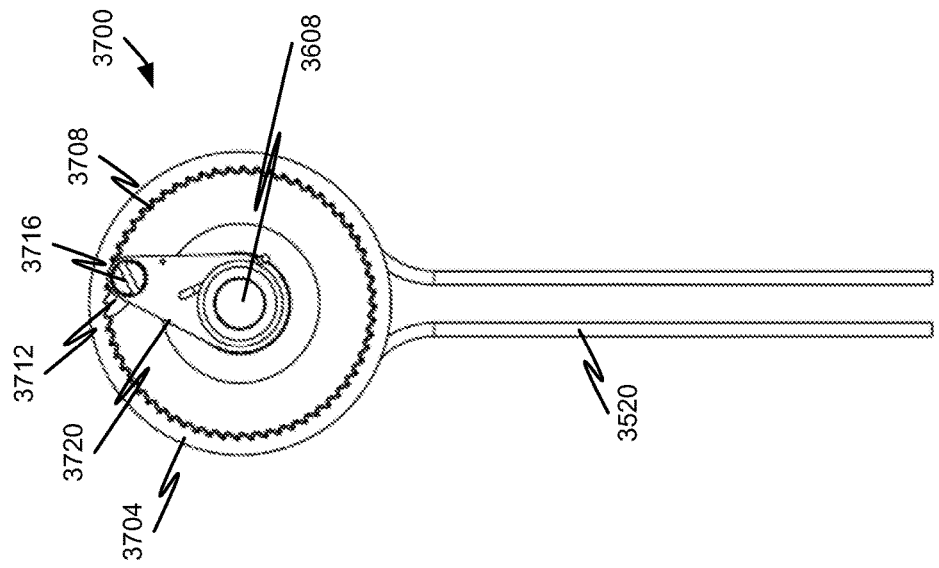
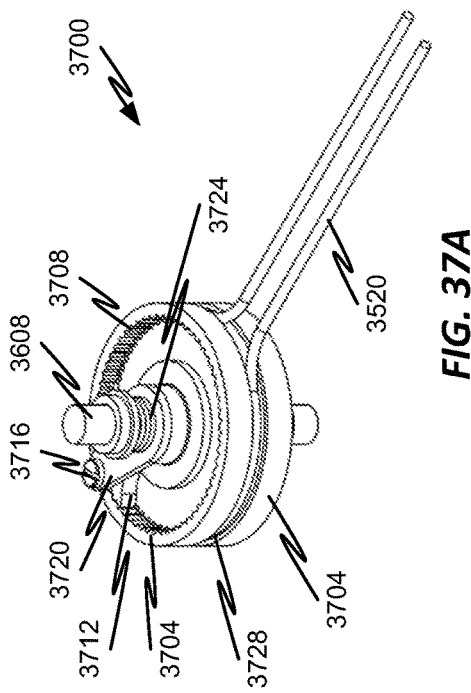
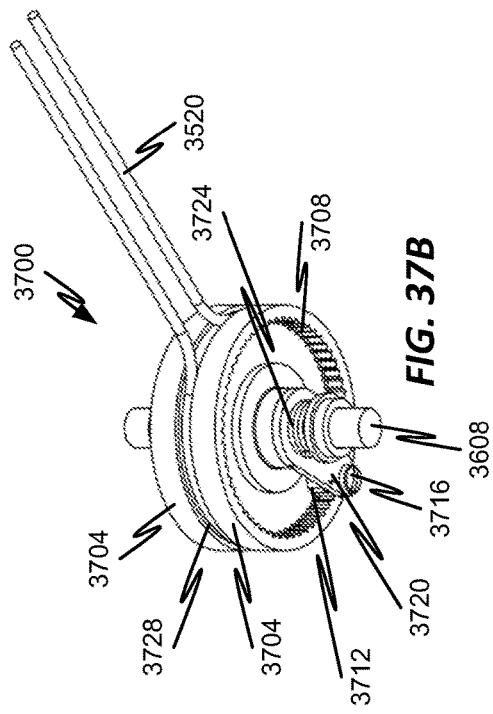
FIG. 37C
FIG. 37A
FIG. 37B

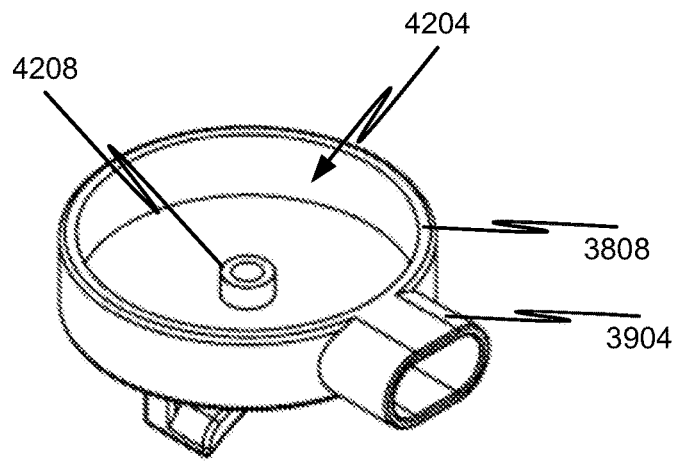
FIG. 42A
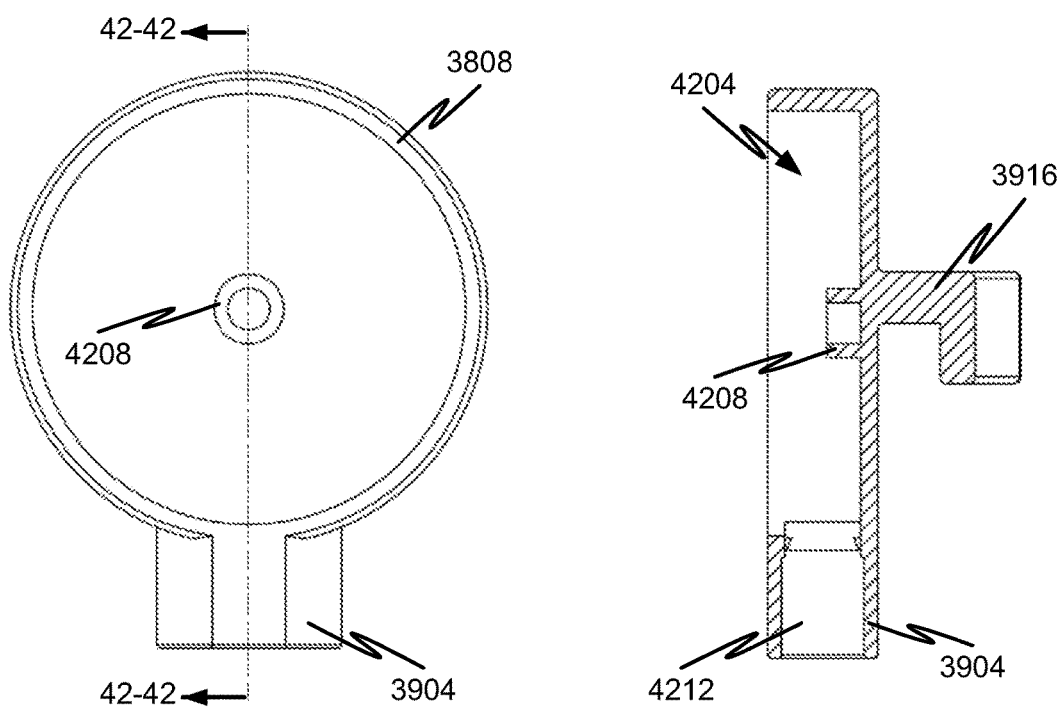
FIG. 42B  FIG. 42C

GEAR TRANSMISSION AND DERAILLEUR SYSTEM

CROSS REFERENCE TO RELATED APPLICATIONS

This non-provisional application is a Continuation in Part of U.S. patent application Ser. No. 14/058,983, filed Oct. 21, 2013, which is a continuation-in-Part of U.S. patent application Ser. No. 13/622,725, filed Sep. 19, 2012, which is a Continuation-in-Part of U.S. patent application Ser. No. 13/360,164, filed Jan. 27, 2012, which claims the benefit of priority from U.S. Provisional Patent Application Ser. No. 61/484,037, filed May 9, 2011, and U.S. Provisional Patent Application Ser. No. 61/437,565, filed Jan. 28, 2011.

BACKGROUND

Many prior art bike transmission systems use a shifter and derailleur combination that requires the shifter to hold tension on the derailleur by means of a large cable. In these prior art designs, the derailleur is controlled by a single cable from the shifter, requiring the derailleur to incorporate a large spring that is able to pull against the shifter, allowing the shifter to act as if it is pulling the derailleur back and forth between a plurality of gears, typically provided in a stacked arrangement known as a cassette. The shifter on these prior art designs is used to index the derailleur from gear to gear and contains complicated indexing components that help to align the derailleur as accurately as possible. Not only does this create a bulky, heavy and expensive shifter, but it also requires this added bulk to be mounted to handlebars, where aerodynamics are of concern.

By way of example, various known derailleur systems include U.S. Pat. No. 7,381,142 to Campagnolo, U.S. Pat. No. 4,437,848 to Shimano, U.S. Pat. No. 5,688,200 to White, and U.S. Pat. No. 4,183,255 to Leiter, all of which are hereby incorporated by reference in their entireties.

A significant problem with these prior art designs is that the cable is always under tension and as a result, the cable has the ability and tendency to stretch. When cable stretch occurs, which is common, the derailleur falls out of alignment with the sprockets, creating an undesirable shift, lowering efficiency, and in many cases, preventing the derailleur from shifting to the desired gear entirely. It is also difficult for prior art designs to perfectly align the derailleur with each sprocket due to the aforementioned cable slack issue as well as the fact that the prior art device used to regulate the accuracy of the derailleur is located almost two meters away from the system.

Cable slack in prior art designs is such a common problem that the designs have many adjustments incorporated into both the shifter and the derailleur to account for the issue. In addition, these prior art designs contain a chain slack device that is not only inefficient, but prevents the derailleur from functioning on sprockets that are over 36 teeth. On sprockets larger than 36 teeth, the chain slack arm is too close to the tire and ground to operate properly.

SUMMARY

Accordingly, there has been a long-felt and unmet need to provide a gear transmission and derailleur system that improves shifting accuracy and reduces or eliminates complications associated with chain slack. There has further been a long-felt and unmet need to provide a derailleur system with linear translation features that improves accuracy and is easy to use.

The Summary of the Disclosure is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

Embodiments of the present disclosure contemplate an improved gear transmission and derailleur system. For the purposes of the present disclosure, various embodiments may be referred to as the "InGear Transmission System" or the "InGear." The present disclosure provides a transmission system for bicycles that is more accurate, more efficient, removes the cable slack issue common to prior art designs and provides a derailleur system that reduces or eliminates the need to be tuned. In various embodiments, the InGear Transmission utilizes a user-interfacing control system, or "Cuff-Link" controller to operate a derailleur with ease of shifting. In various embodiments, the derailleur system may be referred to as the "Line Drive" or "Line Drive Derailleur."

The InGear system aligns a chain with the center of each sprocket. The Cuff-Link control is mounted to the handlebars and functions by pulling a wire back and forth. This actuation motion may be referred to herein as the "Pull-Pull" design. The Cuff-Link control comprises a pulley or similar feature that does not rely on indexing. Rather, the system pulls a cable back and forth to translate derailleur features from one gear to another. When the Cuff-Link control is connected to the derailleur of the present disclosure through a known cable, the Cuff-Link control is able to pull the derailleur back and forth along its entire track without the need for a large spring.

In various embodiments, the system further comprises a feature to regulate the position of the derailleur pulleys so that the derailleur pulleys can align a drive member to exactly the center of each of the sprockets. In various embodiments, this feature may be referred to as the "Gear Climb." The Gear Climb feature, in some embodiments, provides for automatic centering and alignment of the derailleur system, particularly when a user positions a Cuff-Link control in a position that does not exactly correspond to proper alignment with a cog or gear. Use of the terms "drive means" or "drive member" in the present disclosure relate a wide variety of devices including, but not limited to, chains, roller chains, bicycle chain, chain drives, belts, flat belts, round belts, vee belts, rotational shafts, universal joints, ropes, etc.

In various embodiments, a center device or apparatus for positioning a device such as a derailleur system in a plurality of predetermined positions is provided. The predetermined positions may correspond to, for example, a plurality of positions characterized by the derailleur aligning a drive member or chain with one of a plurality of cogs or sprockets. In one embodiment, the apparatus comprises a first member having a plurality of first surface features and a plurality of second surface features. The first member may be in the form of a linear track, a cylindrical track, or variations thereof as will be described herein and as will be recognized by one of skill in the art. A second member corresponding with the first member is provided and biased toward the first member. The second may be biased by a variety of known devices, including, by way of example only, a coil spring. The plurality of first surface features define points of dimensional instability, or increased potential energy, for the second member and the plurality of second surface features defining points of dimensional stability, or reduced potential energy for the second member. The first and second surface features may comprise, for example, peaks and valleys, notches, crests and troughs, magnets, etc. for securing derailleur components in a desired position. In various embodiments, the first and/or second members may be arranged in a linear manner. In one embodiments, the first and second members comprise opposing cylindrical members with radially disposed surface features defining a stable position when mated. The second member is provided in fixed force transmitting communication with the translatable device, such that when a pin, for example, is biased into a position of dimensional stability or lower potential energy, system components such as a derailleur and associated pulley wheel are translated therewith.

BRIEF DESCRIPTION OF DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
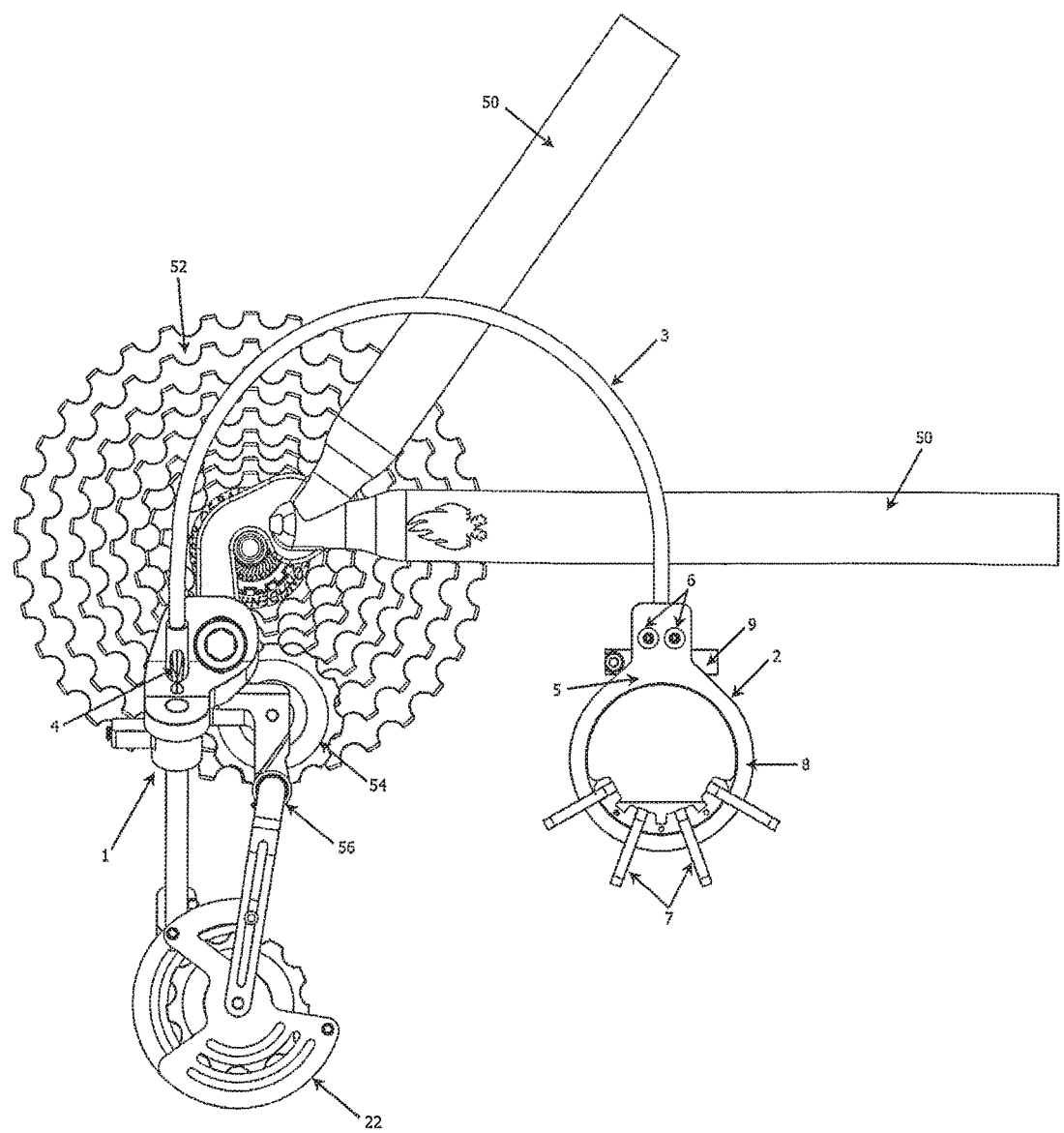
Figure 2:
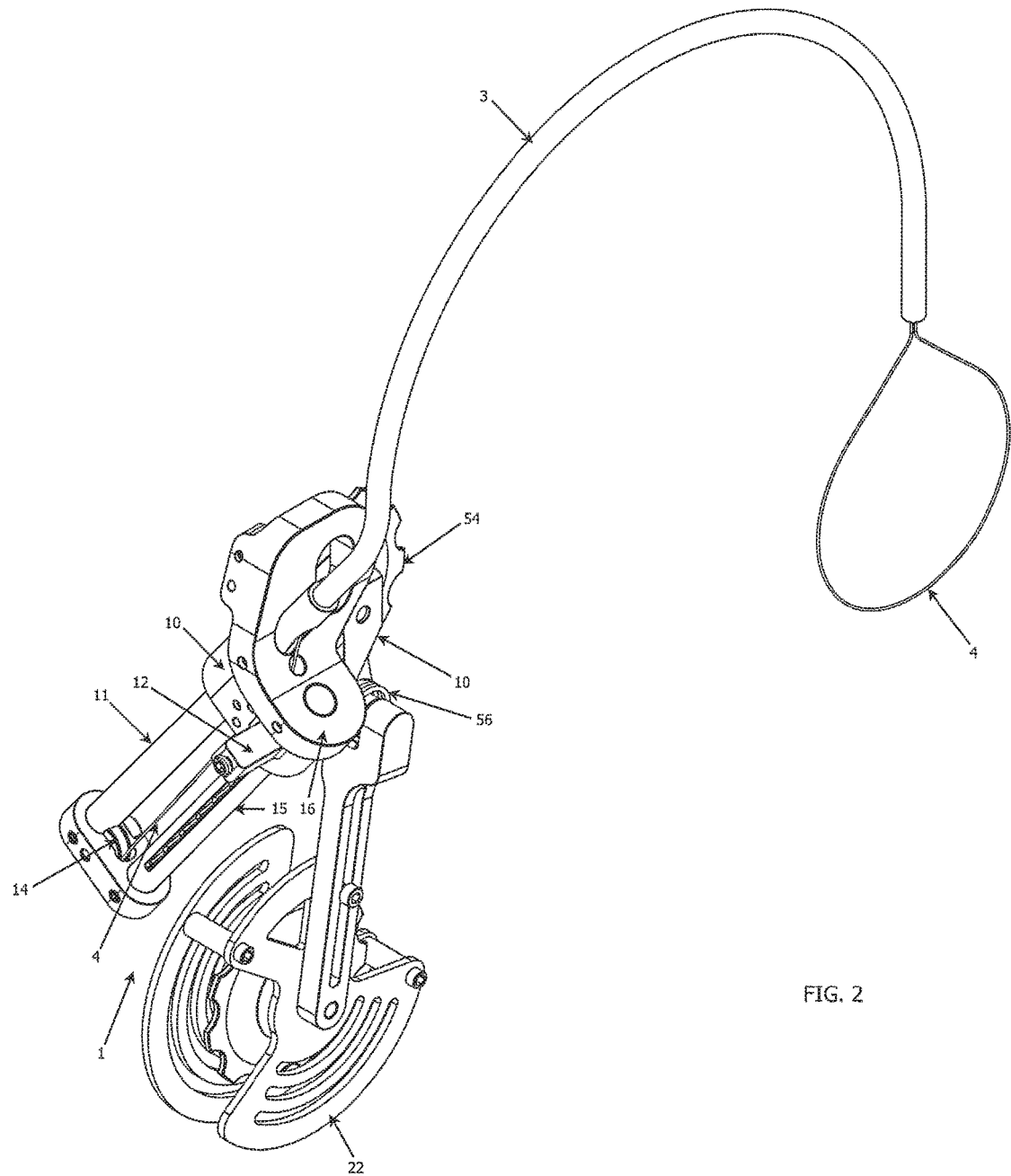
Figure 3A:
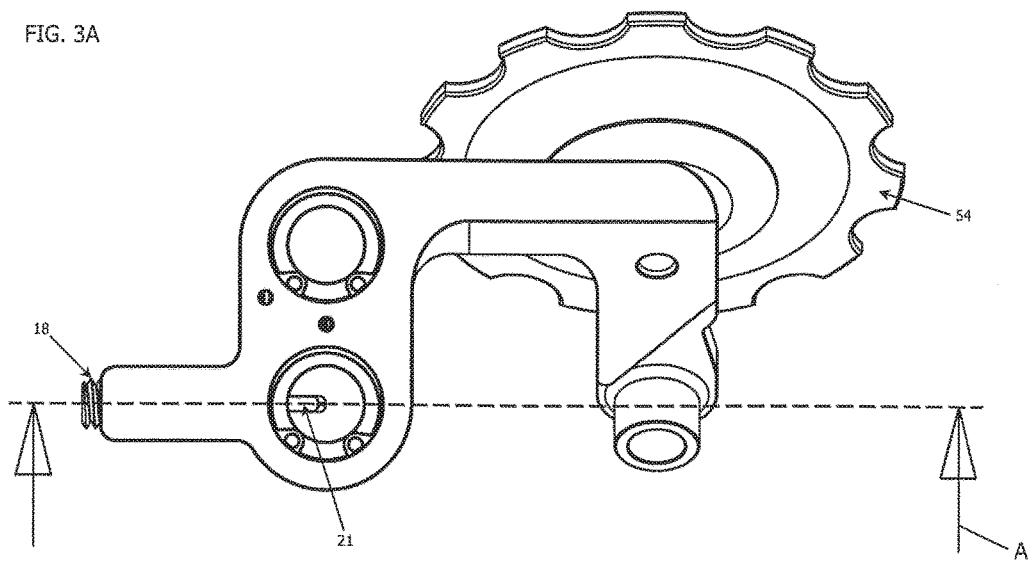
Figure 3B:
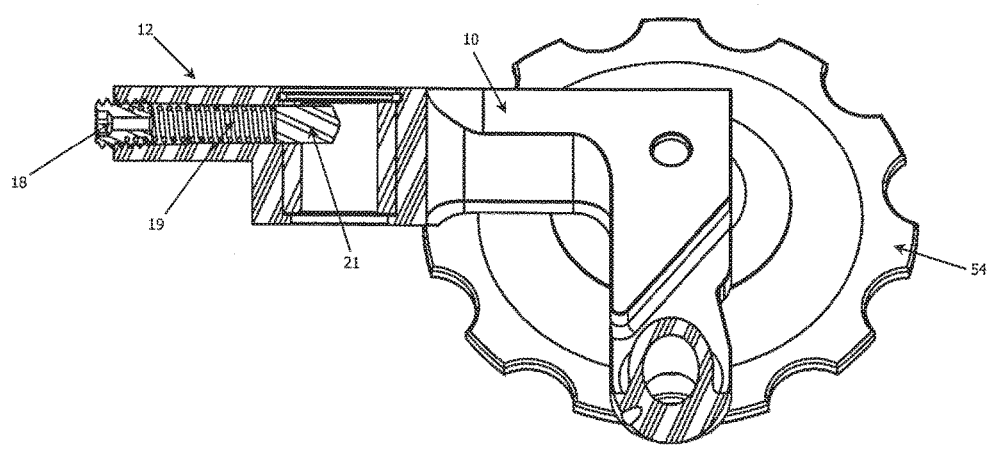
Figures 4A, 4B:
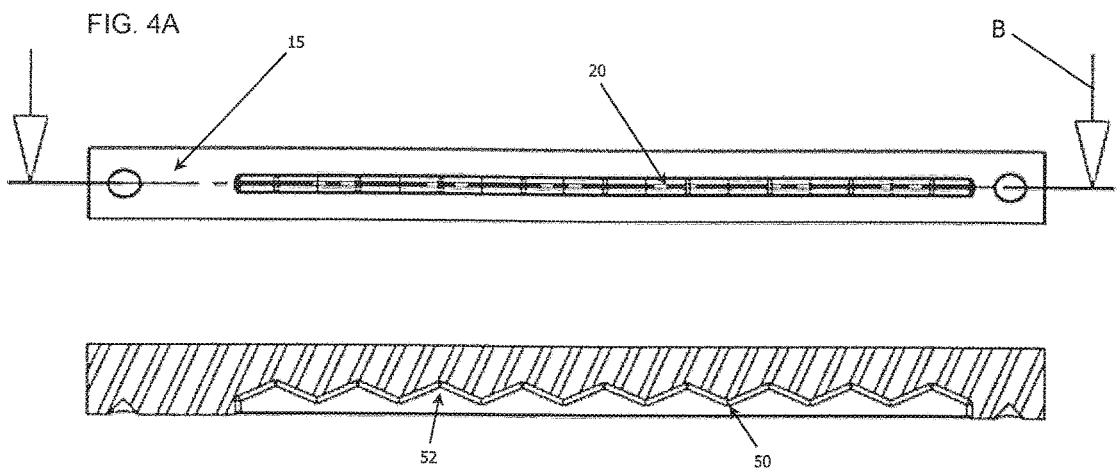
Figure 5:
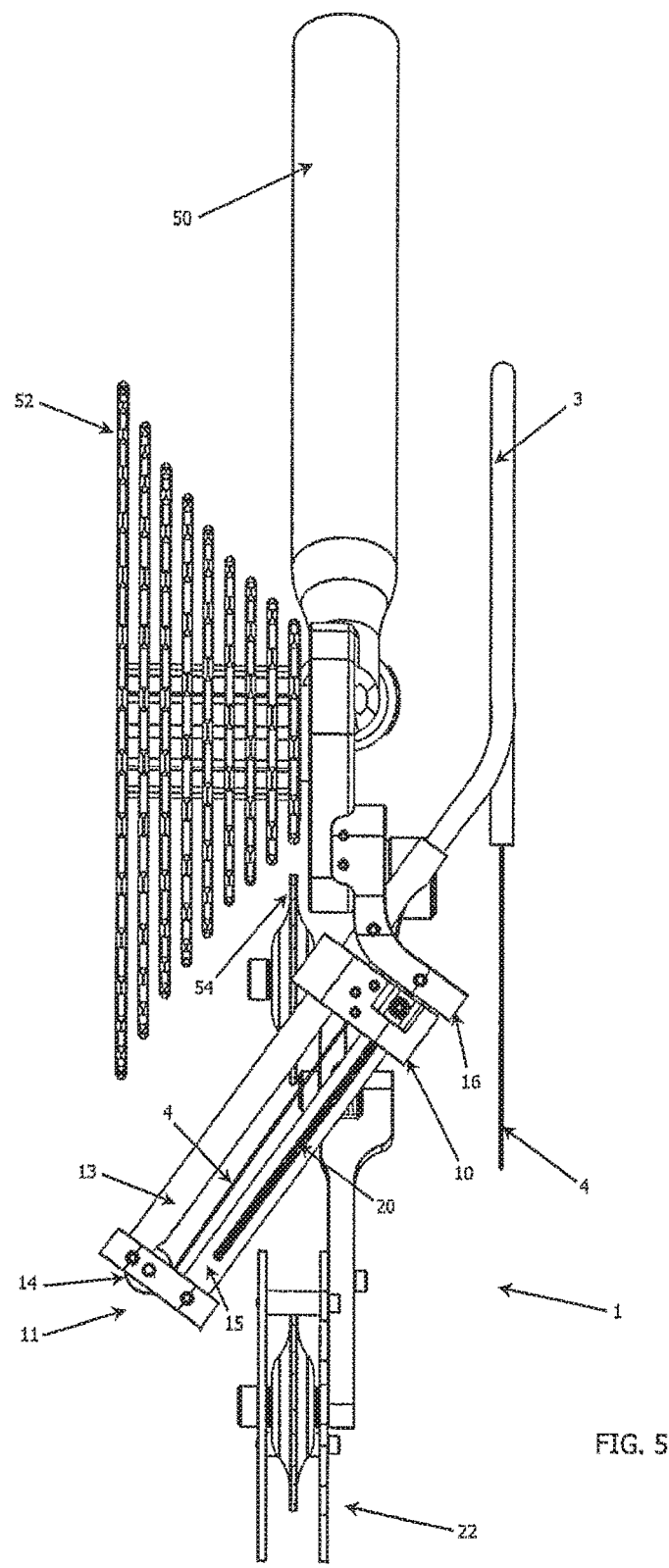
Figure 6:
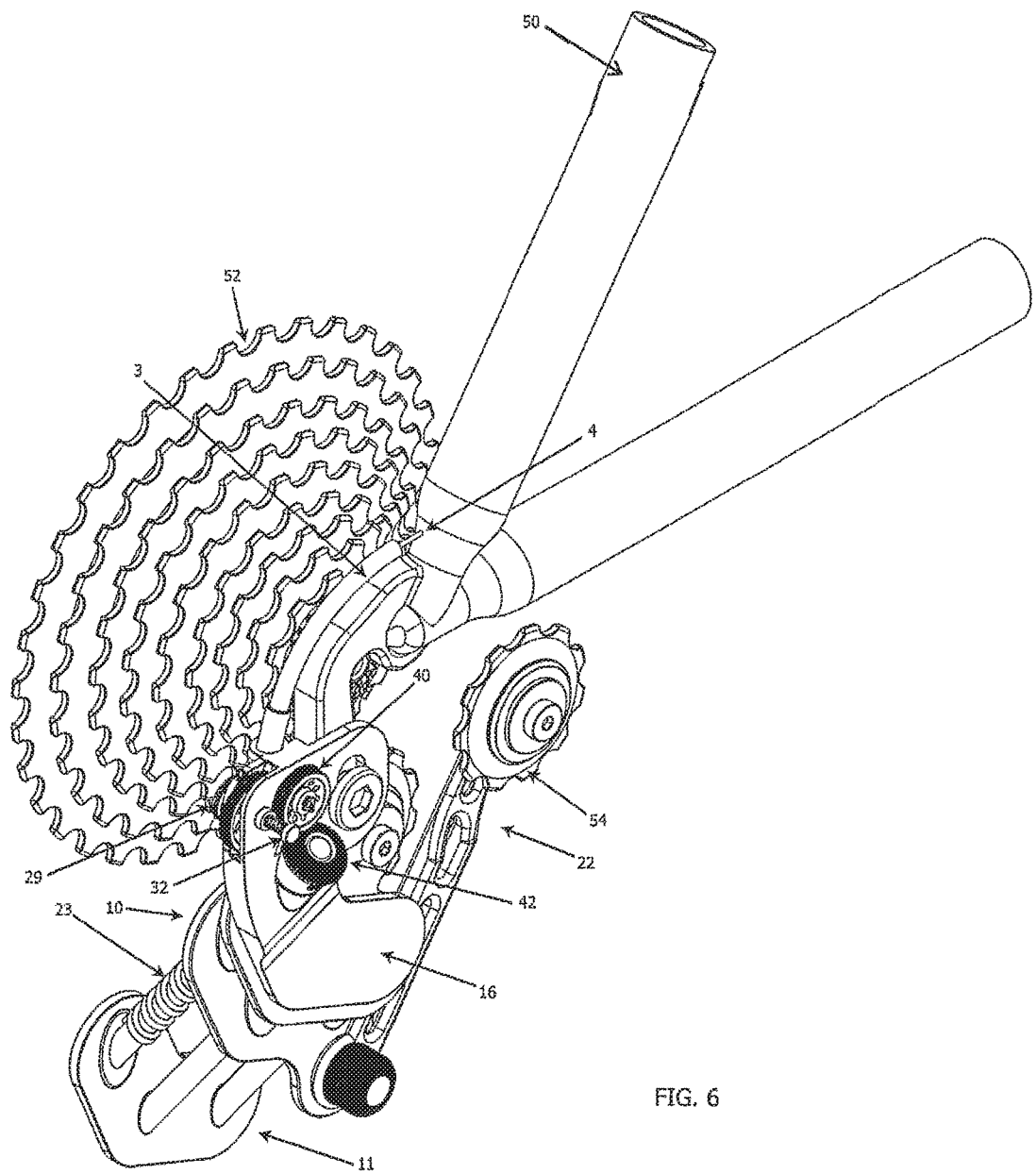
Figure 7A:
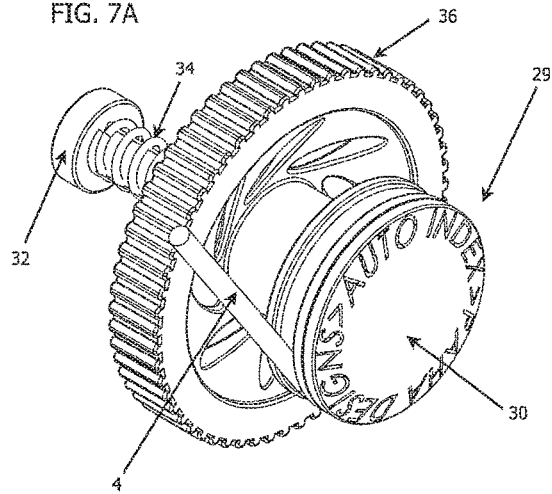
Figure 7B:
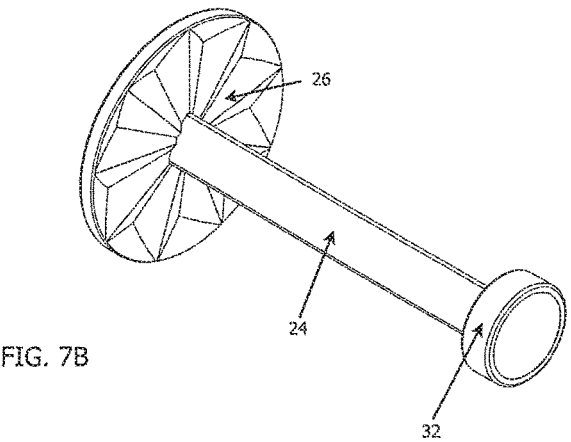
Figure 7C:
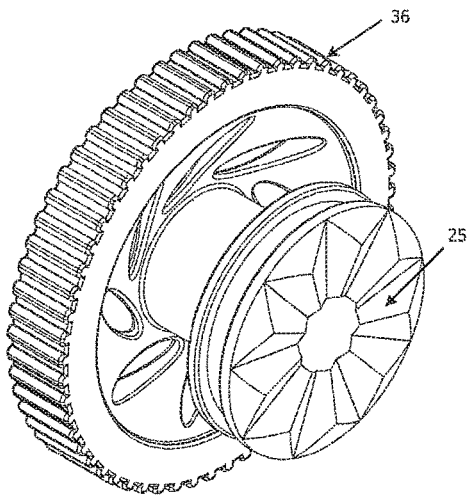
Figure 8:
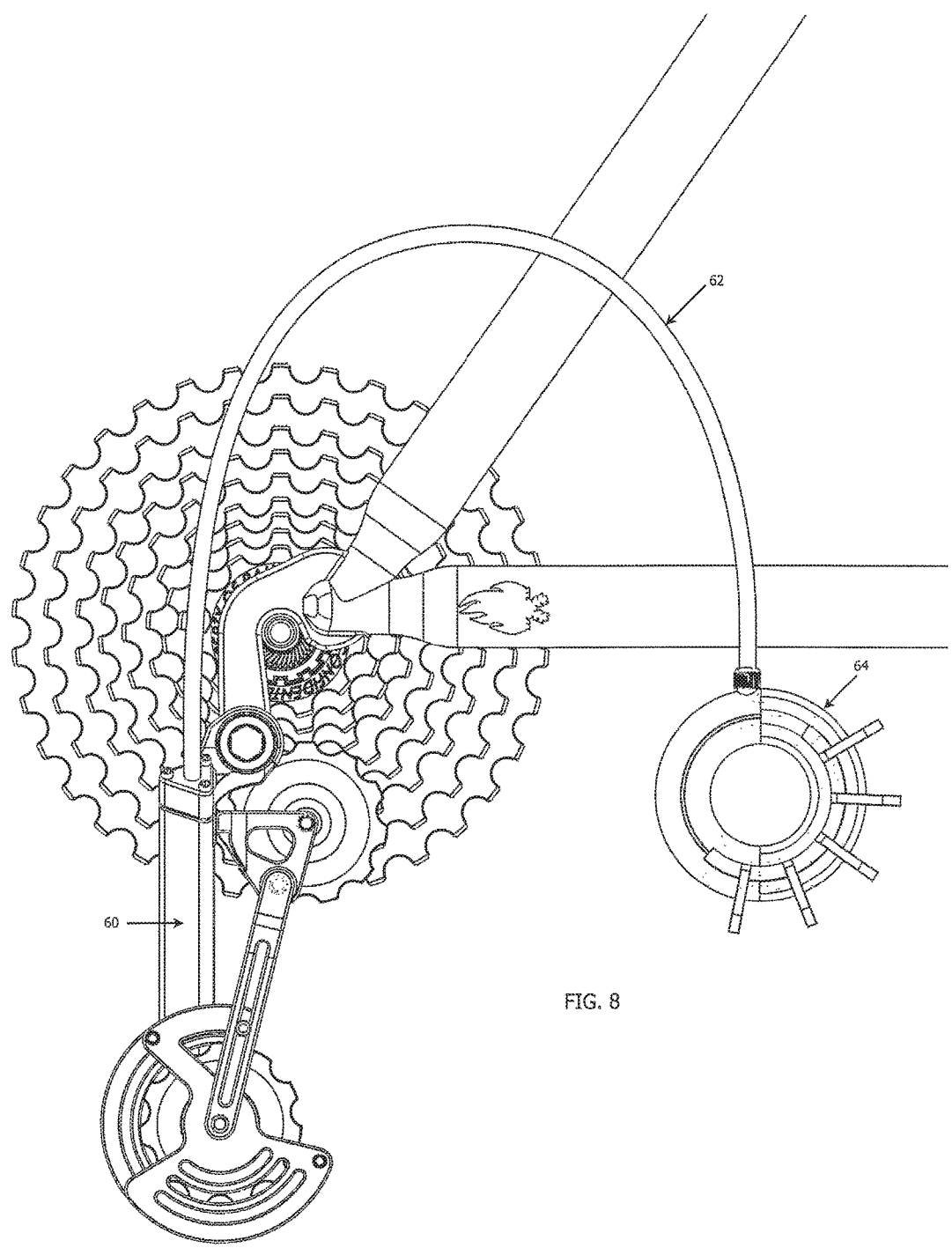
Figure 9:
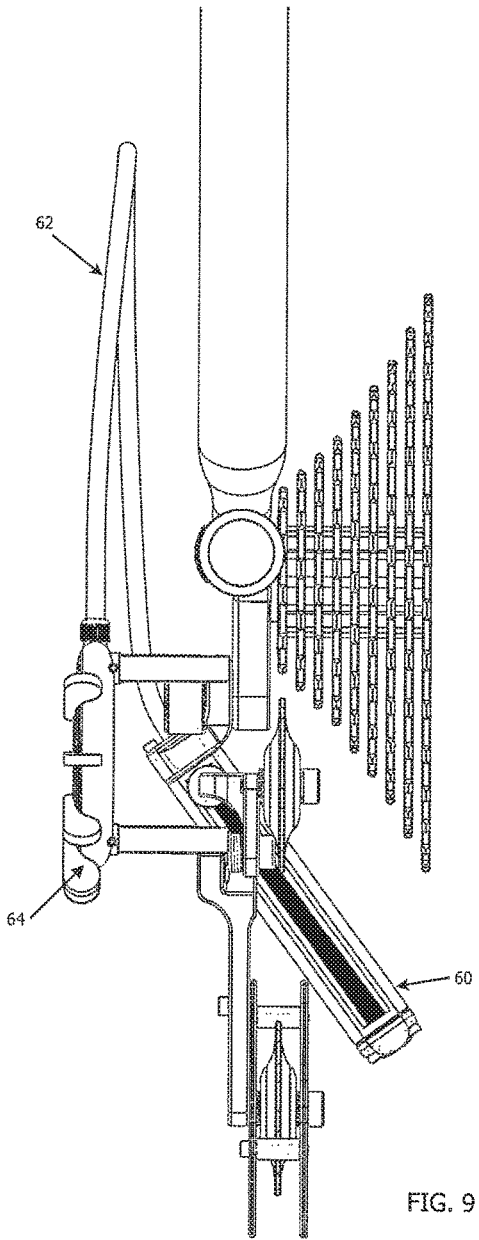
Figure 10:
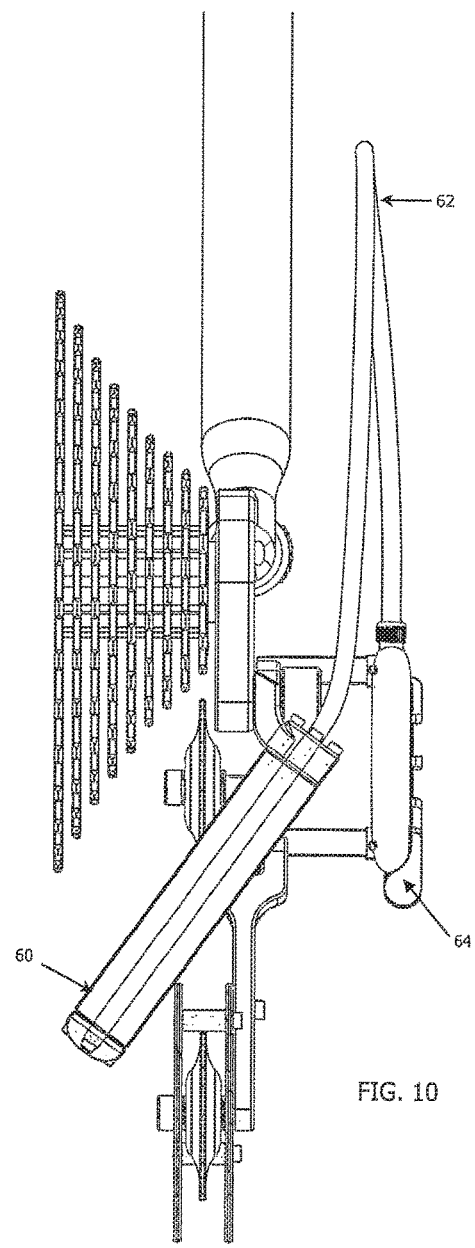
Figure 11:
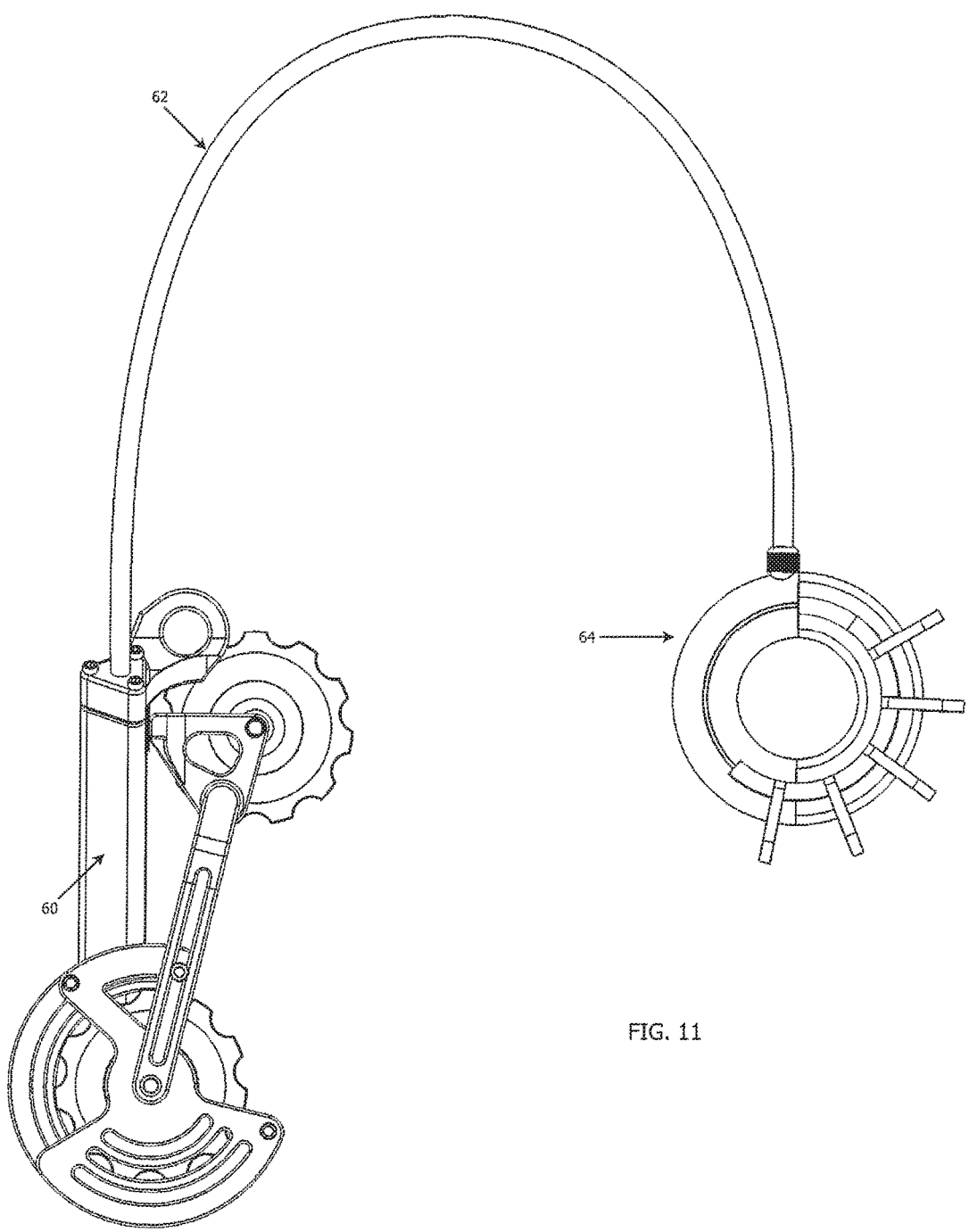
Figure 12:
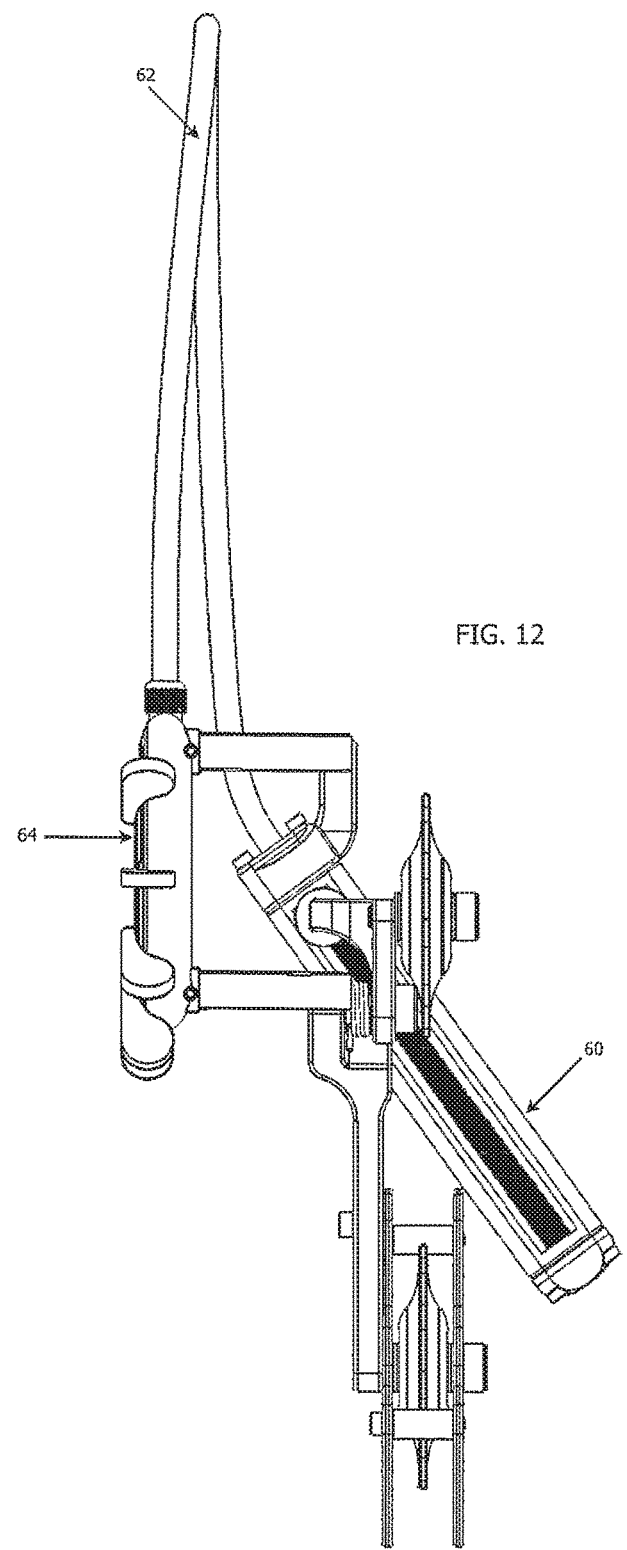
Figure 13A:
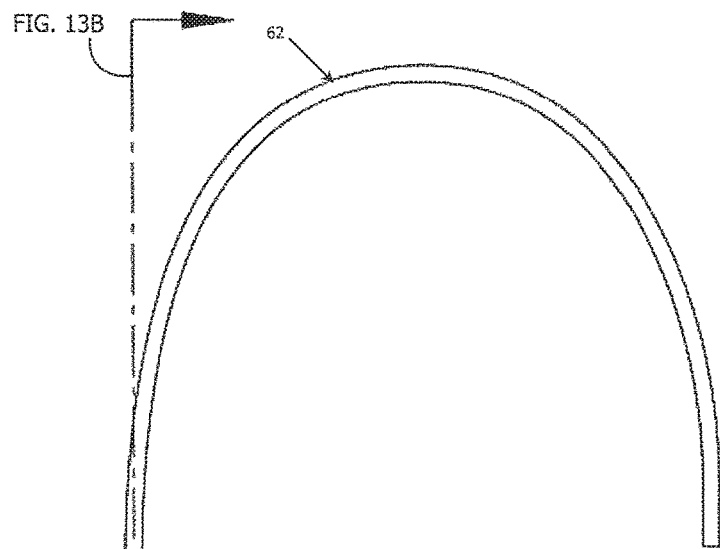
Figure 13B:
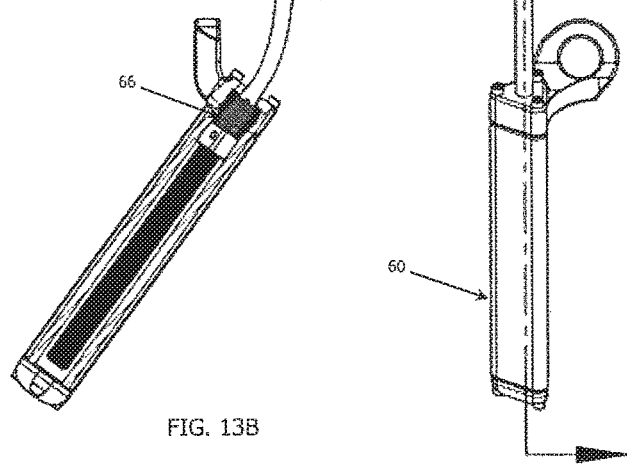
Figure 16C:
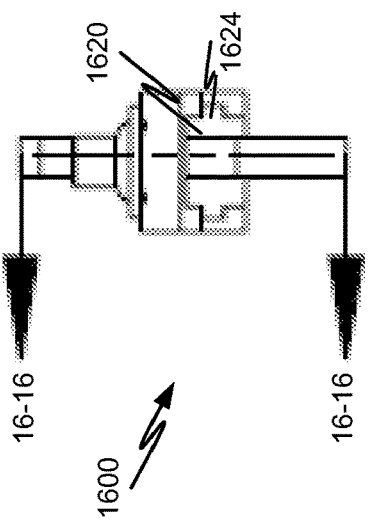
Figure 16D:
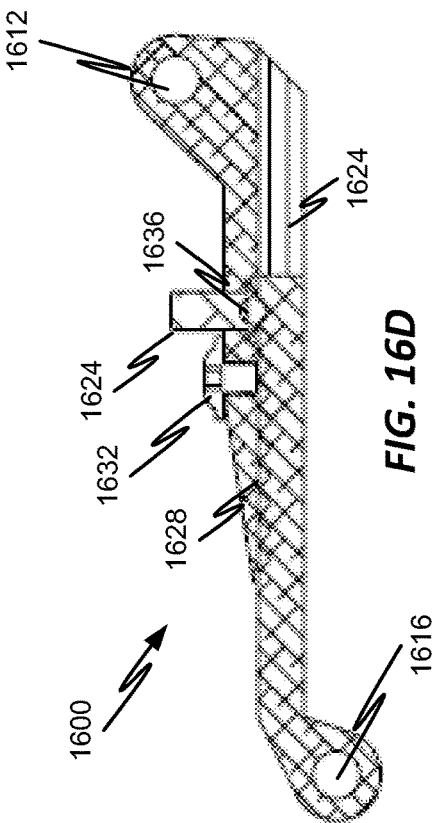
Figure 16A:
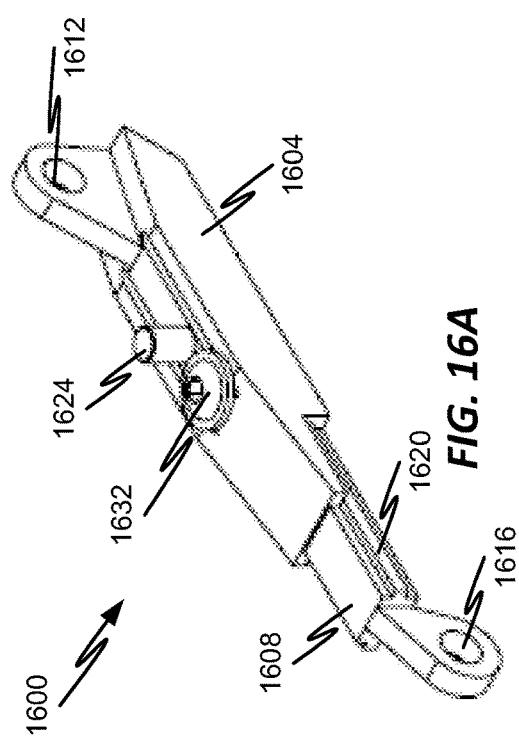
Figure 16B:
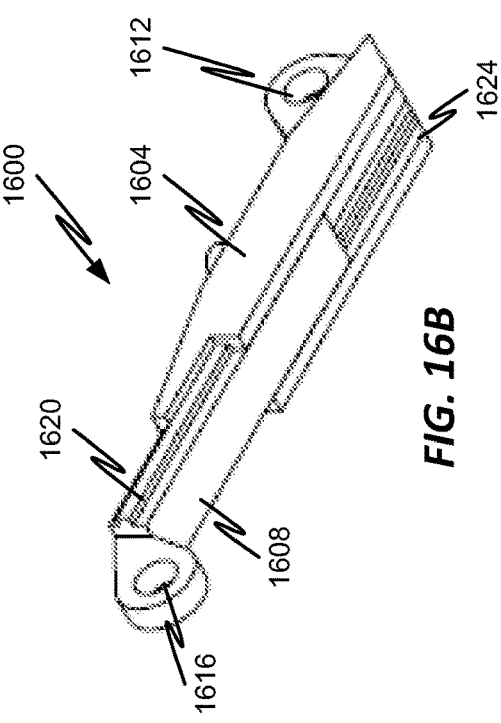
Figure 18B:
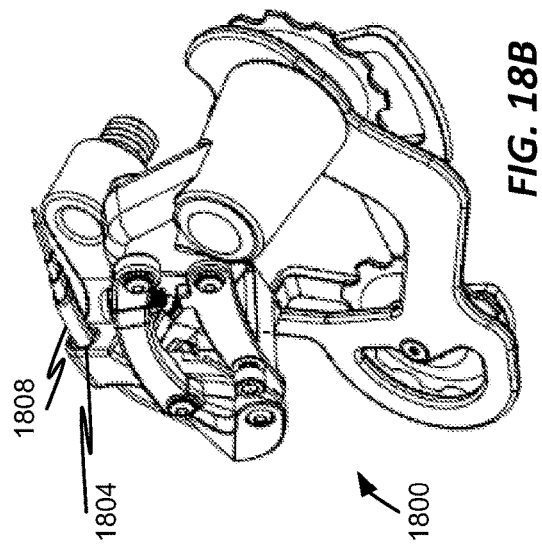
Figure 18C:
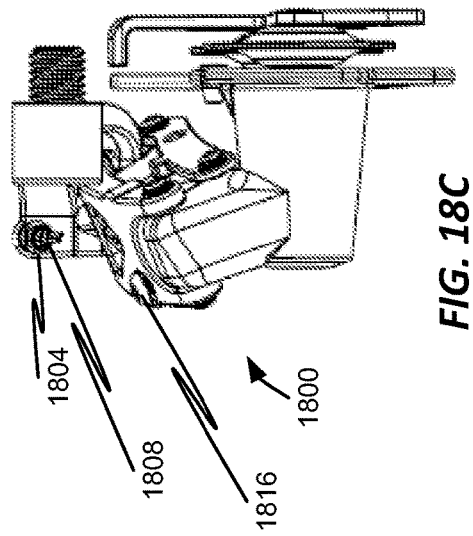
Figure 18A:
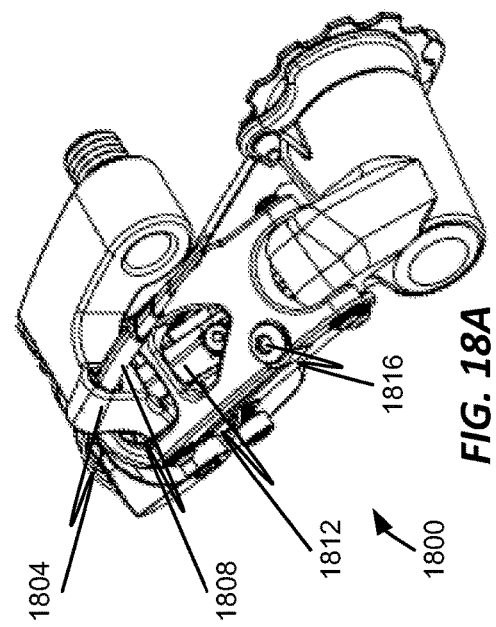
Figure 19B:
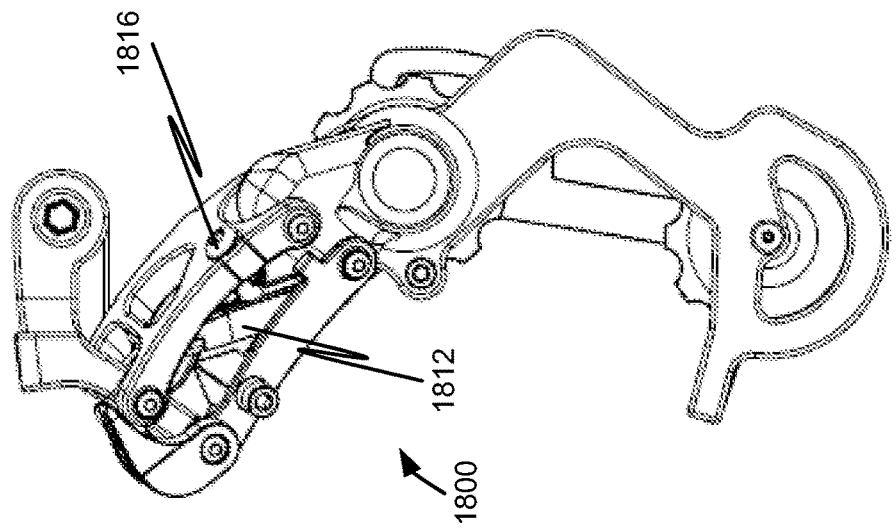
Figure 19A:
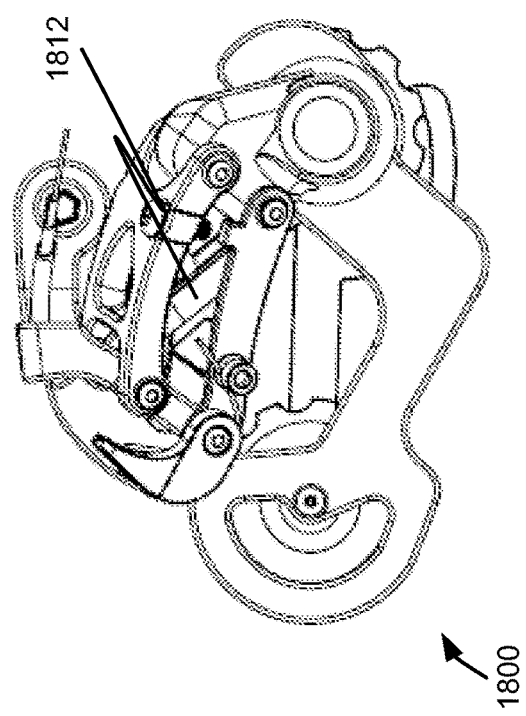
Figure 21C:
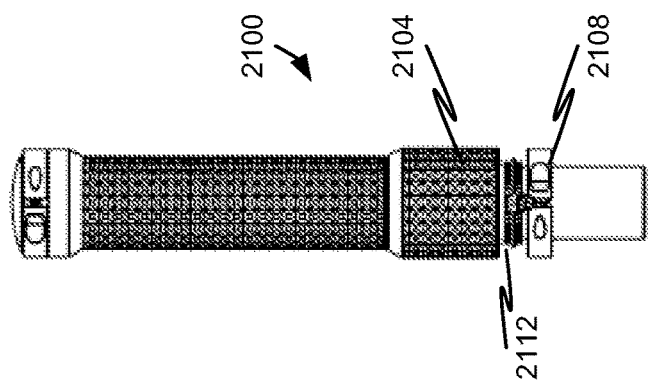
Figure 21A:
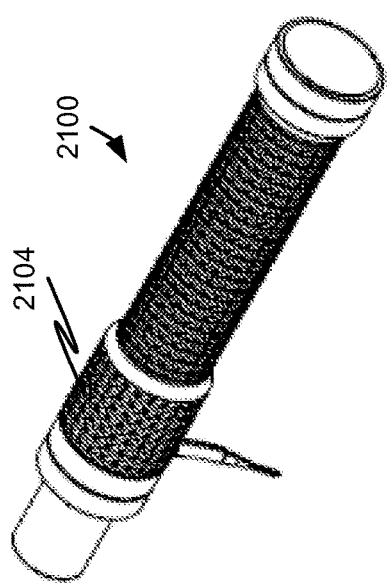
Figure 21B:
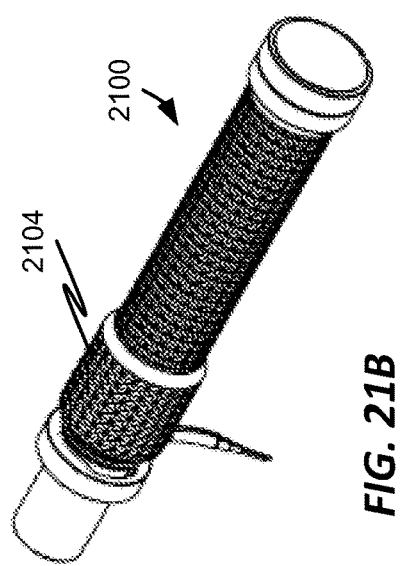
Figure 24A:
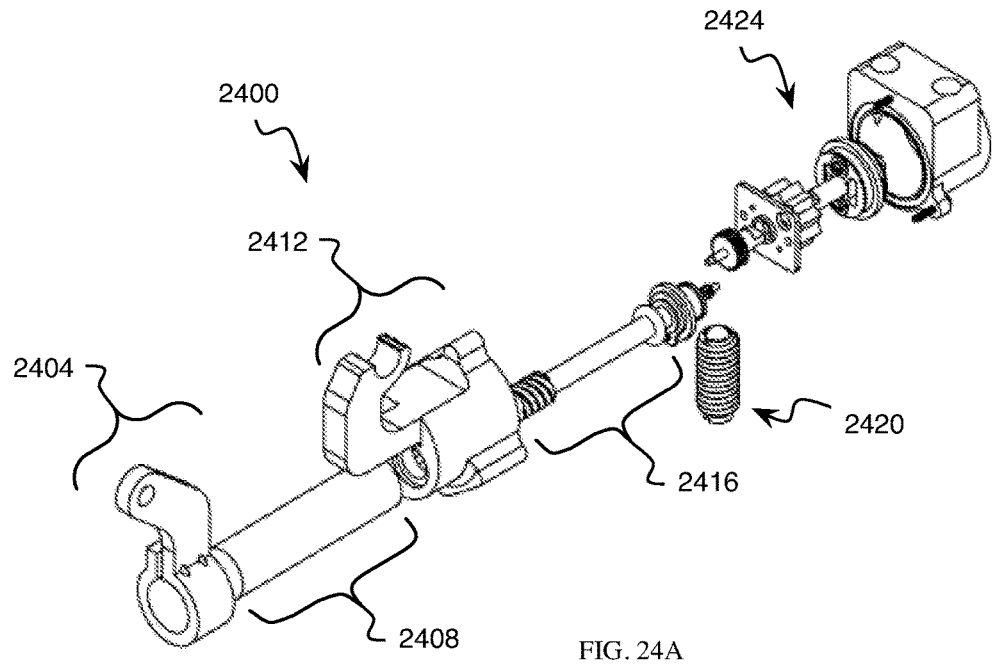
Figure 24B:
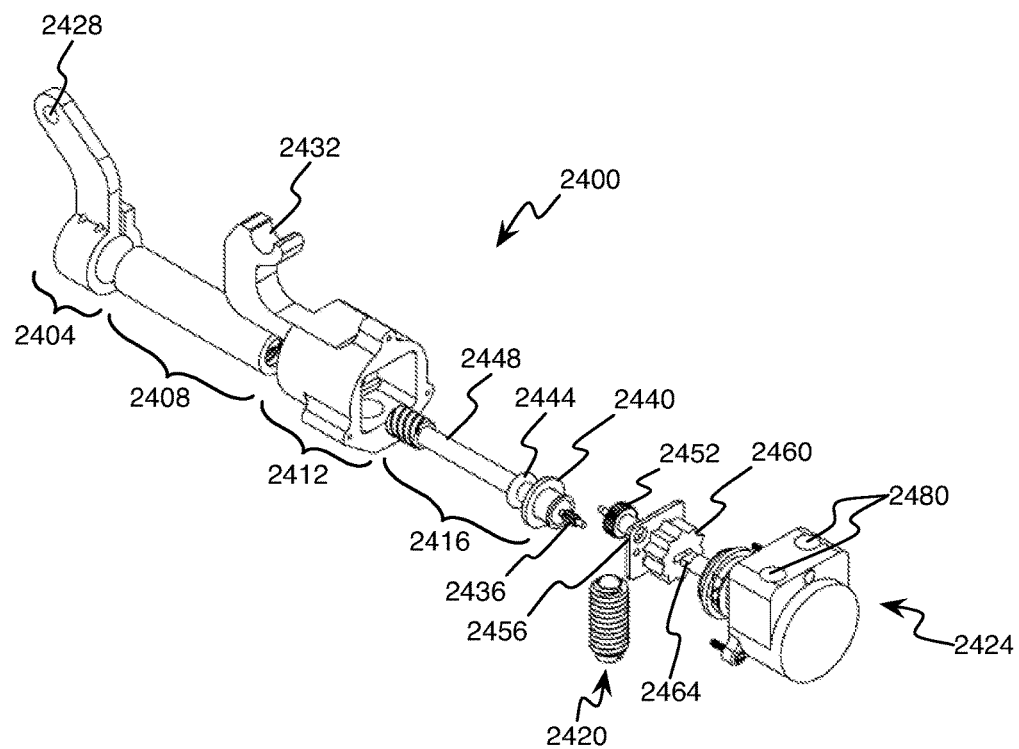
Figure 24C:
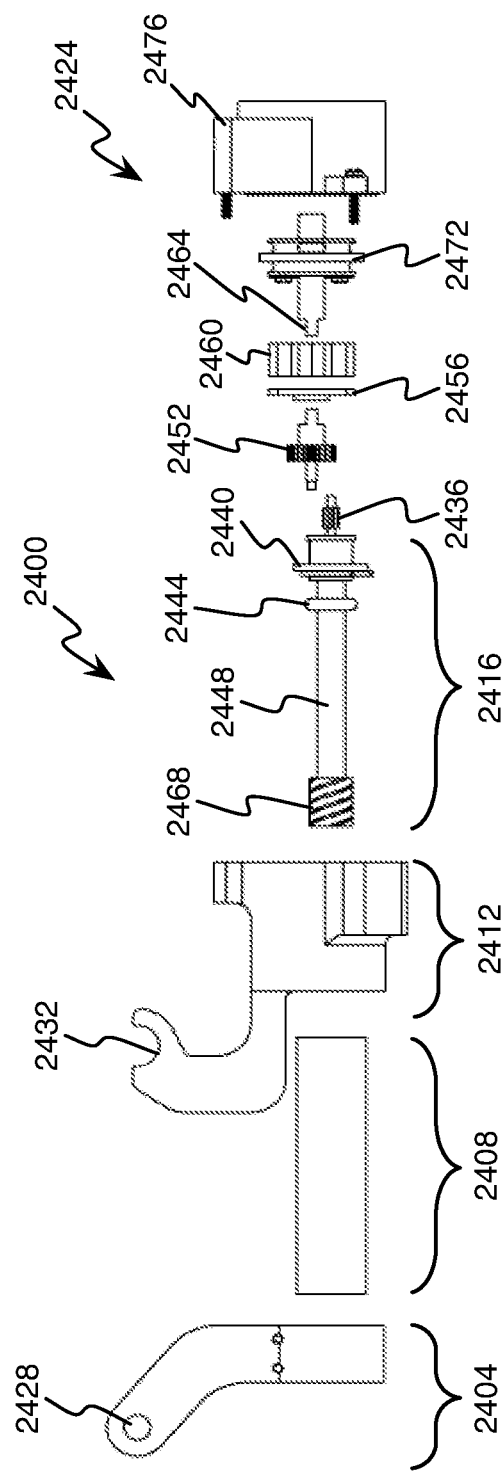
Figure 24D:
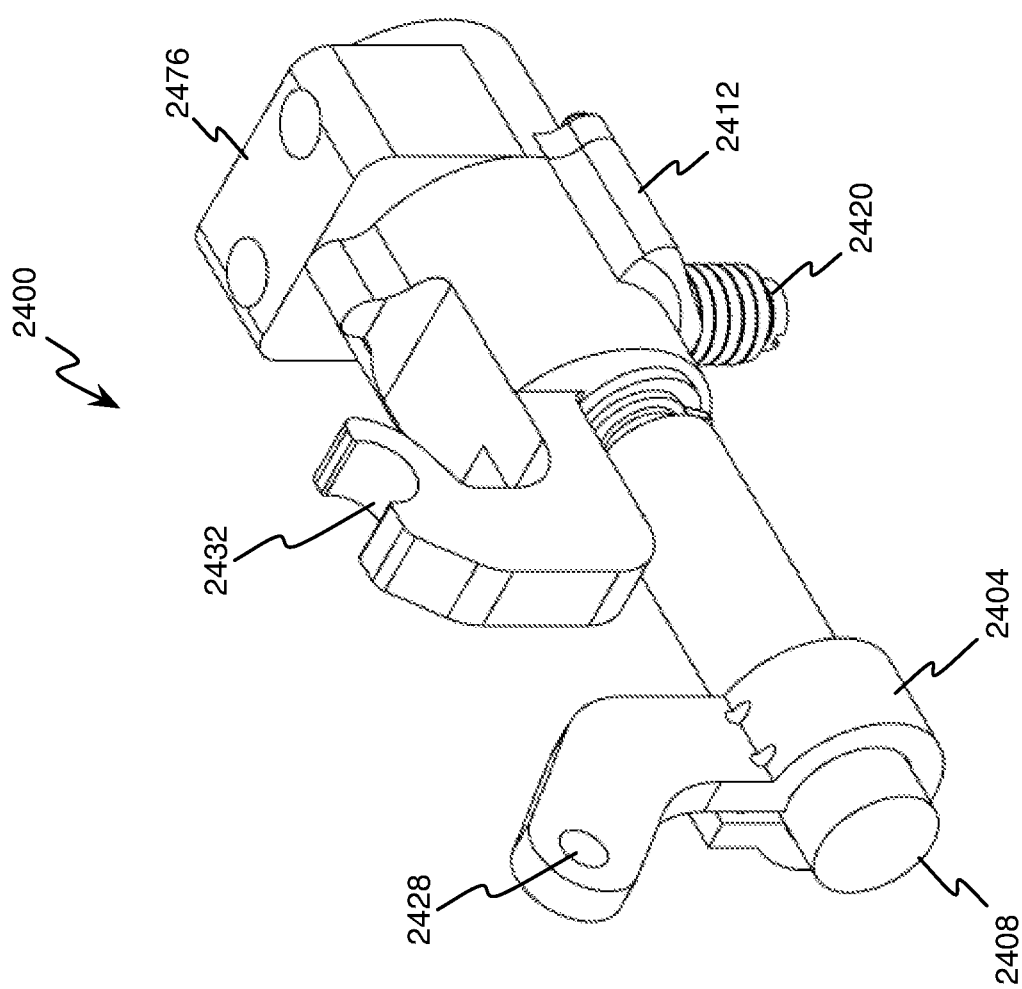
Figure 25A:
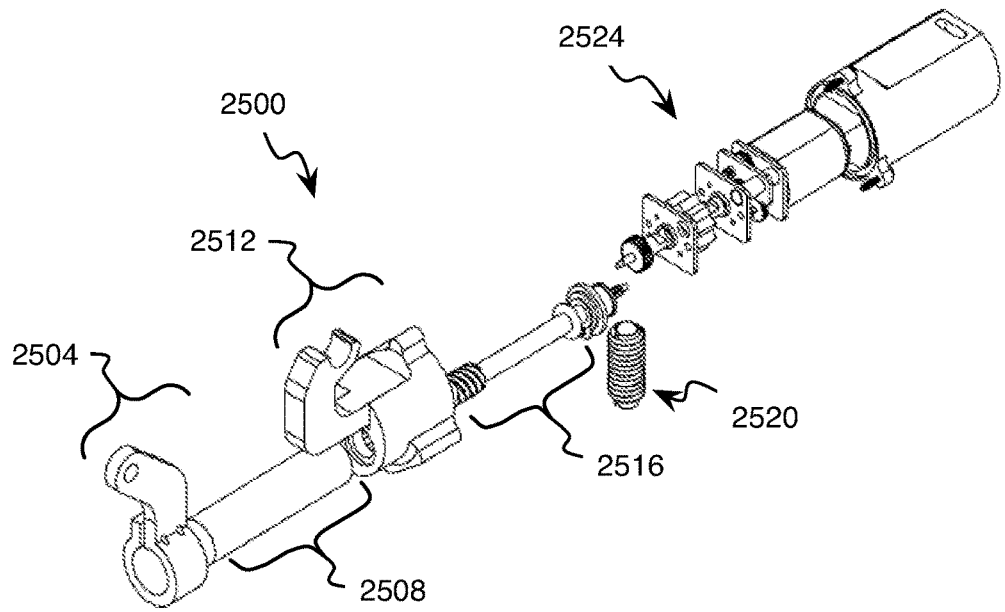
Figure 25B:
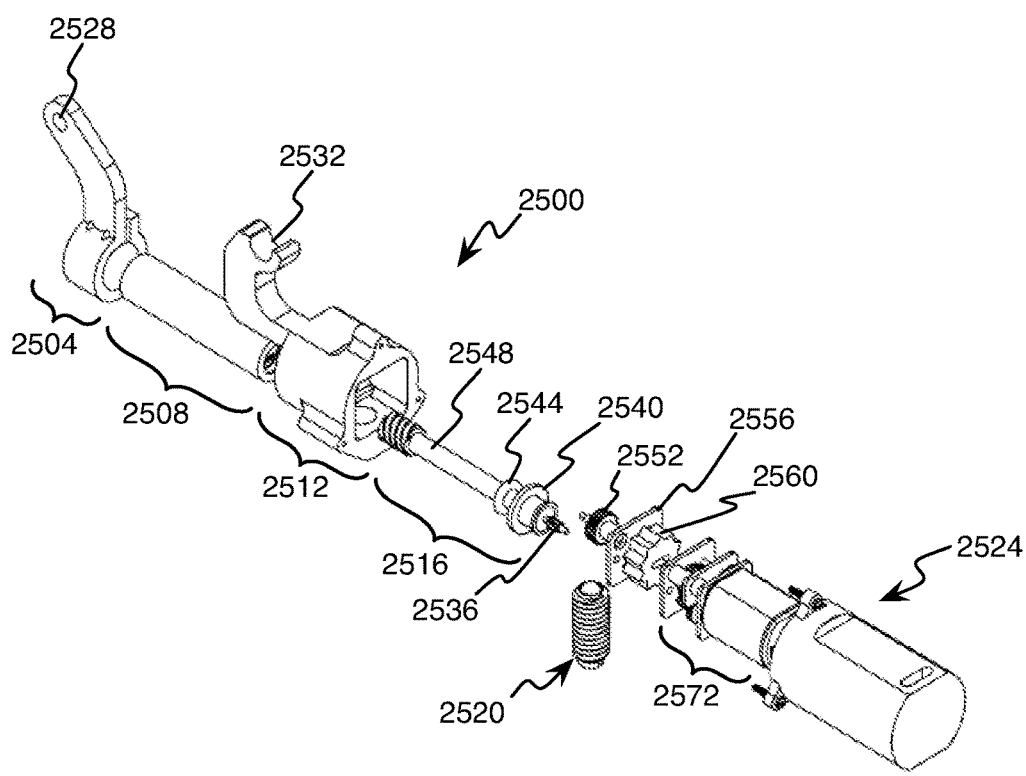
Figure 25C:
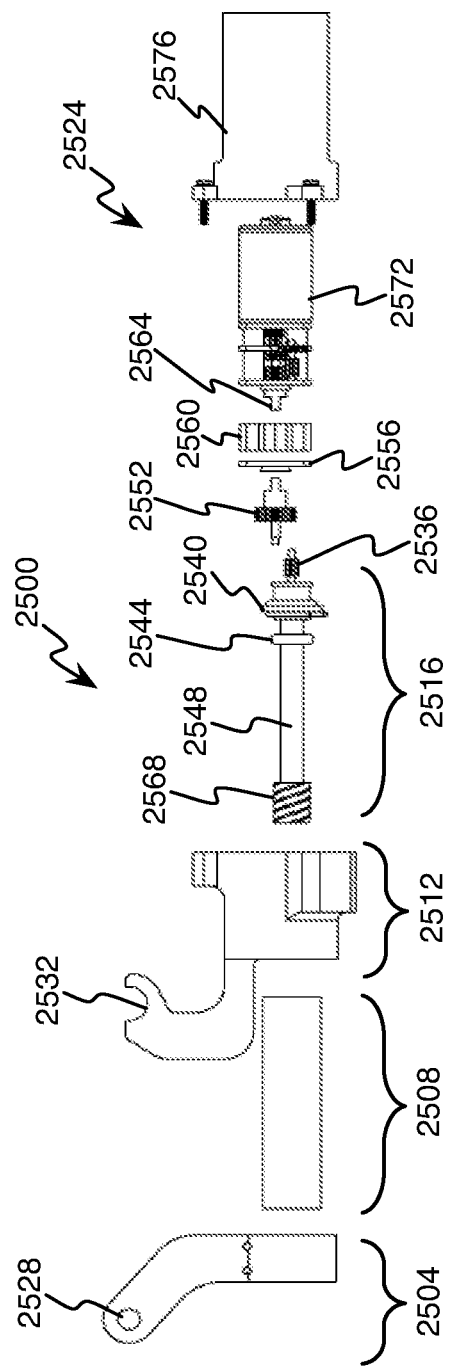
Figure 25D:
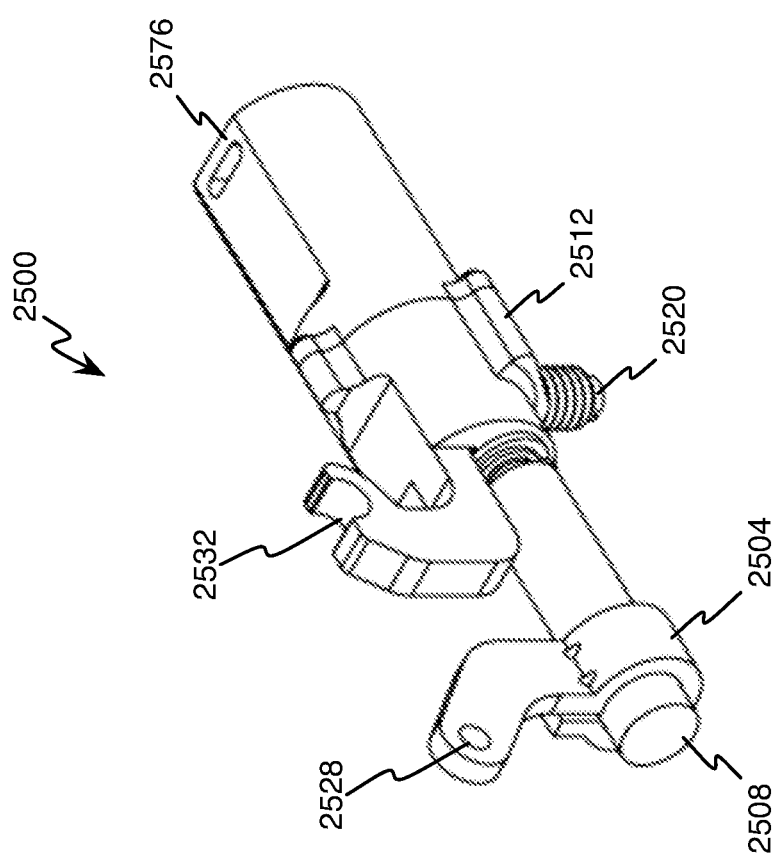
Figure 27B:
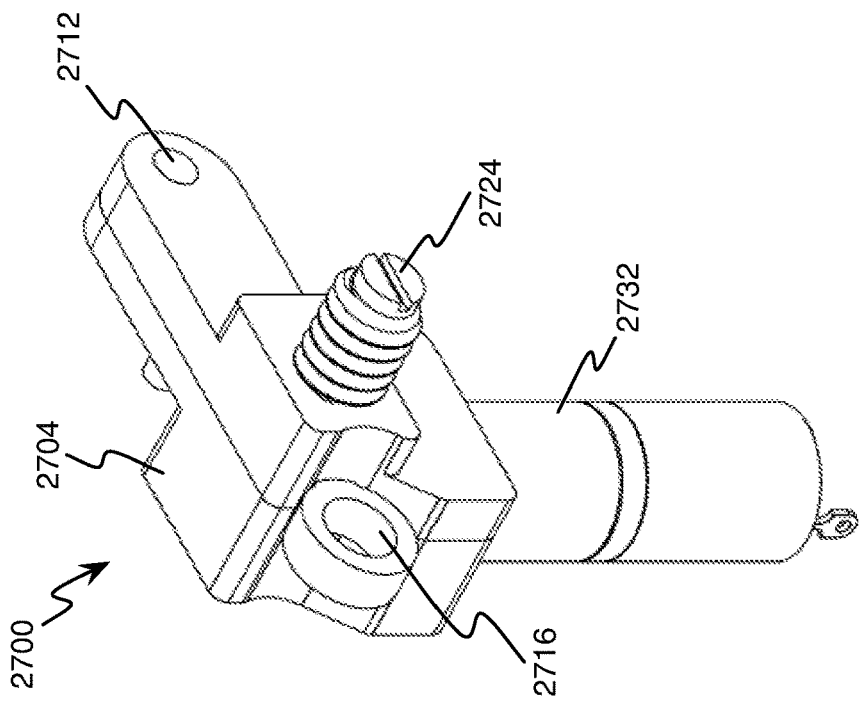
Figure 27A:
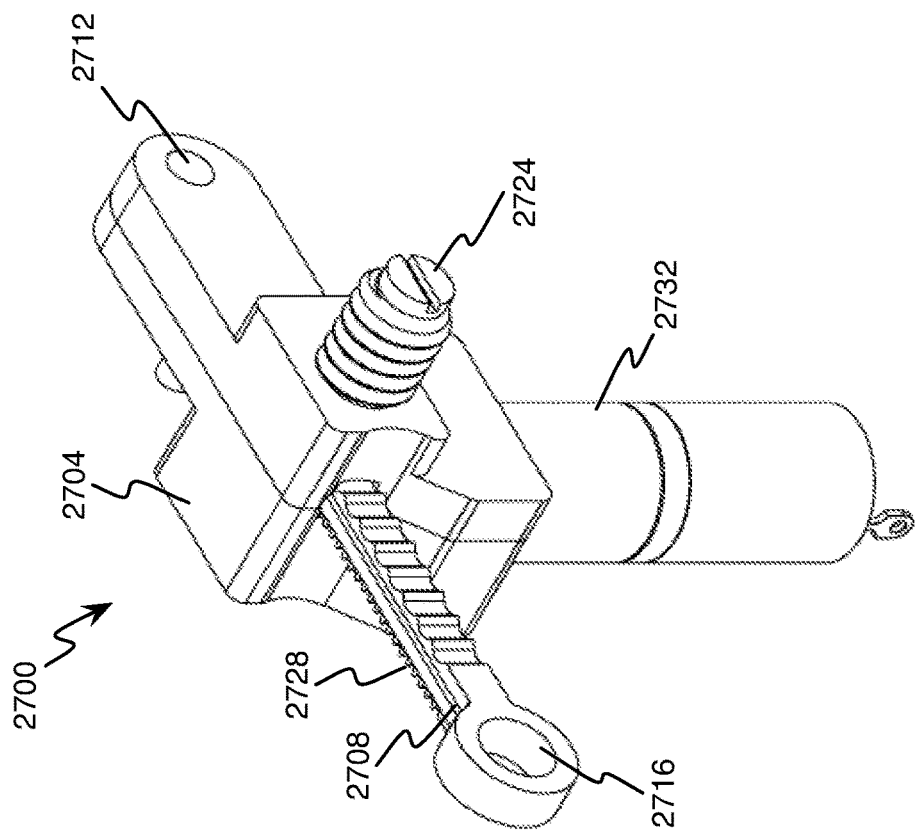
Figure 27C:
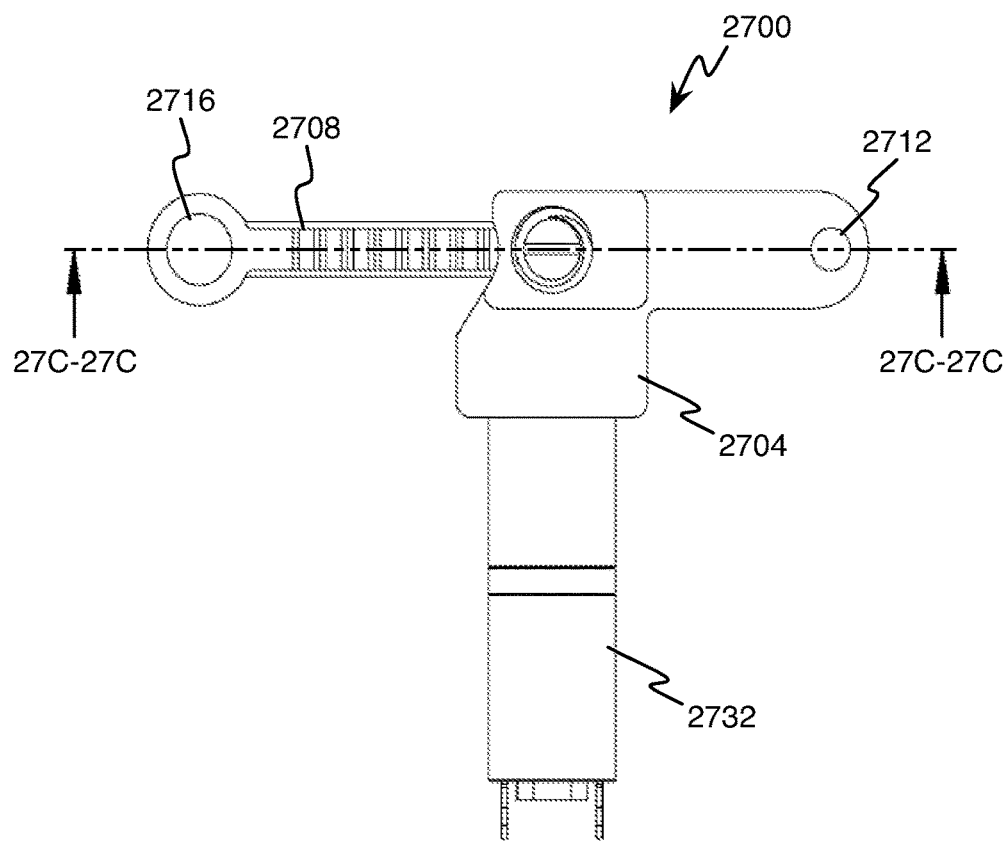
Figure 27D:
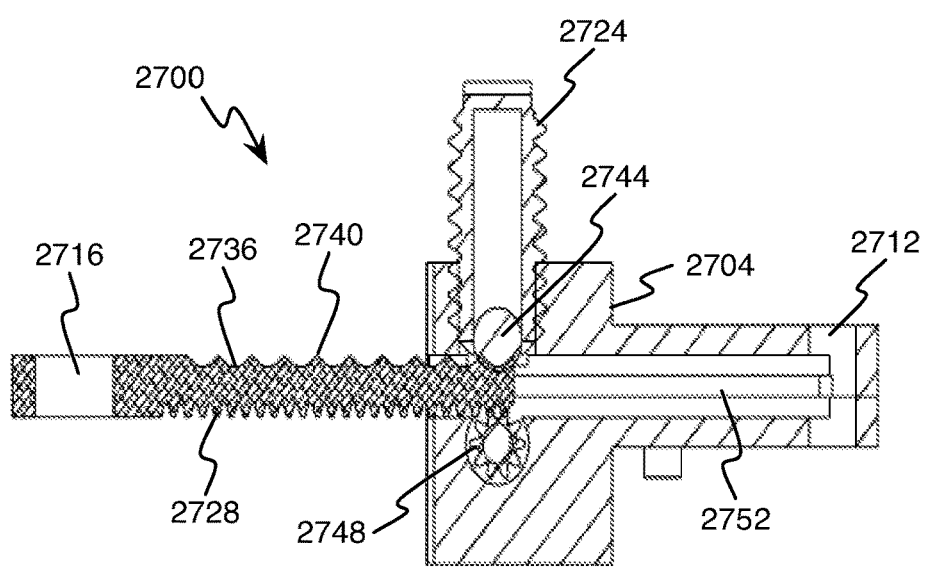
Figure 27E:
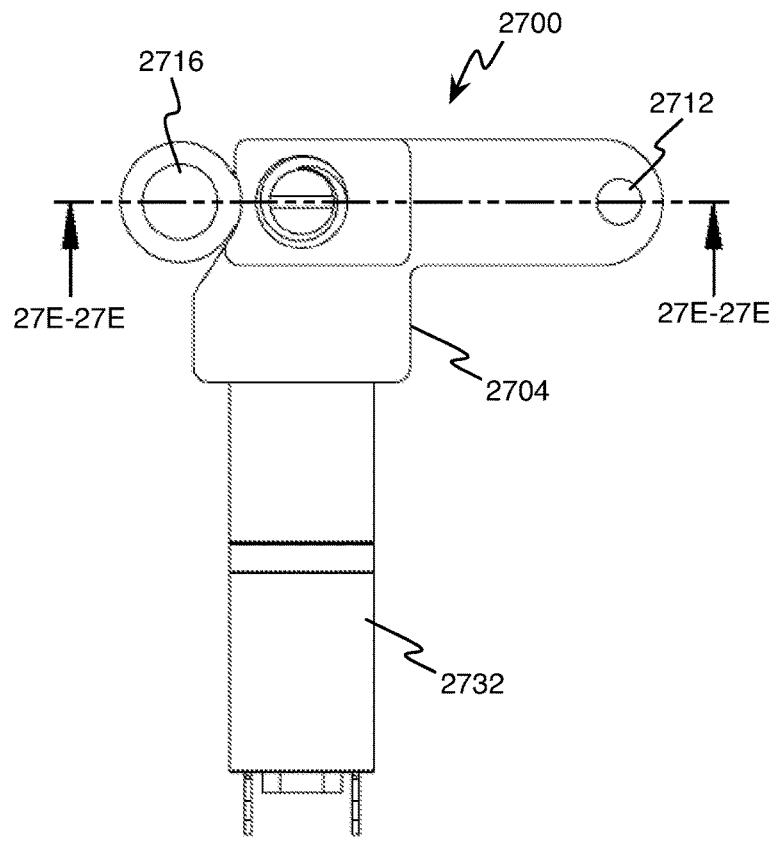
Figure 27F:
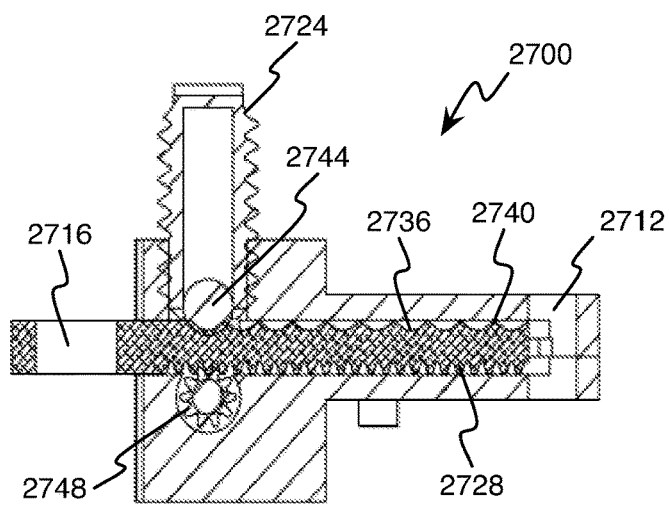
Figure 28:
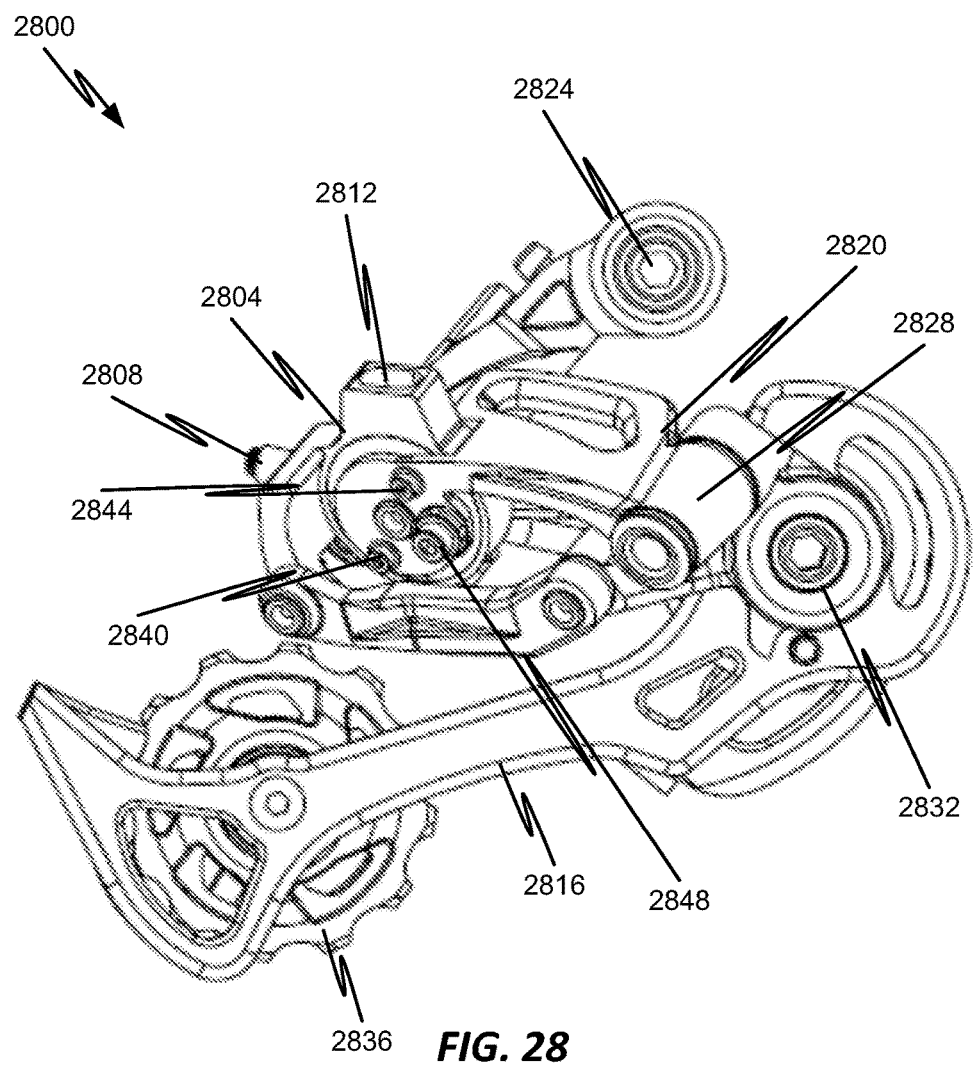
Figure 29B:
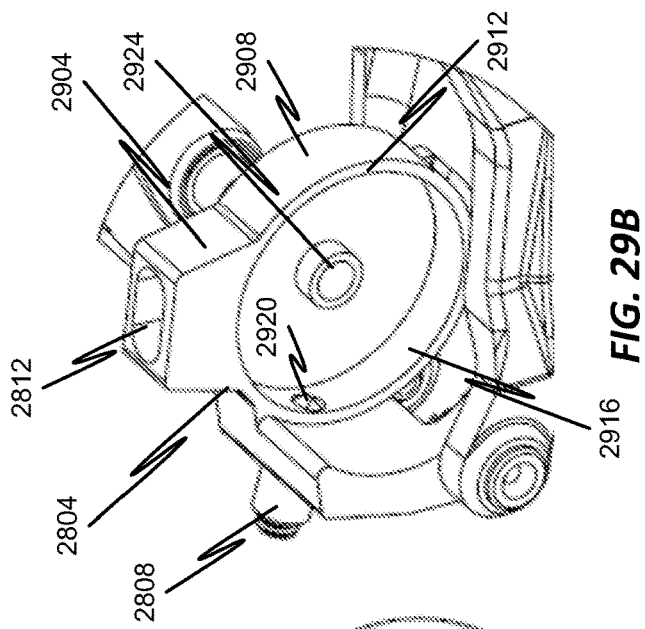
Figure 29A:
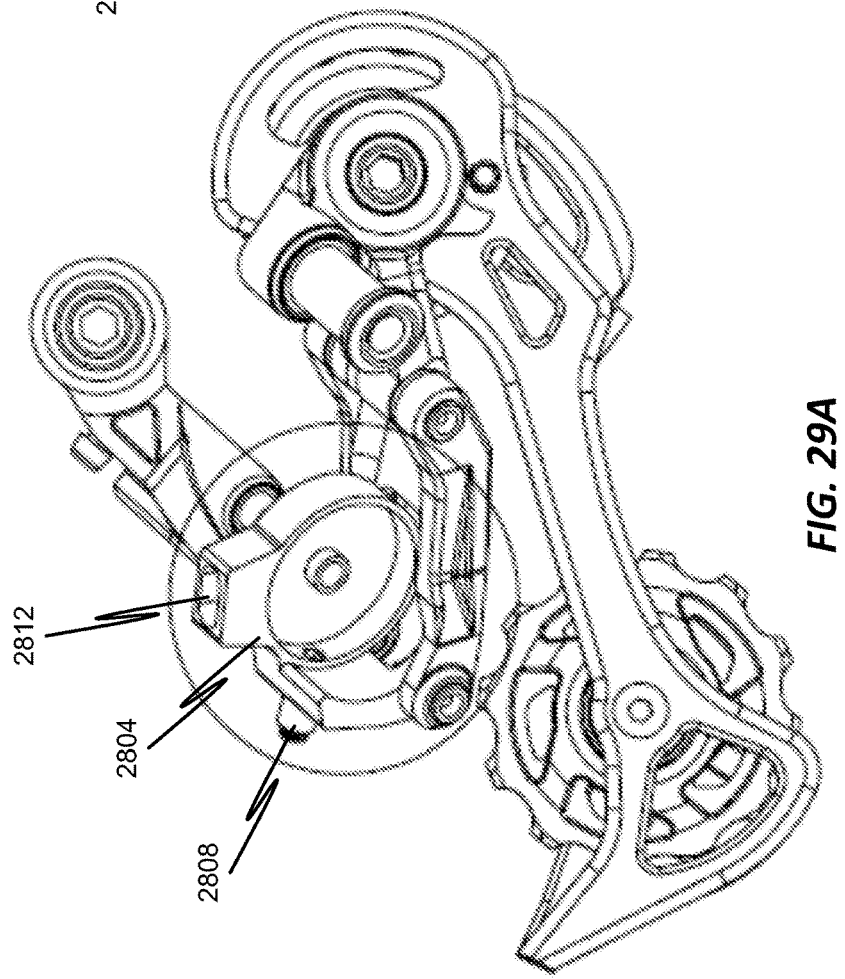
Figure 31A:
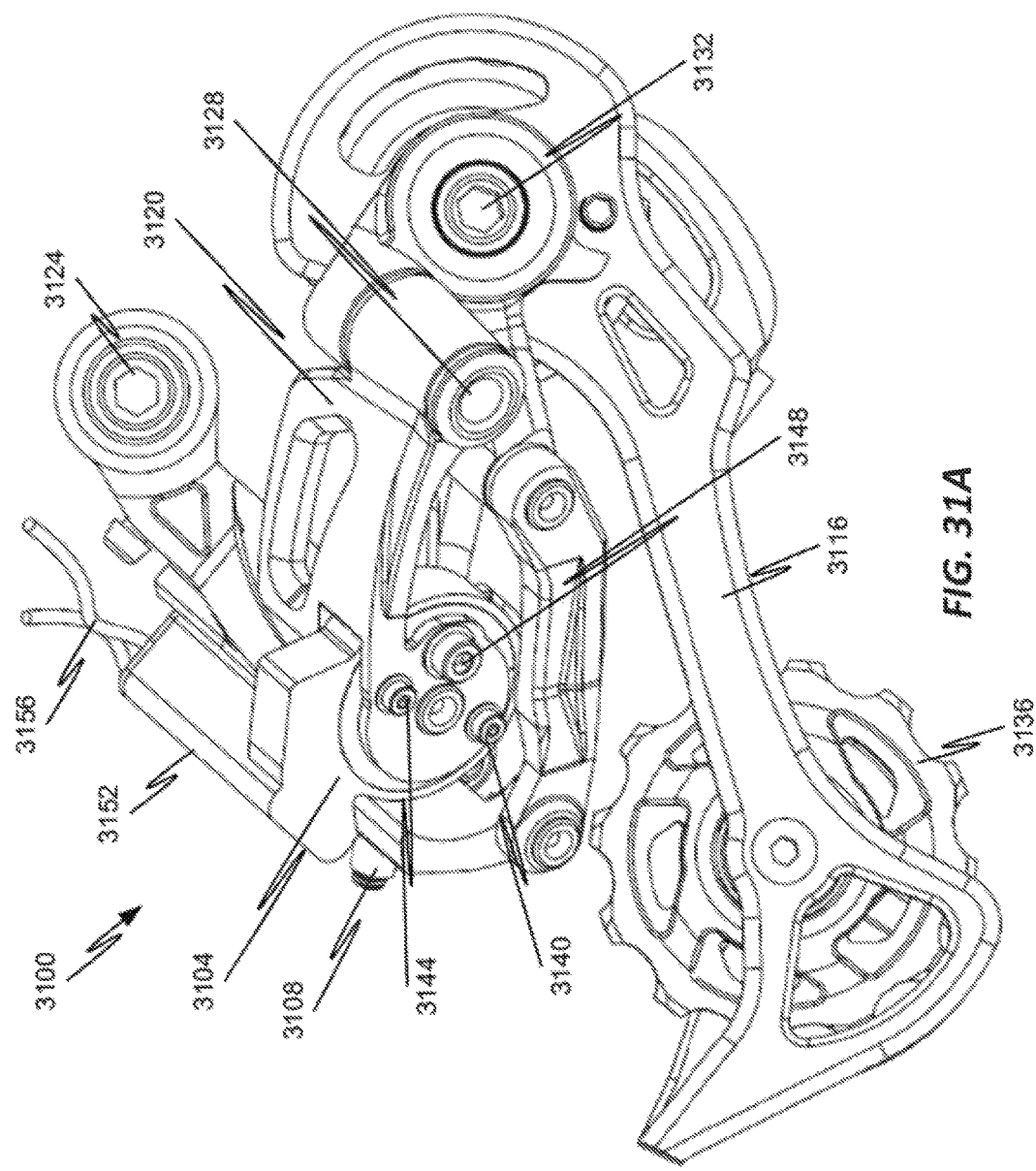
Figure 32A:
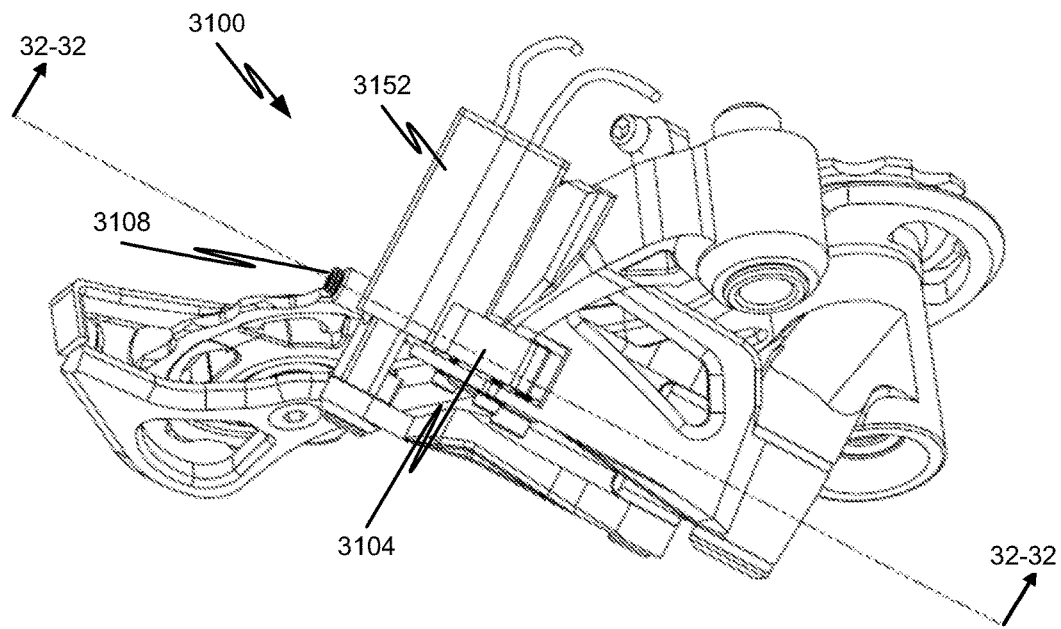
Figure 32B:
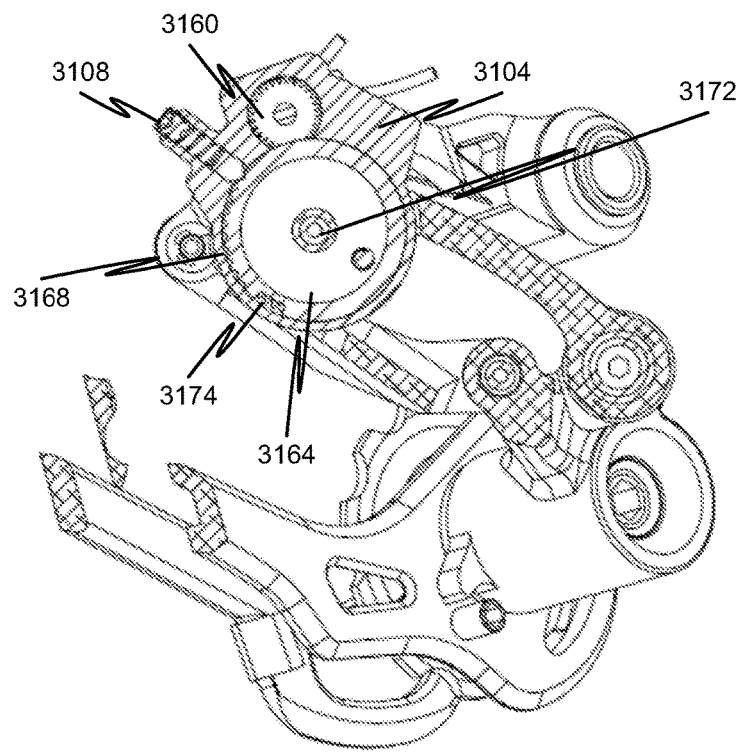
Figure 33B:
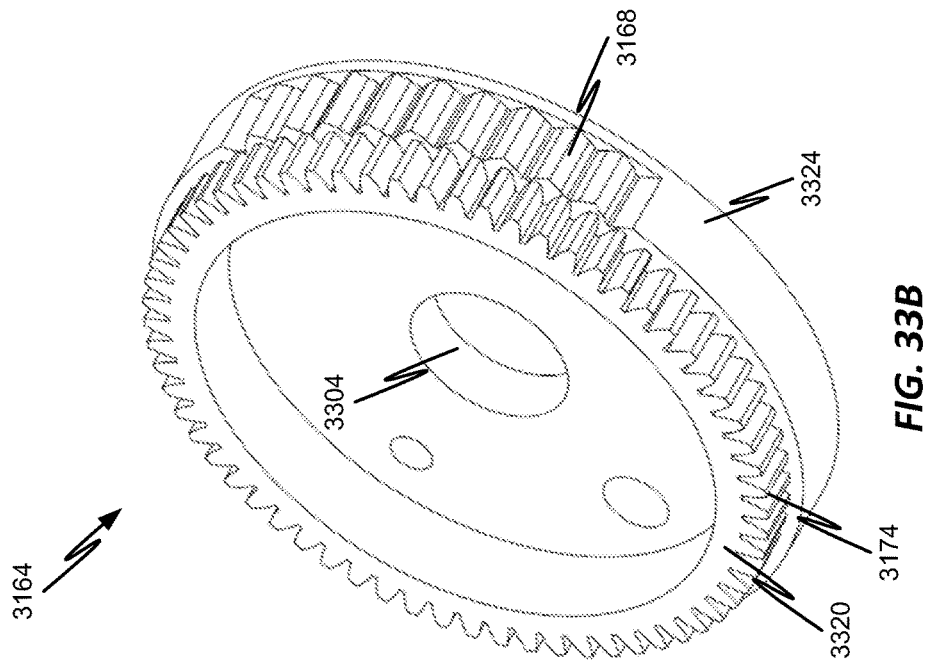
Figure 33A:
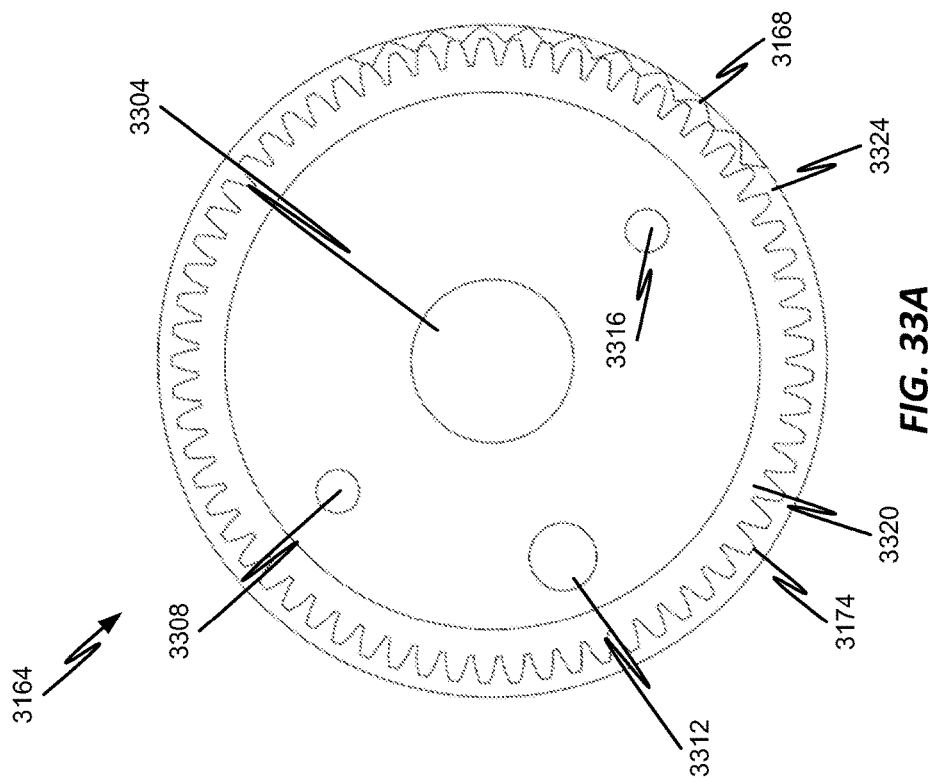
Figure 34:
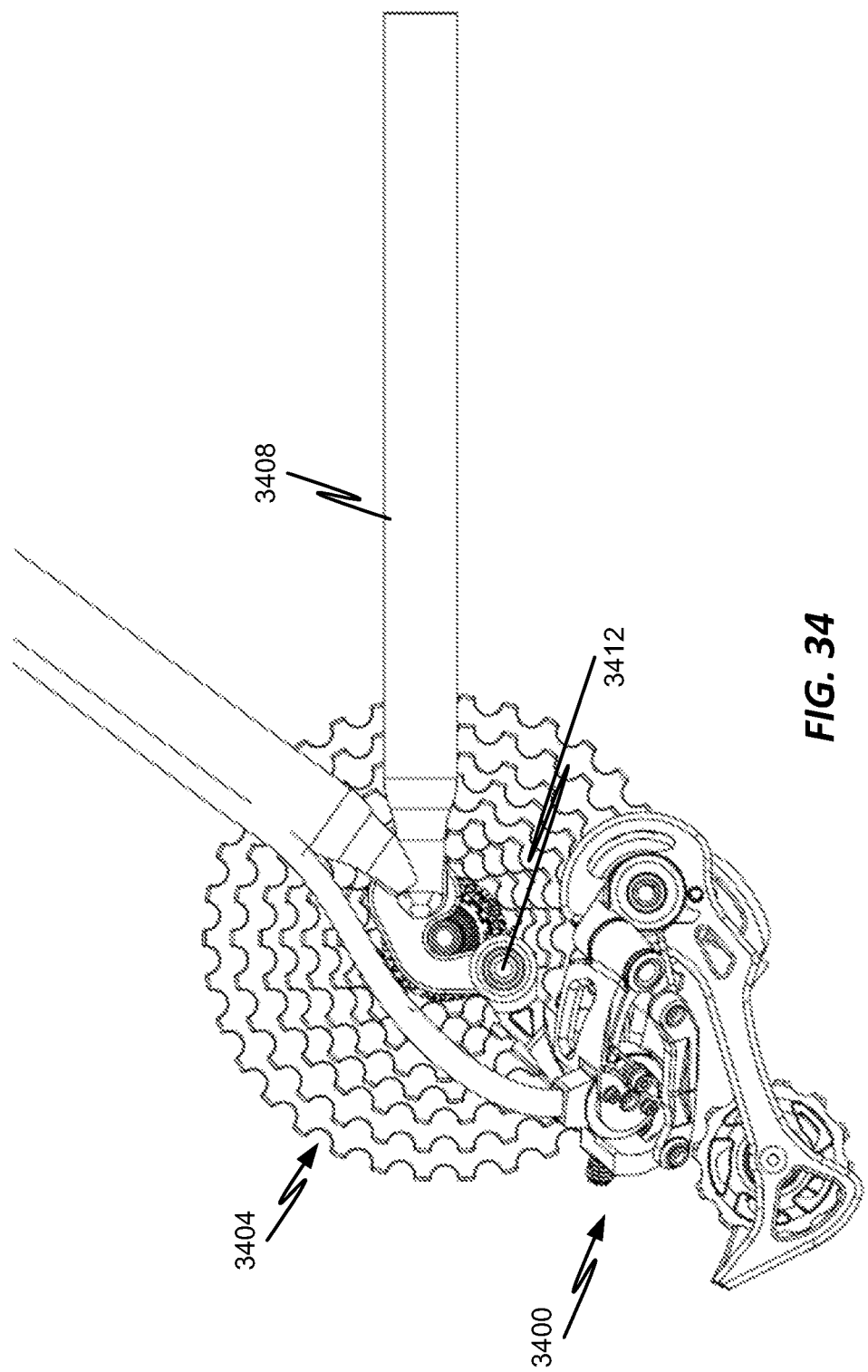
Figure 35:
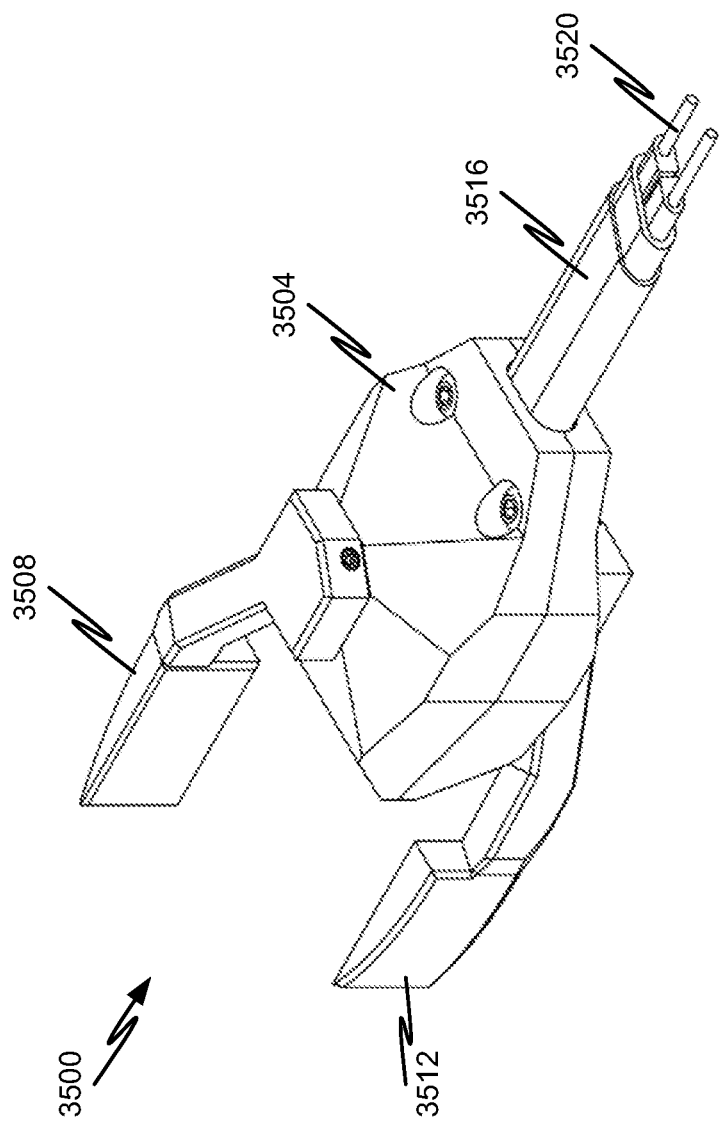
Figure 38A:
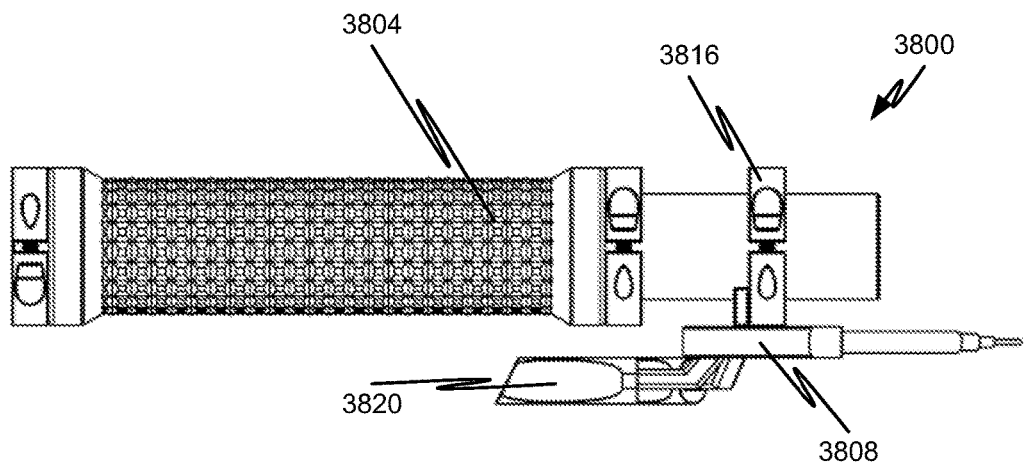
Figure 38B:
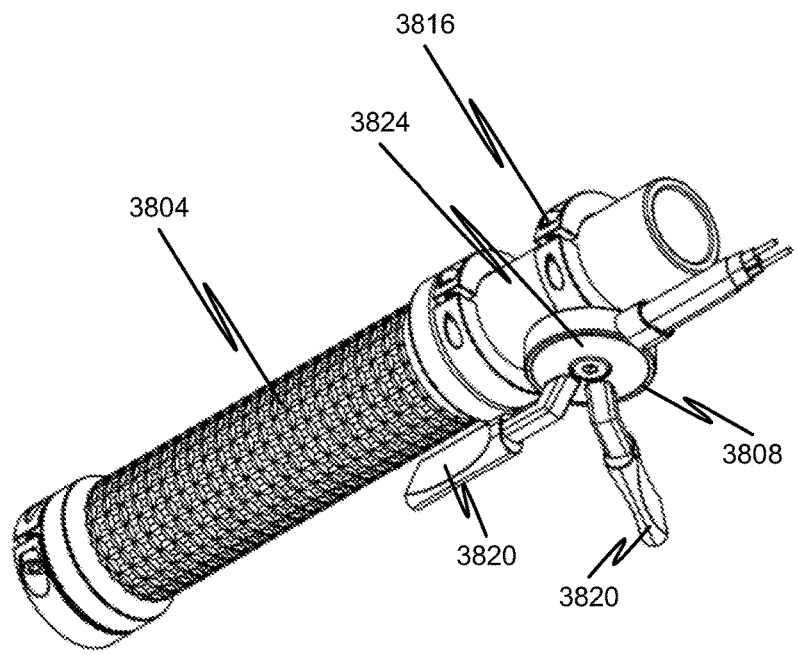
Figure 39A:
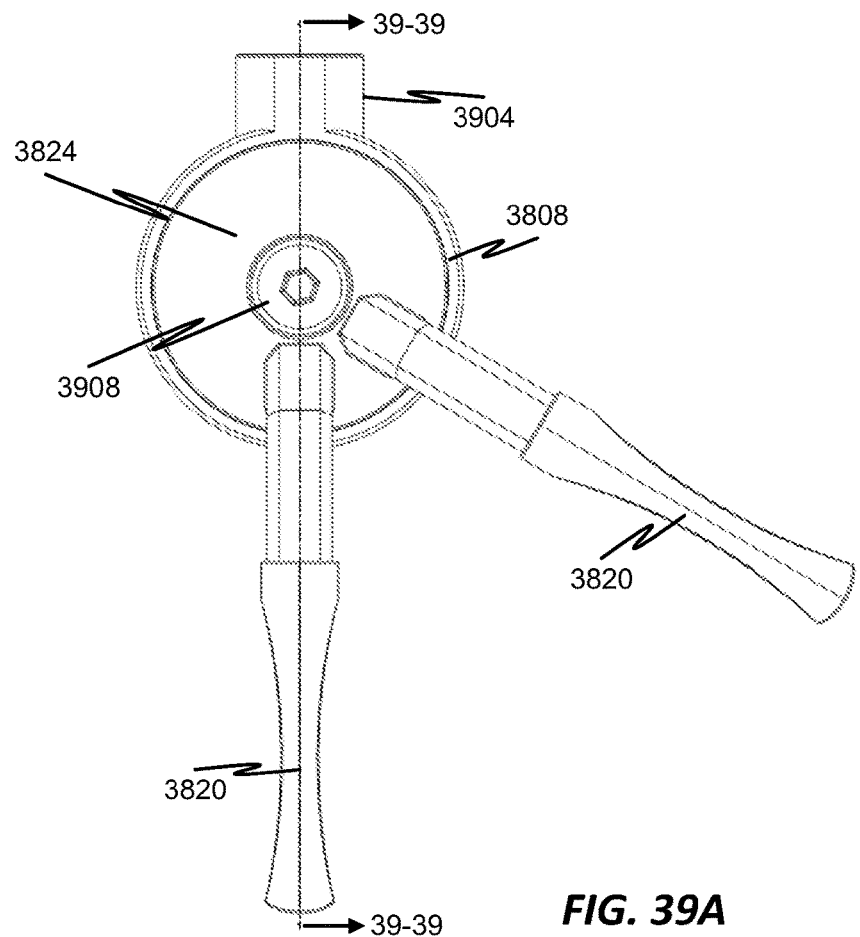
Figure 39B:
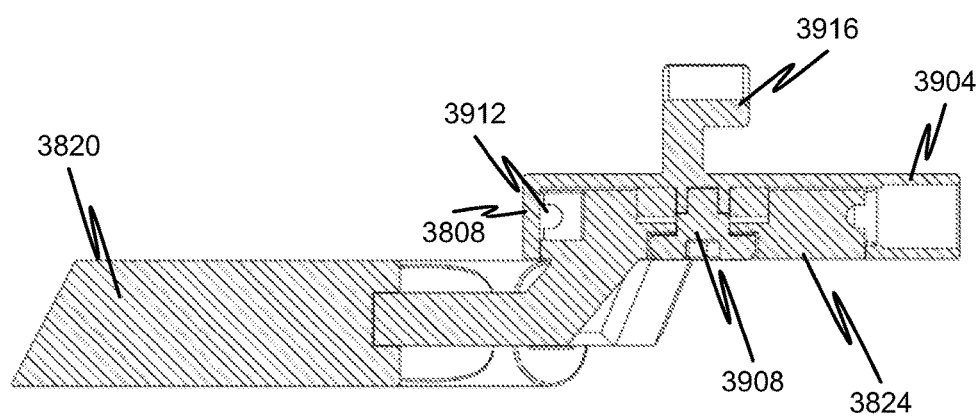
Figure 40:
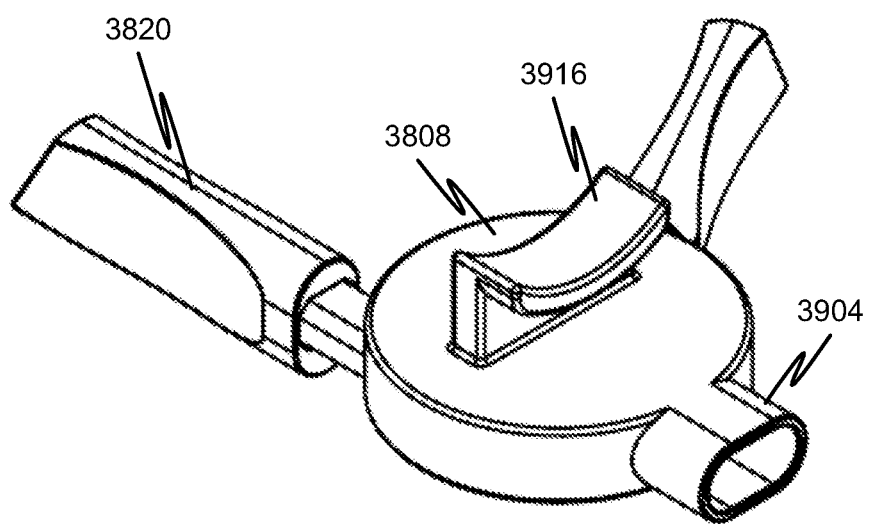
Figure 41A:
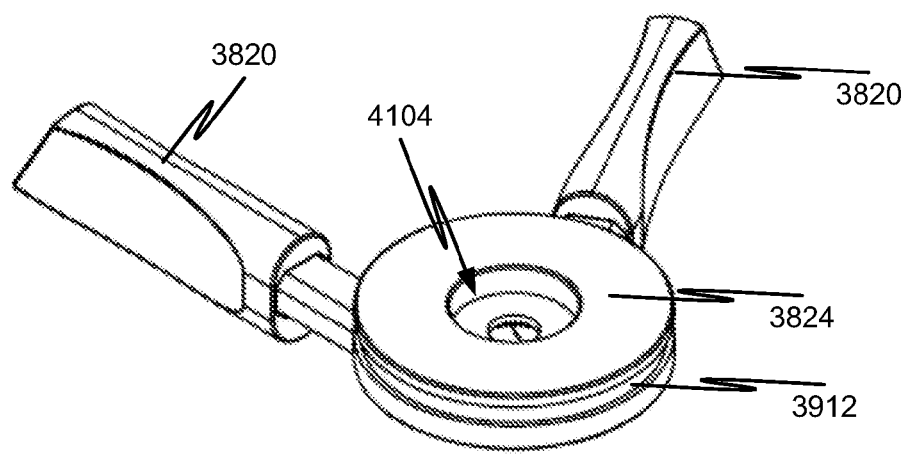
Figure 41B:
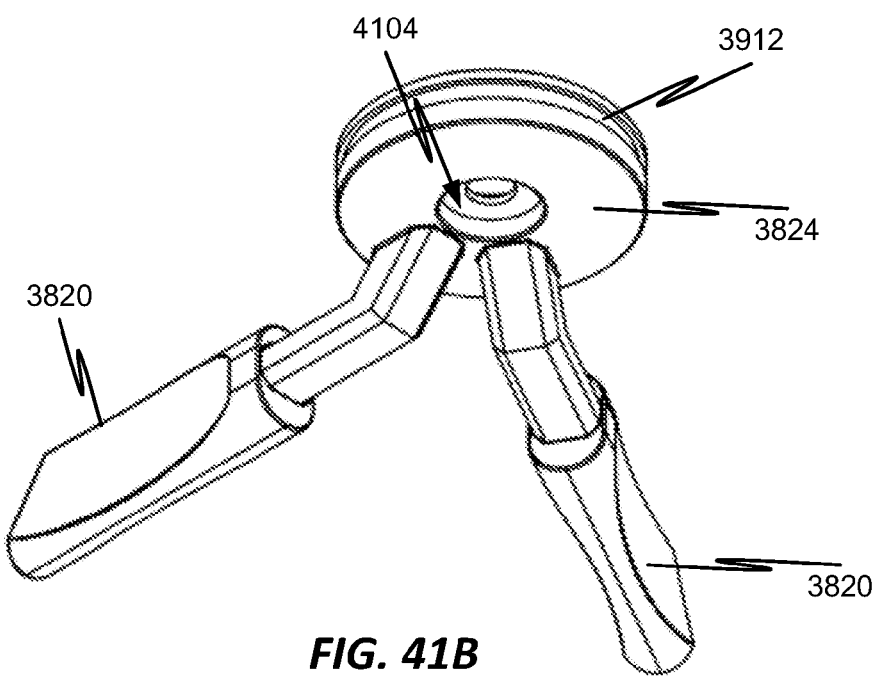
Figure 43:
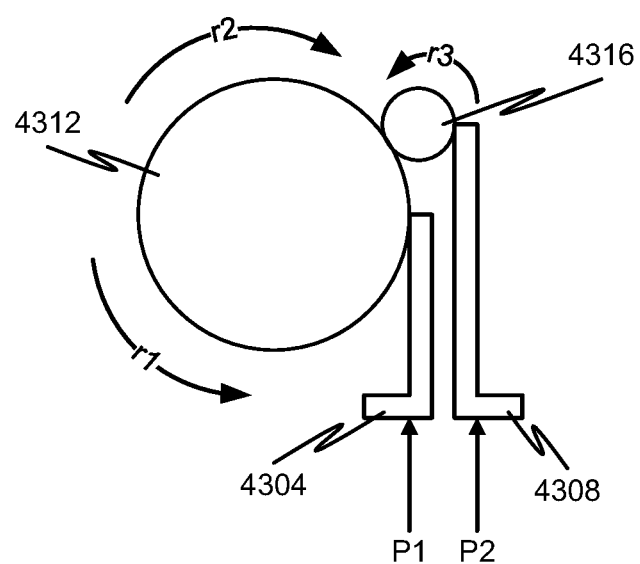
Figure 44A:
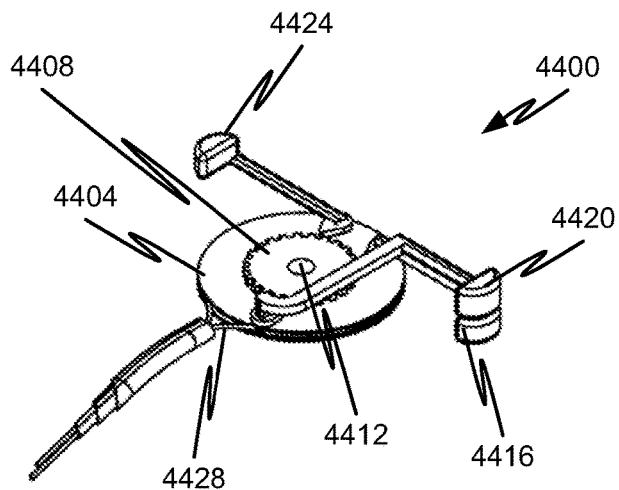
Figure 44B:
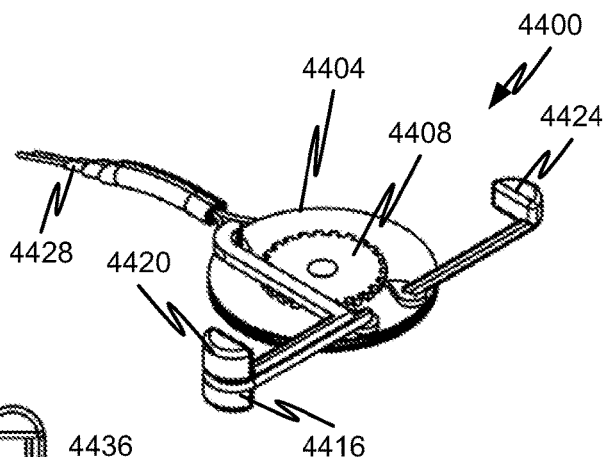
Figure 44C:
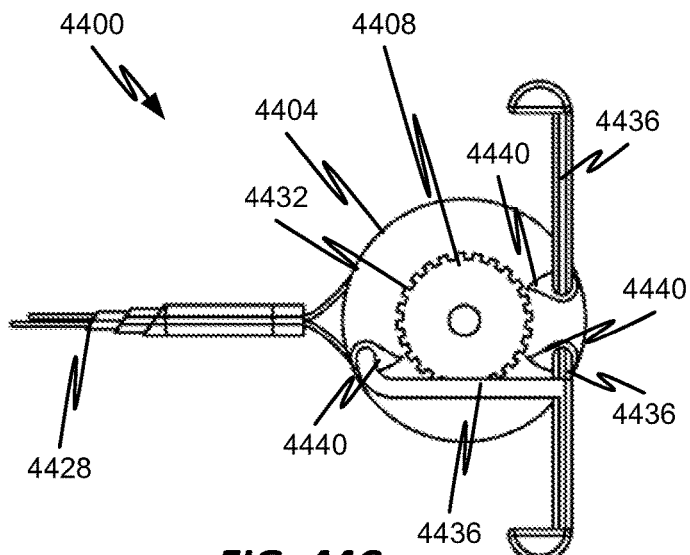
Figure 45A:
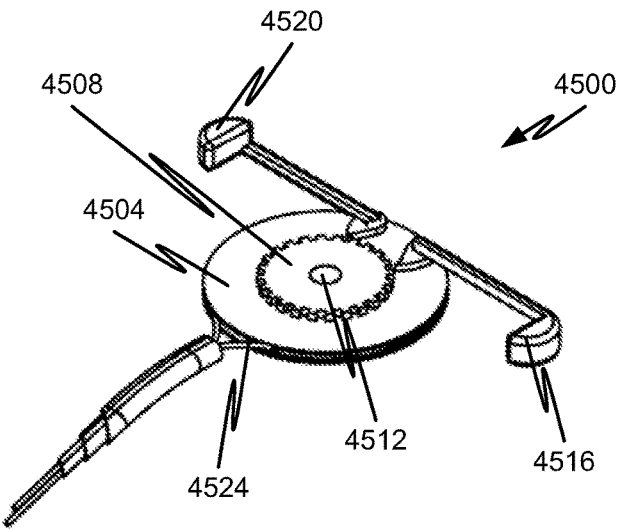
Figure 45B:
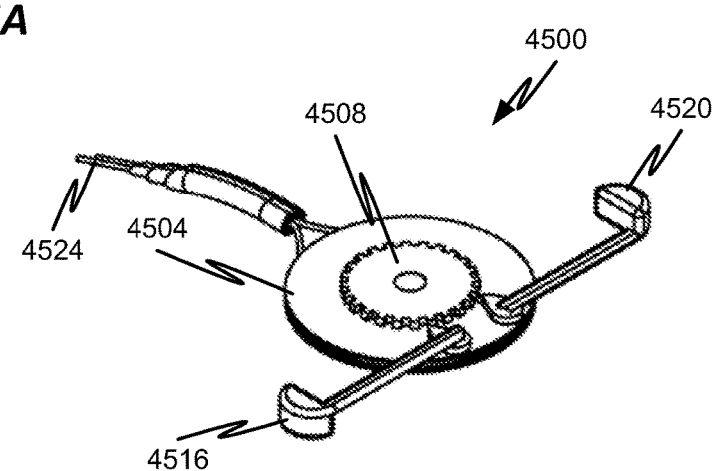
Figure 45C:
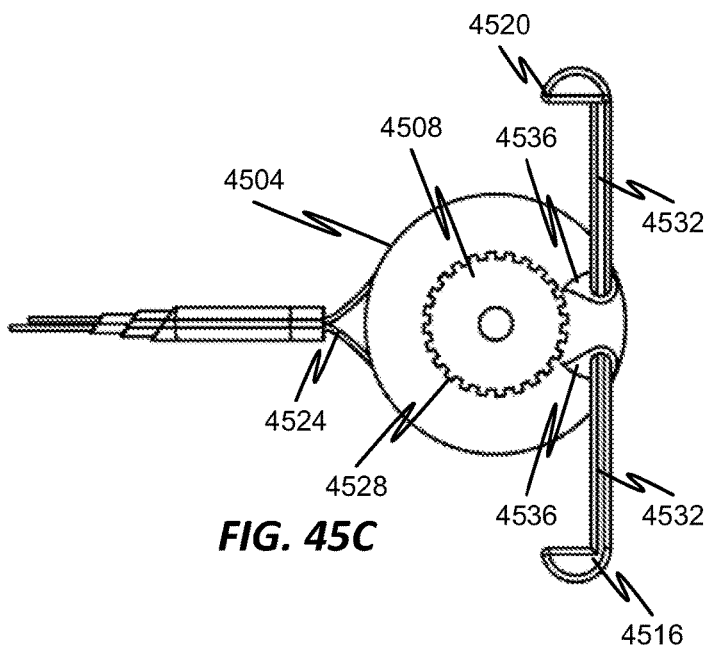
Figure 46A:
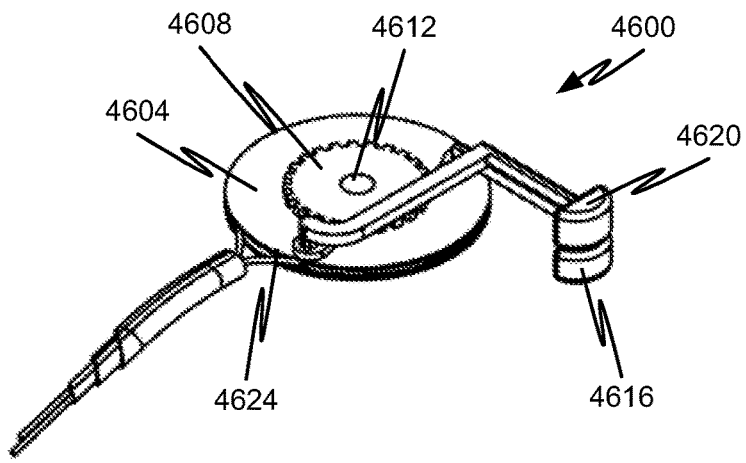
Figure 46B:
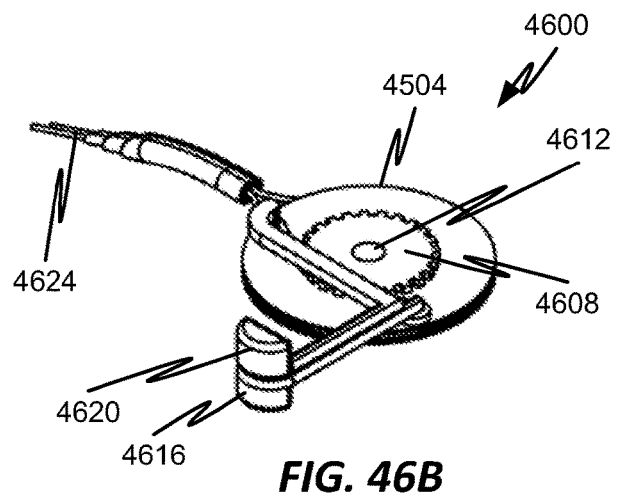
Figure 46C:
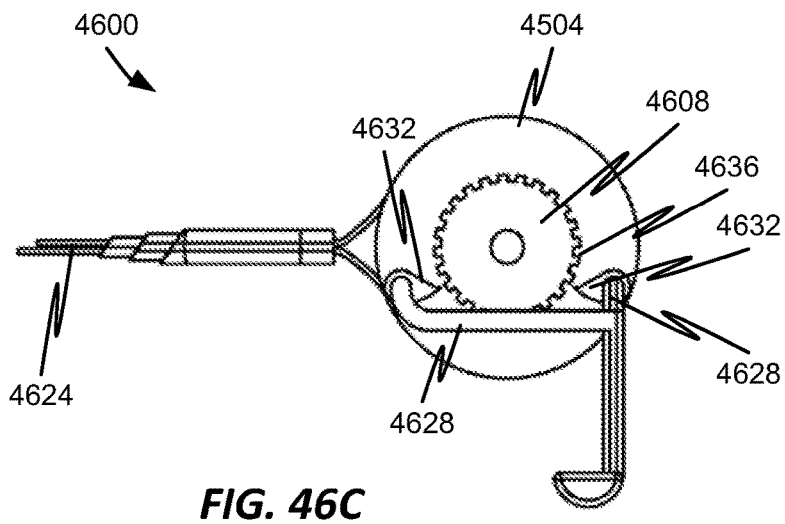

FIG. 1 is a side elevation view of a gear transmission and derailleur system and a bicycle frame according to one embodiment of the present disclosure;

FIG. 2 is rear perspective view of a gear transmission and derailleur system according to one embodiment of the present disclosure;

FIG. 3A is a first side view of a gear transmission and derailleur system according to one embodiment of the present disclosure;

FIG. 3B is a partial cut-away view of a gear transmission and derailleur system according to one embodiment of the present disclosure;

FIG. 4A is an elevation view of one embodiment of a gear centering device according to one embodiment of the present disclosure;

FIG. 4B is a cut-away view of one embodiment of a gear centering device according to one embodiment of the present disclosure;

FIG. 5 is a rear elevation of a gear transmission and derailleur system and a bicycle frame according to one embodiment of the present disclosure;

FIG. 6 is a rear perspective view of a gear transmission and derailleur system according to one embodiment of the present disclosure;

FIG. 7A is a first perspective view of a cylindrical gear centering device according to one embodiment of the present disclosure;

FIG. 7B is a second perspective view of a cylindrical gear centering device according to one embodiment of the present disclosure;

FIG. 7C is a third perspective view of a cylindrical gear centering device according to one embodiment of the present disclosure;

FIG. 8 is a side elevation view of a gear transmission and derailleur system and a bicycle frame according to one embodiment of the present disclosure;

FIG. 9 a front elevation view of a gear transmission and derailleur system according to one embodiment of the present disclosure;

FIG. 10 a rear elevation view of a gear transmission and derailleur system according to one embodiment of the present disclosure;

FIG. 11 is an isolation view of a gear transmission and derailleur system according to one embodiment of the present disclosure;

FIG. 12 is an isolation view of a gear transmission and derailleur system according to one embodiment of the present disclosure;

FIGS. 13A-13B provide a partial cross-sectional view of a gear transmission and derailleur system according to one embodiment of the present disclosure;

FIGS. 14A-14B provide a partial cross-sectional view of a gear transmission and derailleur system according to one embodiment of the present disclosure;

FIGS. 15A-15B provide a partial cross-sectional view of a gear transmission and derailleur system according to one embodiment of the present disclosure;

FIG. 16A provides a top isometric view of a gear centering device according to one embodiment of the present disclosure;

FIG. 16B provide a bottom isometric view of the gear centering device depicted in FIG. 16A;

FIG. 16C provides an elevational end view of the gear centering device depicted in FIG. 16A;

FIG. 16D provides a cross-section view along line 16-16;

FIG. 17A provides a top isometric view of a gear centering device according to one embodiment of the present disclosure;

FIG. 17B provides a bottom isometric view of the gear centering device depicted in FIG. 17A;

FIG. 17C provides an elevational side view of the gear centering device depicted in FIG. 17A;

FIG. 18A provides a top isometric view of a gear transmission and derailleur system according to one embodiment of the present disclosure;

FIG. 18B provides a bottom isometric view of the gear transmission and derailleur system depicted in FIG. 18A;

FIG. 18C provides an elevational end view of the gear transmission and derailleur system depicted in FIG. 18A;

FIG. 19A provides an elevational side view of the gear transmission and derailleur system depicted in FIG. 18A;

FIG. 19B provides an elevational side view of a second configuration of the gear transmission and derailleur system depicted in FIG. 18A;

FIG. 20A provides a top isometric view of an assembled shifter assembly according to one embodiment of the present disclosure;

FIG. 20B provides a top isometric view of a disassembled first shifter assembly according to one embodiment of the present disclosure;

FIG. 20C provides a top isometric view of a disassembled second shifter assembly according to one embodiment of the present disclosure;

FIG. 21A provides a top isometric view of an assembled shifter assembly according to one embodiment of the present disclosure;

FIG. 21B provides a top isometric view of a disassembled shifter assembly according to one embodiment of the present disclosure;

FIG. 21C provides a top view of the disassembled shifter depicted in FIG. 21B;

FIG. 22A provides a first top isometric view of an assembled shifter assembly according to one embodiment of the present disclosure;

FIG. 22B provides a second top isometric view of the assembled shifter assembly depicted in FIG. 22A;

FIG. 22C provides a top view of the assembled shifter assembly depicted in FIG. 22A;

FIG. 23A provides a top isometric view of a disassembled shifter assembly according to one embodiment of the present disclosure;

FIG. 23B provides a top view of the disassembled shifter assembly depicted in FIG. 23A;

FIG. 24A provides an exploded top isometric view of a mechanical-based rotary gear centering device according to one embodiment of the present disclosure;

FIG. 24B provides an exploded bottom isometric view of the rotary gear centering device depicted in FIG. 24A;

FIG. 24C provides an exploded side view of the rotary gear centering device depicted in FIG. 24A;

FIG. 24D provides an assembled view of the rotary gear centering device depicted in FIG. 24A;

FIG. 25A provides an exploded top isometric view of an electrical-based rotary gear centering device according to one embodiment of the present disclosure;

FIG. 25B provides an exploded bottom isometric view of the rotary gear centering device depicted in FIG. 25A;

FIG. 25C provides an exploded side view of the rotary gear centering device depicted in FIG. 25A;

FIG. 25D provides an assembled view of the rotary gear centering device depicted in FIG. 25A;

FIG. 26A provides a first bottom isometric view of a lead screw and shaft according to one embodiment of the present disclosure;

FIG. 26B provides a second bottom isometric view of the lead screw and shaft depicted in FIG. 26A;

FIG. 26C provides a side view of the lead screw and shaft depicted in FIG. 26A;

FIG. 27A provides a top isometric view of an electronic gear centering device in a first state according to one embodiment of the present disclosure;

FIG. 27B provides a top isometric view of the electronic gear centering device in a second state according to one embodiment of the present disclosure;

FIG. 27C provides a side view of the electronic gear centering device depicted in FIG. 27A;

FIG. 27D provides a cross-sectional view of the electronic gear centering device along line 27C-27C;

FIG. 27E provides a side view of the electronic gear centering device depicted in FIG. 27B;

FIG. 27F provides a cross-sectional view of the electronic gear centering device along line 27E-27E;

FIG. 28 is an isometric view of a derailleur according to an embodiment of the present disclosure;

FIG. 29A is a partially-exploded part view of the derailleur in FIG. 28;

FIG. 29B is a magnified view of the gear climb housing depicted in FIG. 29A;

FIG. 30A is a top view of a gear climb in accordance with embodiments of the present disclosure;

FIG. 30B is an isometric view of the gear climb in FIG. 30A;

FIG. 31A is an isometric view of an electronic derailleur according to an embodiment of the present disclosure;

FIG. 31B is an isometric view of an electronic derailleur according to another embodiment of the present disclosure;

FIG. 32A is a top view of the electronic derailleur in FIG. 31A;

FIG. 32B is a cross-sectional view along line 32-32;

FIG. 33A is a top view of a gear climb in accordance with embodiments of the present disclosure;

FIG. 33B is an isometric view of the gear climb in FIG. 33A;

FIG. 34 is a side view of a derailleur mounted to a bicycle frame in accordance with embodiments of the present disclosure;

FIG. 35 is an isometric view of a controller in accordance with embodiments of the present disclosure;

FIG. 36A is a top view of the controller in FIG. 35;

FIG. 36B is a cross-sectional view along line 36-36;

FIG. 37A is a top isometric view of a rotatable member in accordance with embodiments of the present disclosure;

FIG. 37B is a bottom isometric view of the rotatable member in FIG. 37A;

FIG. 37C is a top view of the rotatable member in FIG. 37A;

FIG. 38A is a front view of a handle bar configured with a controller in accordance with embodiments of the present disclosure;

FIG. 38B is a bottom isometric view of the handle bar in FIG. 38A;

FIG. 39A is a top view of a controller in accordance with embodiments of the present disclosure;

FIG. 39B is a cross-sectional view along line 39-39;

FIG. 40 is a top isometric view of the controller in FIG. 39A;

FIG. 41A is a top isometric view of a rotatable member in accordance with embodiments of the present disclosure;

FIG. 41B is a bottom isometric view of the rotatable member in FIG. 41A;

FIG. 42A is a top isometric view of a controller housing in accordance with embodiments of the present disclosure;

FIG. 42B is a top view of the controller housing in FIG. 42A;

FIG. 42C is a cross-sectional view along line 42-42;

FIG. 43 is a functional diagram depicting components of a controller in accordance with embodiments of the present disclosure;

FIG. 44A is a first top isometric view of a controller in accordance with embodiments of the present disclosure;

FIG. 44B is a second top isometric view of the controller in FIG. 44A;

FIG. 44C is a top plan view of the controller in FIG. 44A;

FIG. 45A is a first top isometric view of a controller in accordance with embodiments of the present disclosure;

FIG. 45B is a second top isometric view of the controller in FIG. 45A;

FIG. 45C is a top plan view of the controller in FIG. 45A;

FIG. 46A is a first top isometric view of a controller in accordance with embodiments of the present disclosure;

FIG. 46B is a second top isometric view of the controller in FIG. 46A; and FIG. 46C is a top plan view of the controller in FIG. 46A.

DETAILED DESCRIPTION

The present disclosure has significant benefits across a broad spectrum of endeavors. It is the applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment of the method that illustrates the best mode now contemplated for putting the disclosure into practice is described herein by, and with reference to, the annexed drawings that form a part of the specification. The exemplary method is described in detail without attempting to describe all of the various forms and modifications in which the disclosure might be embodied. As such, the embodiments described herein are illustrative, and as will become apparent to those skilled in the arts, can be modified in numerous ways within the scope and spirit of the disclosure, the disclosure being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

FIG. 1 shows one embodiment of the present disclosure with a Line Drive derailleur 1, a Cuff-Link controller 2, a cable housing 3, and a cable 4. As used herein, derailleurs of the present disclosure may be referred to as "Line Drive" derailleurs and user-controlled or controllable features for actuating a derailleur may be referred to as "Cuff-Link" controllers. For illustration purposes, the cable housing 3 and cable 4 are depicted with lengths shorter than would typically be provided. The cable and associated housing may be provided in any number of lengths, as will be recognized by one of skill in the art, to accommodate different sized vehicles, transmission system arrangements, etc.

In one embodiment, the cable housing 3 runs along a bike frame 50 so as to allow the Cuff-Link controller 2 to be mounted to the handlebars of the bicycle, for example, and operate a user-controlled manual transmission feature. In one embodiment, the Cuff-Link controller 2 is provided as the means for actuating a cable and associated transmission features. In alternative embodiments, it is contemplated that various alternative features may be provided for transmitting a user-applied force to a transmission cable or wire. Thus, the present disclosure is not limited to the contemplated Cuff-Link system. Various alternative devices, such as that disclosed in U.S. Pat. No. 6,513,405 to Sturmer et al., which is hereby incorporated by reference in its entirety, may be provided with features of the present disclosure.

The Cuff-Link controller 2 with the cable housing 3 and the cable 4, in various embodiments, is provided as a long cable that travels from the derailleur 1, through the Cuff-Link controller 2 and back to the Line Drive derailleur 1.

One or more controller pulleys 8 are provided internal to the controller 2, which allows a user to pull the cable 4 back and forth by applying force to one or more levers 7 provided on the controller 2. The levers 7 are directly attached to the controller pulley 8 in a variety of locations. The number and locations of levers 7 may be varied to allow a user to vary the feel and look of their individual Cuff-Link Controller 2.

The levers 7 are used to pull the pulley 8 back and forth, which in turn, pulls the cable 4 back and forth. The controller 2 may be attached to a variety of locations on a vehicle, such as the handlebars or frame of a bicycle. In some embodiments, the controller 2 does not provide indexing or additional friction as in the prior art designs. Rather, the controller 2 imparts a tension on the cable 4 by means of the user pushing the lever(s) 7 in either direction. Attachment rings 9 are provided in various embodiments to securely attach the controller 2 in a position. Alternatively, the controller 2 may comprise various known attachment features used to attach the device to the bicycle.

Cable bearings 6 are provided to ease the friction of the cable as it enters and exits the controller 2 and the cable housing 3 as shown in FIG. 1. The cable 4 is disposed around the pulley 8 in a looped configuration. That is, a first end of the cable 4 is passed through and/or wrapped around a pulley and transmitted back into the cable housing approximately 360 degrees from the entrance point of the cable. Two portions of the cable 4 are therefore provided in parallel interior to the housing 3, with a length of the cable 4 being wrapped around the pulley 8 of the controller 2. The cable 4 may be secured to the pulley 8 in a variety of means. The cable 4, for example, may be press fit into a peripheral recess in the pulley and/or clamped with the assistance of various fasteners provided in connection with the controller. Alternatively, the cable 4 may be centrally connected to the controller 2 such that the controller can pull either end of the cable back and forth. In yet another embodiment, two cables may be connected to the controller at their ends such that the controller can move either cable back and forth. These and other means for securing the cable to the controller will be recognized by those of skill in the art. It will be expressly recognized that gear centering features of the present disclosure may be provided with any number of shifting devices and methods.

FIG. 2 is a perspective view of one embodiment of the present disclosure wherein a derailleur 1 and associated components, including a cable housing 3 and cable 4. The derailleur 1, comprises a housing 11, a slider feature 10 (the "Line Drive Slider") to which drive pulleys are attached, and a gear centering device 12 (the "Gear Climb").

The cable 4 according to various embodiments is provided in an endless loop configuration. That is, a looped cable is provided with one end looped around a pulley 8 of a controller 2 and a second end is looped through a slider portion 10 and guide 11 of a derailleur. As shown in FIG. 2, a portion of the endless loop cable 4 passes through guide member or housing 11 and is wrapped around pulley member 14 and connected to the slider 10 such that the cable 4 is in force-transmitting communication with the slider. Application of tension to the visible portion of the cable 4 in FIG. 2 will translate the slider 10 and connected components downwardly along the guide members 11, 15, thus downshifting the vehicle under conventional gearing and/or cassette arrangements. The cable 4, provided in an endless loop configuration and doubled upon itself interior to the housing 3, is secured to the slider 10 such that the cable imparts a tension force to the slider 10 in one of two directions, depending upon the direction of rotation applied to the controller 2.

In one embodiment, the housing 11 is attached to a vehicle in a fixed position and does not move relative to the vehicle during the operation of the system. The housing comprises a shaft 13, a cable pulley 14, a centering device shaft 15, and a mounting plate 16. The shaft 13 is used as a portion of the shaft track system for the slider feature 10, as well as the attachment point for the cable housing and a routing device for the cable 4 into the cable pulley 14. The cable pulley 14 is used to route the cable from the center of the shaft 13, which is preferably hollow, into one side of the slider 10 so as to allow the cable 4 to pull the slider 10 down the shafts 13, 15 of the housing 11. An aperture 17 is provided in the mounting plate 16 and another aperture provided in the shaft 13, which allow for one end of the cable 4 to exit the cable housing 3 and enter the top of the slider 10 to allow the cable 4 to pull the slider 10 up the shafts 13, 15 of the housing 11.

The slider 10 and associated chain slack device 22 and pulleys, translate in both directions along shafts 13, 15 of the housing 11 and thus manipulate a chain or drive means across a set of sprockets (e.g., cassette). The slider 10 also accounts for chain slack, as further shown and described herein. The slider 10 is pulled in either direction across the shafts 13, 15 by the cable 4 and regulates its exact position on the shafts 13, 15 by means of a gear centering device 12.

The gear centering device, or "Gear Climb" 12, further illustrated in FIGS. 3A-3B and 4, positions the slider 10 such that the drive means (not shown) aligns properly with a sprocket or gear. As will be recognized by one of skill in the art, when a derailleur and drive means are not properly aligned with a gear, chain rub can occur, causing reduced performance, excess chain wear, and inconvenience to a user. In one embodiment, the gear centering device 12 comprises a setscrew 18, a compression or coil spring 19, a track 20, and a pin 21. The setscrew 18 controls the pressure of the spring 19 on the pin 21, allowing the strength of the Gear Climb feature 12 to be adjusted to the preference of the user. The spring 19 provides force against the pin 21 and drives the pin 21 and the slider 10 into an appropriate position. The track 20 and pin 21 thereby provide for an unstable system when components of the system are not properly aligned with the center of a gear. The pin 21 will always seek a position of lower potential energy (i.e. in a recess of the teeth provided in the gear centering device), such a position corresponding to a drive means being aligned with the center of a gear. As used herein, lower potential energy relates to a condition of the system characterized by a lower energy configuration. In various embodiments, this condition relates to the reduced potential energy configuration of a spring and/or components in communication with a spring. While features of the present disclosure may utilize or implicate gravitational considerations, the use of the term potential energy is not limited to gravitational potential energy.

As shown in the section cut view of FIG. 4B, which corresponds to a section along line B-B of FIG. 4A, the Gear Climb track 20 comprises a set of peaks 50 and valleys 52, the valleys aligned with and corresponding to the center of each sprocket on a cassette. The distance between the valleys on the Gear Climb Track, in some embodiments, corresponds to the distance between the centers of each sprocket on the cassette. Additionally, the shafts 13, 15 share an angle that is the same as or at least substantially similar to an angle formed by stacked arrangement of the cassette from the largest to the smallest sprocket.

Application of force to the levers 7 of the controller 2 pulls the cable 4 in a desired direction, forcing the pin 21 to climb or overcome one of the peaks of the track 20. When such a force is removed from the lever 7, the spring 19 biases the pin into the closest valley, aligning the slider 10 with the center of the closest sprocket on the cassette. To facilitate such centering action, the pin 19 preferably comprises a pointed, rounded, or tapered end such that the pin, and therefore the slider assembly, is not prone to coming to rest on a peak of the Gear Climb. Rather, the pointed end of the pin 19 and geometry of the peaks help ensure that the pin will bias toward a valley, where the derailleur is properly aligned with the center of the desired sprocket. As shown in FIG. 4B, nine valleys 52 are provided corresponding to a cassette with nine gears. It will be expressly recognized, however, that greater or fewer valleys 52 may be provided to correspond to cassettes known to have greater or fewer than nine gears.

In various embodiments, the slider 10 comprises chain slack device 22, particularly where the device 2 is to be used in combination with a chain as the drive means. The chain slack device secures chain slack, such as that resulting from shifting into smaller sprockets on the cassette with a chain length necessary for larger sprockets. As will be recognized, a chain of a certain length may be provided so as to be capable of being disposed around large sprockets (i.e. low gears). The same length chain should also operate effectively even when transmitted to cogs with fewer teeth and a smaller radius. To account for slack inherent in having the chain positioned on such smaller radius gears, a biased pulley 22 is provided and enables a "slacked" chain to travel along an intended path and communicate effectively with various different gears on a cassette. The chain slack device 22 comprises a biasing member 56, such as a torsion spring. The biasing member 56 applies a sufficient force to account for chain slack without imparting excess force or tension on a chain or drive means.

In contrast with various prior art designs which swing or bias a chain slack arm towards the rear of the bicycle during its slack taking operation, for example, the present disclosure swings or biases a pulley towards the front of the vehicle, creating a smaller overall derailleur shape when geared to its largest sprocket. As such, system components are kept further away from the tire and dirt. The chain slack device 22 also allows for a smaller, lighter, and more efficient chain. In addition, the chain slack feature 22 of the present disclosure helps to maintain chain momentum and thereby increases efficiency.

FIG. 5 provides a rear elevation view of a transmission system according to one embodiment of the present disclosure. As shown, a derailleur system 1 is attached to a bicycle frame 50 and generally aligned with a cassette 52 comprising a plurality of gears. The derailleur system 1 comprises a slider 10 actuated by a cable 4 maintained within a cable housing 3. The slider 10 travels along a path generally defined by shafts 13, 15, wherein shaft 15 comprises a gear centering device with a track 15 as shown and described herein. The slider 10 and associated components (e.g. chain slack device 22 and chain pulley 54) are actuated by application of tension in either of two directions on the cable 4. The slider and associated components are thereby translated in an analog manner (e.g., non-incrementally). The gear centering device 12 operates to correct a condition whereby a drive means or chain is placed in a position that does not align with the center of a gear. In various embodiments, a chain slack device 22 is provided wherein the chain slack arm uses a compression spring or an extension spring to add tension to the chain, as opposed to a torsion spring used in common chain slack devices.

To operate the system, a user applies a force on a controller 2, preferably while applying force to the drive means, such as by pedaling the crank arms of a bicycle. The force applied to the controller 2 applies a tension on the cable in one of two directions, sliding the slider 10 up or down the shafts 13, 15. When the force is no longer applied to a lever 7 or other component of the controller 2, the slider 10 automatically finds the center of the closest sprocket under the influence of the gear centering features.

FIG. 6 presents yet another embodiment of a transmission system of the present disclosure. As shown, a cylindrical gear centering device 29 is provided and the slider 10 is actuated by a worm gear 23. The worm gear 23 can be operated in a variety of ways, including but not limited to a controller and cable, a motor with wireless/wired control switch, hydraulics or pneumatics 26. The worm gear 23 is provided to actuate the slider 10 and translate the mechanism back and forth.

As shown in more detail in FIGS. 7A-7C, a cylindrical gear centering device 29 is provided, comprising corresponding toothed cylindrical tracks 25, 26 and a pin 24 with associated flange head 30. The flange head 30 comprises a first cylindrical track 26 a series of peaks and valleys that mate with peaks and valleys of corresponding cylindrical track 25, which is in fixed communication with additional components such as cog 36. Cog 36 transfers force to additional system elements, such as a rotational worm gear 23 for translating a derailleur slider 10.

FIG. 7A is a perspective view of a cylindrical Gear Climb or auto-indexing device 29. As shown, a cable 4 may be connected to a cylindrical track 25 in fixed communication with and useful for rotating a cog 36. A second cylindrical track 26 is biased against first cylindrical track 25 and useful for biasing the rotational position of the cog 36 and associated components toward one or more positions corresponding to the center of a gear. Second cylindrical track 26, which comprises a series of undulations or peaks and valleys corresponding to those of the first cylindrical track 25, is biased against the first track 25 by, for example, a coil spring 34 disposed around an axial pin 24 and associated flange 32. FIG. 7B depicts the second track 26, pin 24 and flange 32 in a reverse perspective view as compared to FIG. 7A. The undulations on track 26 correspond to those provided on track 25, as shown in the partial exploded view provided in FIG. 7C. The interaction of the corresponding teeth or undulations on the cylinders 25, 26 in combination with the force applied by biasing member 34 provide for an unstable condition whenever components of the system are not properly aligned with a single gear. Such an unstable condition will resolve itself by the biasing member 34 urging the system into a position of lower potential energy (i.e. a rotational position characterized by the track 25, 26 undulations properly mating with one another) wherein a chain or drive means is properly aligned with the center of a gear. The cylindrical variation of the Gear Climb 12 may be employed in a variety of embodiments as shown and described herein.

In various embodiments, derailleur sliders of the present disclosure may be actuated by hydraulic or pneumatic means, as opposed to or in combination with conventional derailleur cables. In one embodiment, hydraulics capable of push-pull actuation through one or more hydraulic hoses serves to manipulate the derailleur slider, for example. It will therefore be recognized that actuation means of the present disclosure are not limited to conventional wire cables.

In various embodiments, a derailleur slider is provided on the inside of a mated triangular housing. This arrangement allows a pull-pull controller mechanism to be used, such as the previously described Cuff Link Controller, a hydraulic two way controller, or an electric motor. The housed design allows the system to adapt to the various needs of bicycles, whether it be for downhill mountain bike racing, competitive road biking, cross country mountain biking, touring and even cruiser bikes. Derailleur sliders incorporated within the housing offer increased protection and provide for easier and longer lasting lubrication.

In various embodiments, hydraulic systems are provided within a derailleur system to manipulate or actuate a slider. For example, in various embodiments, hydraulic fluid may provide force to compress and/or expand an accordion bladder contained within the derailleur housing. FIGS. 8-15B provide various views of one embodiment of a derailleur 60 comprising a hydraulic system and an accordion bladder 66 for translating derailleur components and a drive member. A hydraulic derailleur 60 is provided in a manner such that gear transmission is effected through a "push-pull" arrangement whereby a positive pressure imparted upon and/or by a hydraulic fluid 68 actuates an accordion bladder 66 such that the bladder 66 expands and contracts and thus translates connected transmission systems. Hydraulic fluid 68 is provided in combination with a controller 64 and a transmission cable 62. The cable 62 may be provided in any number of desired lengths and arrangements to satisfy the needs and/or geometries of a specific vehicle. FIGS. 13A-14B provide cross-sectional views of the accordion bladder 66 in a contracted (FIG. 13B) and expanded state (FIG. 14B). It will be recognized that the bladder may be expanded to any number of non-discrete locations and/or positions. Gear centering features and devices as shown and described herein are provided in various embodiments to properly align a transmission system with a singular gear or cog. FIG. 15B depicts a cross-sectional view of a controller 64 and cable 62 according to one embodiment. Hydraulic fluid(s) 68 is disposed therein, the fluid 68 being operable to control a bladder 66 and associated derailleur components when a force 70 is imparted on the controller 64 in either rotational direction.

In various embodiments, derailleurs of the present invention, including triangular housing derailleurs depicted in FIG. 11 comprise electronic shifting features coupled with gear centering features of the present disclosure. For example, a servo-motor and corresponding power source is provided in communication with the derailleur to translate derailleur components along the length of the derailleur. Actuation of electronic components positions derailleur components, such as the wheel pulley assembly, to a user-determined location. Upon the likely event that such a user-determined location does not correspond with the center of a sprocket, gear centering features as shown and described herein operate to automatically position, re-position, and/or correct the position of the derailleur feature(s) to align with a sprocket and allows the system to operate efficiently. Accordingly, the present disclosure eliminates the need of an electronic transmission system to be calibrated or indexed precisely for movement between a plurality of predetermined points. While electronic derailleurs of the present disclosure may include such calibration, derailleurs of the present disclosure contemplate attaining precise and automatic alignment of a drive chain or drive member via biased gear centering features.

With reference now to FIGS. 16A-D, another example of a Gear Climb or gear centering device 1600. The Gear Climb

1600 may provide similar functions to other Gear Climbs and Gear Climb features described herein. In some embodiments, the Gear Climb 1600 corresponds to a parallelogram-type gear centering device. The Gear Climb 1600 includes a first section 1604 and a second section 1608 that are slidably interconnected with one another. More specifically, the first section 1604 may comprise a rail or track feature 1624 and the second section 1608 may comprise a corresponding rail or track feature 1620 that interfaces with the rail or track feature 1624 of the first section 1604. The first section 1604 and second section 1608 may be configured to slide or move laterally with respect to one another to facilitate the shifting from one gear to another gear.

In some embodiments, the first section 1604 comprises an interconnect 1612 and the second section 1608 comprises an interconnect 1616. The first section 1604 may also comprise a cable attachment member 1632 that enables a cable or similar component to be connected with the first section 1604. It should be appreciated that while not depicted, the cable attachment member 1632 may be provided on the second section 1608 as an alternative or in addition to having the cable attachment member 1632 on the first section 1604.

In some embodiments, the interconnects 1612, 1616 are points on the Gear Climb 1600 for connecting to other components of a derailleur. For instance, one of the interconnects 1612, 1616 may connect with or be secured to (e.g., via a screw, post, glue, welding, etc.) appropriate parts of the derailleur 1.

The cable attachment member 1632 may connect with the cable 4 that travels to the gear shifter or controller. The cable 4 connecting to the cable attachment member 1632 may be used to apply tensile forces, which in turn the second section 1608 to move relative to the first section 1604. In some embodiments, the cable 4 may pull the two sections 1604, 1608 apart, thereby making the overall length of the Gear Climb 1600 longer. Alternatively, the cable 4 may pull the two sections 1604, 1608 together, making the overall length of the Gear Climb 1600 smaller. Furthermore, biasing forces may be applied to one or both of the sections 1604, 1608 to counteract the forces applied by the cable 4.

As with the other Gear Climbs described herein, the Gear Climb 1600 may comprise one or more biasing members or a collection of features that work together to bias the relative position of the first section 1604 to the second section 1608. Specifically, a plurality of indentations, peak and valleys, ridges, notches, etc. 1628 may interact with a biased post 1624 and/or bearing 1636. As lateral forces are applied at the cable attachment member 1632, the first section 1604 moves laterally with respect to the second section 1608. If movement of the two sections 1604, 1608 causes the bearing 1636 to rest on a peak of the notches 1628, the bearing 1636, under the force of a spring connected to the post 1624 may be forced to roll to a valley of the notches 1628, thereby fixing the relative lateral positions of the sections 1604, 1608.

One particular advantage to employing the parallelogram Gear Climb 1600 is that the biasing members (e.g., notches 1628, post 1624, and/or bearing 1636) may be contained within a substantially sealed environment that is relatively free of dust, dirt, and other debris. FIGS. 17A-C show yet another alternative configuration for a Gear Climb 1700 where circular first and second sections 1704, 1708 are used. In this embodiment, the first section 1704 may correspond to a post or plunger that enters a hole or via in the larger second section 1708. This hole or via may be sealed with a plastic gasket, o-ring, or the like. The biasing members may be contained within the sealed larger second section 1708. In some embodiments, the biased post may be connected to the second section 1708 and may be pushed by a spring inwardly toward notches established on the outer circumference of the first section 1704. Alternatively, the biased post may be connect to the first section 1704 and may be pushed by a spring outwardly toward notches established on the inner wall of the second section 1708. As can be seen in FIGS. 17A-C, the Gear Climb 1700 may comprise interconnects 1712, 1716 for connecting to other parts of the derailleur 1.

FIGS. 18A-C and 19A-B depict another example of a derailleur 1800 according to embodiments of the present disclosure. Specifically, the derailleur 1800 may be provided with a Gear Climb 1812 that is operated by one or more cables 1808. The Gear Climb 1812 may correspond to any type or combination of Gear Climbs described herein. The cables 1808 may be similar or identical to the cables 4 and they may pass from a controller (e.g., on handles of the bicycle) through a cable guide 1804 on the derailleur until they are attached at the appropriate location on the Gear Climb 1812.

As can be seen in FIG. 18A, for example, the cable guide 1804 may comprise an oval, elliptical, rectangular, or non-circular shape to accommodate the two cables 1808 in a side-by-side orientation. In some embodiments, any other cable housing or cable guide provided on a bicycle may be configured to have an oval, elliptical, or non-circular shape. For example, any guide from the controller to the derailleur (front or back) which is used to carry or hold the cables 1808 may have such a non-circular shape.

FIGS. 18A-C and 19A-B also depict a single setting mechanism 1816 that can control the limits on the amount of movement allowed by the Gear Climb 1812. Specifically, prior art derailleurs provided two setting mechanisms, one to control the starting position (e.g., lower limit of relative movement) of the derailleur and one to control the ending position (e.g., the upper limit of relative movement). Because embodiments of the present disclosure enable indexing at the derailleur, it is no longer necessary to have two setting mechanisms to control the starting and ending positions. Rather, a single setting mechanism 1816 can be provided to set either the starting position or the ending position and the opposite position can be controlled by the Gear Climb 1812.

In accordance with at least some embodiments, any of the derailleurs or Gear Climb mechanisms described herein may employ one or more springs to bias movement of one or more components within the biased members. In some embodiments, the one or more springs employed in the derailleur or Gear Climb mechanism may be stronger (e.g., have a higher spring weight or apply a larger force) than any spring in a controller/shifter assembly. More specifically, embodiments of the present disclosure contemplate a derailleur or Gear Climb having one or more springs that apply a biasing force that is greater than or equal to any other total forces applied by springs in a shifter assembly and/or by the cable(s) connecting the shifter assembly with the derailleur.

With reference now to FIGS. 20A-C, a shifter assembly 2000 will be described in accordance with embodiments of the present disclosure. The shifter assembly 2000 may correspond to a grip shifter assembly that is configured to be integrated with the grips or handles of the bicycle. In some embodiments, the shifter assembly 2000 comprises an unmovable grip portion 2004 and a movable grip portion 2008. The movable grip portion 2008 may be configured to rotate or spin around the handle bars whereas the unmovable grip portion 2004 does not. The shifter assembly 2000 also comprises a cable 216 that enters the assembly housing 2012 through a cable entry 2020.

FIGS. 20B and 20C show the shifter assembly 2000 without the housing 2012. As can be seen in these figures, the cable 2016 is configured to, partially or completely, wrap around the handle. In particular, the cable 2016 interfaces with the movable grip portion 2008 at an extended radial portion 2032. The extended radial portion 2032 may be larger in diameter than the handle and, therefore, may cause the cable 2016 to move a greater distance when the movable grip portion 2008 is rotated.

The cable 2016 may correspond to a single piece of cable (e.g. an endless loop of material travelling through the derailleur and shifter assembly or one piece of material having only two ends, each of which terminate at the derailleur) or two pieces of cable (e.g., two pieces of material, each having one end that terminates at the assembly 2000 and each having one end that terminates at the derailleur). In some embodiments, the cable 2016 is secured or fastened to the extended radial portion 2032 with one or more fasteners 2028a, 2028b, 2032. In the embodiment depicted in FIG. 20B, a single fastener 2032 that can be used to secure a single piece of cable 2016 to the extended radial portion 2032. In the embodiment depicted in FIG. 20C, a first and second fastener 2028a, 2028b are used to secure first and second pieces of cable 2016 to the extended radial portion 2032. Thus, as the movable grip portion 2008 is rotated, the cable 2016 exerts a tensile force on one or more components of the derailleur and/or Gear Climb.

FIGS. 21A-C depict another variant of a shifter assembly 2100 that is similar to shifter assembly 2000 except with a lower profile. The shifter assembly 2100 again comprises a movable grip portion 2104, but the larger housing is replaced with a smaller housing. Moreover, the shifter assembly 2100 comprises a radial element 2108 that is still larger in diameter than the handles of the bicycle, but is smaller or equal in diameter to the movable grip portion 2104. In some embodiments, as with the shifter assembly 2000, the shifter assembly 2100 comprises a groove or track that receives the cable and maintains it within the radial element 2108. Additionally, the cable can be secured to the radial element 2108 in a similar fashion to that described in connection with shifter assembly 2000.

FIGS. 22A-C and 23A-B show another possible type of shifter assembly. Rather than employing a grip shifter assembly, embodiments of the present disclosure enable the use of a push-button shifter assembly 2200 to control the motion of the derailleur and/or Gear Climb. In some embodiments, the shifter assembly 2200 comprises a housing 2204 that is generally cylindrical, but with a tapered section 2206. The tapered section 2206 interfaces between the round portions of the housing 2204 and a cable entry 2210. The tapered section 2206 helps follow or conform with the natural path of the cable 2216 as it transitions between from the radial element 2304 of the shifter assembly 2200 to the cable entry 2210 of the housing 2204.

The housing 2204 also comprises an actuator guide 2212. In some embodiments, that the actuator guide 2212 directs or controls the motion of the push button actuators 2216, 2220 within the housing 2204. In the particular embodiment depicted, the actuator guide 2212 causes the actuators 2216, 2220 to travel a linear path within the housing 2204. It should be appreciated, however, that the actuator guide 2212 may facilitate non-linear movement (e.g., arcuate, circular, etc.) of the actuators 2216, 2220 within the housing 2204. Further still, it may not be necessary to use the actuator guide 2212 as the actuators 2216, 2220 may be directly attached to the radial element 2304 or a sprocket 2308 connected thereto with a cable, pulley, or the like. In such an embodiment, the pressing of the actuator 2216, 2220 may result in a movement of the radial element 2304 without the assistance of an intermediate component.

In some embodiments, the shifter assembly 2200 may comprise a first and second actuator 2216, 2220 that are configured to move the cable 2216 in a first and second rotational direction, respectively. In some embodiments, the first actuator 2216, when pushed into the housing 2204, causes a first engagement mechanism 2316 to engage a sprocket 2308 or the like that is attached to the radial element 2308. The force applied by the first engagement mechanism 2316 to the sprocket 2308 causes the sprocket 2308 to rotate the radial element 2304 in a first direction, which, in turn, pulls the cable 2216 in a first direction. Similarly, the second actuator 2220, when pushed into the housing 2204, causes a second engagement mechanism 2324 to engage the sprocket 2308. The force applied by the second engagement mechanism 2324 to the sprocket 2308 causes the sprocket 2308 to rotate the radial element 2304 in a second direction, which, in turn, pulls the cable 2216 in a second direction.

As noted above, the actuator guide 2212, in some embodiments, causes the actuators 2216, 2220 to travel a substantially linear path relative to the housing 2204 and the other components of the assembly 2200. Regardless of whether the actuators 2216, 2220 travel a linear or non-linear path, the sprocket 2308 and engagement mechanisms 2316, 2324 may be dimensioned such that the sprocket 2308 only rotates a predetermined amount if an actuator 2216, 2220 is fully pressed into the housing 2200. A biasing spring or multiple biasing springs (not shown) may also be secured to the interior of the housing 220 and may cause the actuators 2216, 2220 to return to their original resting position where the engagement mechanisms 2316, 2324 are not actually engaged with the sprocket 2308. The biasing spring(s) may connect with the actuators 2216, 2220 at or near the actuator guide 2212 or at connector arms 2312 that connect the part of the actuator 2216, 2220 that slides through the guide with the engagement mechanisms 2316, 2324.

The assembly 2200 may also comprise one or more grip connectors 2208 that enable the assembly 2200 to be mounted or secured to the handle of the bicycle. The grip connectors 2208 may utilize any type of screw or pressure fit device that allows the assembly 2200 to be removed and attached to the handles of the bicycle as desired.

With reference now to FIGS. 24A-D, yet another example of a gear centering device 2400 will be described in accordance with at least some embodiments of the present disclosure. FIGS. 24A-C depict the gear centering device 2400 in exploded views whereas FIG. 24D depicts the gear centering device 2400 fully assembled. The gear centering device 2400 depicted in FIGS. 24A-D may correspond to a mechanically-actuated device and, in some embodiments, may cooperate with or be operated by one or more pulleys connected to a shifter as shown and described in connection with FIGS. 20A-23B. In some embodiments, the gear centering device 2400 may be directly incorporated into a derailleur. Alternatively, the gear centering device 2400 may be manufactured separately and incorporated into an already-constructed derailleur.

In some embodiments, the gear centering device 2400 can be mounted on or near the gears of a bicycle. In the depicted embodiment, the gear centering device 2400 comprises a derailleur attach 2404, a female lead screw 2408, a main body 2412, a male lead screw and shaft assembly 2416, a plunger assembly 2420, and an actuator 2424. The actuator 2424 is shown as being a mechanical component comprising a housing 2476 that encloses a pulley attach 2472 and a plurality of gears 2436, 2452 (e.g., rotating actuating components). The housing 2476 may also enclose a rotary gear climb 2460 that comprises peak and valley features that enable the gear climb device to automatically index (e.g., ensure that the movement of the derailleur is incremental and made in appropriate steps). The pulley attach 2472 may receive the cable 4 that is controlled by a shifter on the bicycle's handles. In some embodiments, the cable 4 may correspond to an endless loop, in which case the housing 2476 may comprise two holes 2480 for receiving both portions of the loop. The cable 4 may be configured to wrap around the pulley attach 2472. As the cable 4 is actuated by the shifter, the pulley attach 2472 rotates clockwise and counterclockwise relative to the housing 2476.

As shown in FIG. 24C, the pulley attach 2472 may be connected to a key 2464 that interconnects to a corresponding feature on the rotary gear climb 2460. Thus, rotational motion of the pulley attach 2472 is translated to rotational motion of the rotary gear climb 2460. In some embodiments, the rotary gear climb 2460 also interfaces with the bearing fitted at the end of the plunger assembly 2420. When the rotational forces are sufficient to displace the plunger assembly 2420, the rotary gear climb 2460 rotates one or more positions until the rotational force is decreased and the plunger assembly 2420 forces the bearing back into a valley of the rotary gear climb 2460 (e.g., into a resting position).

The rotary gear climb 2460 may interface with additional gears 2452 (e.g., 40T gears) through a gear plate 2456. The gears 2452 directly interfacing with the rotary gear climb 2460 may further interface with more gears 2436 (e.g., 10T gears), which are included in the male lead screw and shaft assembly 2416. In some embodiments, the gears 2436 are fixedly connected to or integral with the male lead screw and shaft assembly 2416 such that rotation of the gear 2436 corresponds to rotation of the entire assembly 2416. In addition to comprising the gear 2436, the assembly 2416 may also comprise a washer 2440 (or similar type of mechanical separator), a gasket 2444, a shaft 2448, and a male screw 2468. The components of the assembly 2416 may be integrally formed from a single piece of material (e.g., plastic, metal, etc.) from a molding process or some components may be modular and combined to achieve the assembly 2416. For instance, the male screw 2468, shaft 2448, and gear 2436 may be formed of a single piece of material whereas the gasket 2444 and washer 2440 may be fit onto the assembly 2416 in a later manufacturing step.

The assembly 2416 may be configured to translate rotation of the rotary gear climb 2460 into lateral movement of the corresponding female lead screw 2408, which may correspond to a tube-like structure with female threading along the entirety of its interior. The threading of the female lead screw 2408 may mate with the threading of the male lead screw 2468 such that any rotation of the assembly 2416 causes the female lead screw 2408 to move inwardly or outwardly (e.g., laterally) with respect to the housing 2476. As can be appreciated, the threading (male and female) of components 2408 and 2416 may be reversed such that the assembly 2416 comprises the female threading components and the device that moves laterally comprises the male threading components. The illustrative device 2400 and the interconnection of its components should not be construed as limiting the scope of the present disclosure.

As can be seen in FIG. 24D, the housing 2476 can be fixedly or rigidly attached to the main body 2412 whereas the female lead screw 2408 is allowed to move laterally with respect to the housing 2476 and main body 2412. The derailleur attach 2404 may be wrapped around the outside of the female lead screw 2408 and fixed thereto (e.g., with screws, friction fitting, glue, welding, etc.) such that any lateral movement of the female lead screw 2408 causes the derailleur attach 2404 to move laterally relative to the housing 2476 and main body 2412. In other words, as the rotating components (e.g., actuator 2424, pulley attach 2472, rotary gear climb 2460, gears 2436, 2452, assembly 2416, etc.) contained within the housing 2476 and main body 2412 are rotated, the derailleur attach 2404 is moved laterally with respect to the housing 2476 and main body 2412.

In some embodiments, the main body 2412 and derailleur attach 2404 may each be provided with attachment points that enable actuation of a bicycle derailleur. More specifically, the derailleur attach 2404 may comprise a first attach point 2428 and the main body 2412 may comprise a second attach point 2432. As a non-limiting example, the first attach point 2428 may be connected to or otherwise attached with a derailleur component while the second attach point 2432 may be connected to or otherwise attached with a non-moving or fixed object of a bicycle (e.g., bicycle frame, attachment to bicycle frame, etc.). Thus, relative lateral movement between the attach points 2438 and 2432 may translate to movement of a derailleur, thereby causing the transmission system of the bicycle to switch gears by moving the chain from one gear in a cassette to another gear in the cassette. As can be appreciated, the amount of movement experienced between the attach points 2428 and 2432 may be controlled by the adjusting spacing of peaks and valleys on the rotary gear climb 2460, adjusting the dimensions of the threading 2468 and 2408, and/or adjusting gearing ratios between the various gears 2460, 2452, and/or 2436. In some embodiments, a single rotation of the rotary gear climb 2460 may be translated to enough lateral movement between the attach points 2428, 2432 to shift from one gear to an adjacent gear (e.g., either shifting up a gear or shifting down a gear).

FIG. 24D depicts an advantage of the present disclosure, namely the sealing of the moving parts of the gear centering device 2400. More specifically, the housing 2476 and main body 2412 are configured to be connected to one another to create an air-tight fit between the two components. These two components can be connected by any suitable mechanism such as screws, nuts and bolts, welding, gluing, or the like. All of the rotational components of the device 2400 are contained within the sealed structure of the housing 2476 and main body 2412. The washer 2440 and gasket 2444 provide further separation of the rotational components from outside debris. Specifically, the gasket 2444 may comprise an outer diameter that is equal to or possibly slightly larger than the inner diameter of the female lead screw 2408. The interface between the female lead screw 2408 and assembly 2416 may correspond to the only other point where debris could reach the actuator 2424. However, with an appropriate sizing of the gasket 2444 and washer 2440, debris may be substantially prohibited from reaching the actuator 2424 via the hole in the main body 2412 that receive the female lead screw 2408. Furthermore, the hole in the main body 2412 that receives the plunger assembly 2420 as well as the holes 2480 in the housing 2476 that receive the cable 4 may also be sealed with a gasket, plastic seal, or the like. Thus, the housing 2476 and main body 2412, once connected together, may sufficiently seal the actuator 2424 components from outside debris, thereby enabling the gear centering device 2400 to be used in mountain biking conditions and other dust-filled environments.

With reference now to FIGS. 25A-D, yet another example of a gear centering device 2500 will be described in accordance with at least some embodiments of the present disclosure. FIGS. 25A-C depict the gear centering device 2500 in exploded views whereas FIG. 25D depicts the gear centering device 2500 fully assembled. The gear centering device 2500 depicted in FIGS. 25A-D may correspond to an electrically-actuated device and, in some embodiments, may cooperate with or be operated by electronic shifters. In some embodiments, the gear centering device 2500 may be directly incorporated into a derailleur. Alternatively, the gear centering device 2500 may be manufactured separately and incorporated into an already-constructed derailleur.

In some embodiments, many components of the gear centering device 2500 are similar or identical to components of the gear centering device 2400. For instance, the gear centering device 2500 may be equipped with a derailleur attach 2504, female lead screw 2508, main body 2512, male lead screw and shaft assembly 2516, and plunger assembly 2520 that are similar or identical to the derailleur attach 2404, female lead screw 2408, main body 2412, male lead screw and shaft assembly 2416, and plunger assembly 2420, respectively.

Furthermore, components such as the attach points 2528, 2532, gear 2536, washer 2540, gasket 2544, shaft 2548, gear 2552, gear plate 2556, rotary gear climb 2560, key 2564, and male screw 2568 may be similar or identical to the attach points 2428, 2432, gear 2436, washer 2440, gasket 2444, shaft 2448, gear 2452, gear plate 2456, rotary gear climb 2460, key 2464, and male screw 2468, respectively.

The primary difference between device 2500 and device 2400 may correspond to the construction of the actuator 2524. Specifically, the actuator 2524 may comprise electromechanical components that electronically drive the rotation of the rotary gear climb 2560. In other words, the actuator 2524 may comprise an electronic motor 2572 (e.g., servo motor and power source) that communicate with an electronic shifter on the handlebars of the bicycle in a known fashion. When a command to shift gears is received at the electronic motor 2572 from the electronic shifter, the electronic motor 2572 rotates either clockwise or counterclockwise, thereby causing the rotary gear climb 2560 to rotate. The behavior of the device 2500 from the rotary gear climb 2560 to the attach points 2528, 2532 may be similar or identical to the behavior of the device 2400.

One particular advantage to using the electronic motor 2572 in combination with the rotary gear climb 2560 is that indexing is performed automatically with the plunger assembly 2520 and no electronic feedback is required for operation of the electronic motor 2572. This significantly reduces the amount of power required to operate the electronic motor 2572 and further simplifies the overall design of the device 2500 as compared to more complicated electronic derailleurs that are equipped with electronic feedback mechanisms that identify relative and absolute degrees of rotation. It should also be appreciated that any type of electromechanical components may be used for the electronic motor 2572. Specifically, while the examples described herein contemplate a servomotor in communication with an electronic shifter via some wireless (e.g., Bluetooth, Wi-Fi, etc.) or wired communication protocol, it should be appreciated that embodiments of the present disclosure are not limited to the illustrative examples provided herein.

FIGS. 26A-C depict, in further detail, an illustrative male lead screw and shaft assembly 2600 that can be used as either the assembly 2416 or assembly 2516. The detailed view of the assembly 2600 is provided to illustrate the components of the assembly 2600 that can be used to block unwanted debris from passing across the assembly 2600 into the sealed housing and main body of the devices 2400, 2500. Specifically, the detailed view of the assembly 2600 shows how the washer 2608 can be secured or fixed onto the shaft 2616 by a clip 2624. The gasket 2612 is also shown to comprise an outer diameter substantially equal to the outer diameter of the male screw 2620. Furthermore, the washer 2608 is shown to abut a larger diameter portion of the shaft 2616 and is substantially held adjacent thereto by the clip 2624. As discussed above, the gear 2604 can be integral to the shaft 2616 or it may be a separate piece part that is connected to the shaft 2616 using any type of known attachment technique.

With reference now to FIGS. 27A-F, details of another gear centering device 2700 will be described in accordance with embodiments of the present disclosure. The gear centering device 2700 may correspond to an electronically-driven device comprising an electromechanical motor 2732. The gear centering device 2700 is shown to include a linear gear climb (e.g., with peaks and valleys oriented linearly) rather than a rotational gear climb (e.g., with peaks and valleys oriented radially). In some embodiments, the gear centering device 2700 may be used in addition to or in lieu of any other gear centering device or "Gear Climb" described herein. Furthermore, the gear centering device 2700 may be directly incorporated into any type of derailleur. Alternatively, the gear centering device 2700 may be manufactured separately and incorporated into an already-constructed derailleur.

FIG. 27A shows the device 2700 in a first, extended, state, whereas FIG. 27B shows the device 2700 in a second, contracted, state. It should be appreciated that the motion of the device 2700 may be continuous or incremental between the first and second states and is not limited as resting in only the first and second state. The depicted states are provided to show the range of motion for the device 2700 and should not, in any way, be construed as limiting embodiments of the present disclosure.

In some embodiments, the device 2700 comprises a first section 2704 and second section 2708. The second section 2708 is configured to move laterally (e.g., into and out of) with respect to the first section 2704. In the depicted embodiments, the first section 2704 is sufficiently sealed and components contained therein are free of unwanted dirt and debris.

The first section 2704 may comprise a first attach point 2712 and the second section 2708 may comprise a second attach point 2716. As a non-limiting example, the attach points 2712, 2716 may operate similarly to interconnects 1612, 1616 and/or the attach points 2428, 2432 and/or the attach points 2528, 2532. In other words, the attach points 2712, 2716 may correspond to components of the device 2700 that are connected to a fixed structure of the bike on one hand and a movable derailleur component on the other hand. Thus, when relative motion between sections 2704 and 2708 is created, the derailleur of the bicycle can be actuated, thereby shifting gears.

As shown in FIGS. 27D and 27F, the first section 2704 may comprise a cavity 2752 sized to receive the second section 2708, thereby enabling the second section 2708 to move into and out of the first section 2704. Movement of the second section 2708 is facilitated by operation of a motor gear 2748 from operation of the motor 2732. As the motor 2732 rotates the motor gear 2748, the teeth of the motor gear 2748 interface with gear teeth 2728 on the second section 2708. Rotation of the motor gear 2748 causes the second section 2708 to move into or out of the cavity 2752. As the second section 2708 moves in this linear fashion, a plunger assembly 2724 is moved up and down due to valleys 2736 and peaks 2740 of the second section 2708 moving across a bearing 2744 of the plunger assembly 2724.

As discussed above, the plunger assembly 2724 may push the bearing toward the second section 2708 under a biased force (e.g., spring force). Thus, when the motor gear 2748 is done moving, the plunger assembly 2724 pushes the bearing 2744 down into a valley 2736. This results in a precise incremental movement of the second section 2708 relative to the first section 2704. In other words, because of the spacing of valleys 2736 and peaks 2740, the second section 2708 is only allowed to sit at certain incremental locations relative to the first section 2704. This results in the first attachment 2712 be moved incrementally relative to the second attachment 2716, which basically causes the derailleur to index itself. Since indexing can be achieved at the derailleur, there is no need for an indexing shifter to control the device 2700. Furthermore, since a mechanical mechanism is used to control the precise movement of the first section 2704 relative to the second section 2708, there is no need to equip the motor 2732 with electronic feedback mechanisms to check for rotation of the motor gear 2748.

With reference now to FIGS. 28-30B, details of a mechanical derailleur 2800 will be described in accordance with at least some embodiments of the present disclosure. The derailleur 2800 is shown to include a gear climb housing 2804, a biased pin 2808, a cable passage 2812, a pulley arm 2816, a main arm 2820, a derailleur mount 2824, a first pivot point 2828, a second pivot point 2832, a chain pulley 2836, and a number of set screws 2840, 2844, 2848. In the depicted embodiment, the mechanical derailleur 2800 is configured to operate under one or more cables passing from a controller (usually mounted on the bicycle's handlebar) through the cable passage 2812 and around a gear climb device contained within the gear climb housing 2804.

The derailleur mount 2824 provides a mechanism by which the derailleur 2800 is mounted to a bicycle frame or the like. In some embodiments, the derailleur mount 2824 may include a bolt, a nut, one or more washers, or any other mechanism that enables the derailleur to be removably attached to a bicycle frame.

The main arm 2820 of the derailleur 2800 connects to the derailleur mount 2824 and is further connected to the pulley arm 2816 via the first and second pivot points 2828, 2832. These pivot points may be constructed with a bolt and nut configuration as well as one or more washers, gaskets, and the like to ensure that the main arm 2820 is capable of pivoting relative to the pulley arm 2816, especially under forces induced by cable(s) attached to the gear climb, which may also be referred to as a gear centering device, within the gear climb housing 2804. Movement of the main arm 2820 relative to the pulley 2816 (e.g., via the pivot points 2828, 2832) cause the chain pulley 2836 to move linearly across a set of gears, thereby causing a chain to shift from one gear to another. Once the shifting forces exerted by the controller are no longer present, the gear climb contained within the gear climb housing 2804 will cause the chain pulley 2836 to settle at a point where it is substantially aligned with a single sprocket in the set of gears.

This settling is facilitated by the biased pin 2808 protruding through the gear climb housing 2804. In particular, the pin head 2920 of the biased pin 2808 is forced (under a spring force that now exceeds the force exerted by the controller, which is substantially zero) into a valley of the gear climb/gear centering device 3000 contained within the gear climb housing 2804. As shown in FIGS. 30A and 30B, the gear climb 3000 is configured as a disk-shaped component with a plurality of peaks and valleys 3028 extending around its circumference (e.g., as radially-disposed biasing features). The peaks and valleys 3028 are meant to interface with the pin head 2920 such that when forces are no longer exerted on the gear climb 3000 by the controller (in particular a cable connected to the controller), the pin head 2920 will settle into a valley of the peaks and valleys 3028, thereby causing the chain pulley 2836 to settle in substantial alignment with a sprocket on the set of gears.

As can be seen with simultaneous reference to FIGS. 29A, 29B, 30A, and 30B, the gear climb housing 2804 is substantially disk shaped with a housing face 2912 that is slightly larger in circumference than the gear climb 3000, thereby allowing the gear climb 3000 to be received in the inner wall 2916 of the housing face 2912. The gear climb 3000 is configured to rotate within the gear climb housing 2804 around the boss 2924, which interfaces with a main hole 3012 of the gear climb 3000. The peaks and valleys 3028 of the gear climb 3000 are positioned on the outer ring 3004 of the gear climb 3000, such that they can interface directly with the pin head 2920. The gear climb 3000 is also shown to include an inner ring 3008 on which a cable extending from the controller is allowed to circumnavigate. Specifically, a cable may enter the housing 2804 through the cable passage 2812 and interface with the gear climb 3000 at the cable pathway 3036. The cable may then wrap around an outer surface of the inner ring 3040 and continue back out the cable passage 2812 by interfacing with the opposite side of the cable pathway 3036.

The cable pathway 3036 is shown to be fitted with a notch 3032 or similar feature which guides the cable from the cable pathway 3036 to the outer surface of the inner ring 3040. The cable may also be pinned, stabled, glued, or otherwise further connected to the outer surface of the inner ring 3040 such that movement of the cable under forces exerted by a controller can be translated to rotational movement of the gear climb 3000. In some embodiments, the width of the cable passage 2812 can be approximately the same width of the peaks and valley 3028 along the outer surface of the outer ring 3044. In other words, the amount by which the cable is allowed to move within the cable passage 2812 may coincide with the amount of travel allowed for the peaks and valleys 3028. In some embodiments, the width of the peaks and valleys 3028 may be slightly larger than the width of the cable passage 2812, thereby ensuring that the biased pin 2808 does not move beyond the peaks and valleys 3028 due to over rotation of the gear climb 3000.

The gear climb 3000 is also shown to include a plurality of holes 3016, 3020, 3024 that interface with the set screws 2840, 2844, 2848. In some embodiments, the set screws may connect with the gear climb 3000 such that any rotation of the gear climb 3000 about the boss 2924 is translated to one or more of the set screws 2840, 2844, 2848. The set screws 2840, 2844, 2844 may, in turn, translate their rotation to movement of the derailleur, specifically movement of the pulley arm 2816 relative to the main arm 2820, thereby causing the derailleur to shift gears until the rotational forces exerted on the gear climb by the cable are no longer present. Once the cable no longer exerts forces on the gear climb 3000, the biased pin 2808 may exert a final rotation force on the gear climb 3000 until the pin head 2920 settles into a valley and the chain pulley 2836 is substantially aligned with a selected gear from the set of gears.

Although the mechanical derailleur 2800 is shown to include a disk-shaped gear climb 3000 with peaks and valleys 3028 on its outer surface of an outer ring 3044, it should be appreciated that the peaks and valleys 3028 may be provided on the outer surface of the inner ring 3040 and the cable may pass around the outer surface of the outer ring 3044. Furthermore, the gear climb 3000 does not necessarily need to be disk-shaped. For example, the gear climb 3000 may have an oblong or elliptical shape instead of a disk shape and the gear climb housing 2804 may be correspondingly structured. Further still, the notch 3032 may be configured as a knob, bulge, slot, or some other guide that enables a cable to be directed around the inner ring 3008 (or outer ring 3004, if appropriate).

With reference now to FIGS. 31A-33B, details of an electronic derailleur 3100 will be described in accordance with at least some embodiments of the present disclosure. The electronic derailleur 3100 may have similar components to the mechanical derailleur 2800, with some exceptions. Primary among the exceptions is the inclusion of a motor 3152 or similar device that is configured to convert electrical signals received via one or more electrical leads 3156 into mechanical movement. It should be appreciated that the electrical signals may alternatively be received wirelessly at the wireless receiver 3154 of the motor 3152 (e.g., via Bluetooth or a similar wireless communication protocol). Other than the actuator of the gear climb 3164 (e.g., the motor 3152), the structure of the gear climb 3164, and the structure of the gear climb housing 3104, most of the components of the electrical derailleur 3100 are similar or identical to the components of the mechanical derailleur 2800. For instance, the electrical derailleur 3100 is shown to include a biased pin 3108 similar to biased pin 2808, a main arm 3120 similar to main arm 2820, a pulley arm 3116 similar to pulley arm 2816, derailleur mount 3124 similar to derailleur mount 2824, pivot points 3128, 3832 similar to pivot points 2828, 2832, chain pulley 3136 similar to chain pulley 2836, and set screws 3140, 3144, 3148 similar to set screws 2840, 2844, 2848.

The gear climb housing 3104 is structured different from gear climb housing 2804 in that gear climb housing 3104 is completely enclosed/sealed (e.g., without a cable passage 2812 or other hole). This type of gear climb housing 3104 helps to keep dust, dirt, and other debris out of the gear climb housing 3104, thereby enabling the gear climb 3164 to work sufficiently well after prolonged periods of use.

The motor 3152 may correspond to a servo motor, stepper motor, brushless motor, worm gear motor, or any type of electromechanical device that is capable of converting electrical signals/commands into mechanical movement (e.g., linear and/or rotational movement). In the depicted embodiment, the motor 3152 comprises at least one motor gear 3160 that is driven by the motor 3152. The motor gear 3160 interfaces with the peaks and valleys 3168 of the gear climb 3164. Thus, rotational movement of the motor gear 3160 is translated to rotational movement of the gear climb 3164 due to the interface between the motor gear interface 3174 provided on the gear climb 3164. Similar to the mechanical derailleur 2800, when the motor 3152 is driving the motor gear 3160 in response to control signals received from a remote controller 3166 (e.g., mounted on the handlebars of the bicycle), the gear climb 3164 is moved in response to the motor gear 3160 (e.g., the motor gear 3160 overcomes forces exerted on the gear climb 3164 by the biased pin 3108). However, once the motor 3152 stops driving the motor gear 3160, the biased pin 3108 becomes the dominant force on the gear climb 3164 assuming the biased pin 3108 did not initially come to rest in a valley of the peaks and valleys 3168. Thus, the biased pin 3108 forces the gear climb 3164 to come to rest in a position of equilibrium where the chain pulley 3136 is substantially aligned with a gear from the set of gears on the bicycle.

In some embodiments, the motor 3152 may include a gearbox attached to the motor. The attached gearbox may comprise one or more gears positioned between the motor 3152 and the gear 3160 that engages the gear climb 3164. The gearbox can be used to increase torque applied to the gear climb 3164 and/or slow down the rotational speed of the gear 3160 that interfaces with the gear climb 3164. Utilization of a gearbox can also help to enforce fine-tuned movements.

Some advantages of using a gear climb 3164 in combination with a motor 3152 is that indexing is performed by the mechanical nature of the gear climb 3164, which means that the need for motor control electronics or other motor logic to determine precise motor and gear position is not necessary. Instead, the motor 3152 may simply be operational in response to an operational input (e.g., a user engaging a handlebar-mounted controller) and non-operational in the absence of an operational input. This enables a less complicated and less costly motor 3152 to be used. It should also be appreciated, however, that motors with control logic and more advanced feedback loops can also be used. For instance, a brushless motor can be used in combination with a speed controller 3158 and motor sensor 3162 (to sense motor position). The speed controller 3158 for a brushless motor may include an ASIC or some other preprogrammed or field programmable integrated circuit. The motor sensor 3162 may include an optical sensor, magnetic sensor, capacitive sensor, or any other sensor capable of detecting absolute motor position as well as relative motor movement. The brushless motor can be controlled with inputs from a handlebar-mounted controller such as the remote controller 3166 and the logic for controlling the brushless motor may be maintained at the derailleur 3100. Motor control logic can also be implemented for a stepper motor in a similar fashion to the brushless motor.

In the event that a worm gear motor is used, then the disk shaped gear 3160 may be replaced with a worm gear (e.g., a pin with male threading on its outer surface). Use of a worm gear instead of a disk shaped gear 3160 will change the orientation of the motor 3152 relative to the gear climb 3164 and will place the motor 3152 in line with the bicycle frame. This will result in the derailleur 3100 being more aerodynamic. A bevel gear can accomplish a similar result (e.g., a more aerodynamic derailleur 3100).

As can be seen in FIGS. 33A and 33B, the detailed view of the gear climb/gear centering device 3164 shows how the gear climb 3164 can include a plurality of holes 3308, 3312, 3316 for receiving the plurality of set screws 3140, 3144, 3148. The gear climb 3164 may also include a main hole 3304 that wraps around a boss 3172 in the center of the gear climb housing 3104. The main hole 3304 may comprise a diameter that is slightly larger (e.g., no more than a few millimeters larger) than the diameter of the boss 3172. This enables the gear climb 3164 to rotate around the boss 3172 within the gear climb housing 3104. The motor gear 3160 is configured to interface with the motor gear interface 3174, which in some embodiments may completely circumnavigate the gear climb 3164 (although such a configuration is not required). In some embodiments, the motor gear interface 3174 comprises teeth that substantially mate with the teeth of the motor gear 3160. The motor gear interface 3174 is shown to be provided on an inner ring 3320 of the gear climb 3164 whereas the peaks and valleys 3168 may be provided on the outer ring 3324 of the gear climb 3164. It should be appreciated, however, that the inner ring 3320 may comprise the peaks and valleys 3168 that interface with the biased pin 3108 whereas the outer ring 3324 may comprise the motor gear interface 3174.

Similar to the gear climb 3000 of the mechanical derailleur 2800, the gear climb 3164 may translate its rotational movement to one or more of the set screws 3140, 3144, 3148, which, in turn, causes the main arm 3120 to move relative to the pulley arm 3116. Movement of the main arm 3120 relative to the pulley arm 3116 may cause the chain pulley 3136 to move laterally with respect to a set of gears, thereby causing the bicycle to change gears. Once the motor 3152 stops driving rotational movement of the gear climb 3164, the biased pin 3108 may settle into a selected one of the valleys in the peaks and valleys 3168, thereby causing the chain pulley 3136 to settle in substantial alignment with a selected gear in the set of gears.

FIG. 34 shows an illustrative derailleur 3400 mounted on a bicycle frame 3408. As discussed in connection with derailleurs 2800, 3100 (each of which could be examples of derailleur 3400), the derailleur is connected to the bicycle frame 3408 via a derailleur mount 3412. The actuation of the gear climb within the derailleur causes the chain pulley to move relative to the various gears in the sprocket set 3404. Once shifting commands have stopped from the controller, the gear climb in the derailleur 3400 causes the chain pulley to settle in substantial alignment with a selected gear in the sprocket set 3404.

It should be appreciated that derailleur (whether mechanical or electronic) may have its plurality of peaks and valleys extend in a direction that is substantially parallel with an axis of rotation of the gear centering device. In such an embodiment, the plurality of peaks and valleys may correspond to ribs disposed on at portion or all of a circumference of the outer surface of the gear climb. Furthermore, with respect to the electronic derailleur, an advantage provided by use of the gear climb is that the motor 3152 does not need to include shifting logic because the mechanical components (e.g., peaks and valleys along with biased pin) facilitate derailleur indexing. This is contrasted to electronic derailleurs of the prior art that require a motor with shifting logic and a shifting feedback look to make sure the derailleur is not moved more than a particular distance when gears are shifted. The advantage of having indexing occur mechanically at the derailleur is that the need for such motor logic is no longer necessary.

With reference now to FIGS. 35-43, various examples of controllers that may be used to actuate the derailleurs described herein will be described in accordance with at least some embodiments of the present disclosure.

A first illustrative controller 3500 and components thereof is shown in FIGS. 35-37C. The controller 3500 is shown to include a housing 3504, a first lever 3508, a second lever 3512, a sheath 3516, and a cable 3520 that enters the housing 3504. As shown in FIGS. 36A and 36B, the cable 3520 enters the housing 3504 via a housing opening 3612. The cable 3520 then wraps around a disk 3704 contained within the housing 3504. The disk 3704 may be rotated by actuation of the first lever 3508 and/or second lever 3512. In particular, each lever may interface with the disk 3704 though a combination of a pin 3604 and post 3608. The post 3608, when moved by the pin 3604, may translate a rotational movement to an arm 3720 extending from the post 3608. In some embodiments, the arm 3720 is coupled to the post 3608 via a spring 3724 or the like. As the arm 3720 rotates about the post 3608, a ratchet 3712 pushes against gears 3708 contained within an interior of the disk 3704. Movement of the disk 3704 is then translated to movement of the cable 3520. The pulling motion of the cable 3520 is then communicated to the derailleur to shift gears or otherwise cause the pulley arm to move relative to the main arm of the derailleur. When the pressure exerted on the lever 3508, 3512 is relieved (e.g., by releasing of a rider's finger or thumb from the lever) the tension exerted on the cable 3520 is released and the biased pin is allowed to be the sole force-exerting member on the gear climb device in the derailleur.

As can be seen in FIGS. 37A-37C, the cable 3520 wraps around the disk 3704 through a cable guide 3728. When a user causes the disk 3704 to rotate in one direction or the other via actuation of the levers 3508, 3512, the rotational force of the disk 3704 is translated to a pulling motion of the cable 3520. Once the user releases their finger from the levers 3508, 3512, the ratchet 3712 no longer pushes the disk 3704 and is released from engagement with the gears 3708 under force of the spring 3724 pushing the arm 3720 back. Although the arm 3720 is shown to interface with the ratchet 3712 via a screw 3716, it should be appreciated that a pin, bolt, or any other mechanical coupling can be used to couple the arm 3720 to the ratchet 3712. Alternatively, the ratchet 3712 may be integrally formed with the arm 3720.

The use of a rotatable member 3700 being configured as a two-sided disk 3704 is also a configuration that can be replaced with various other mechanical equivalents. While the two-sided disk 3704 supports the ability to have one lever 3508 rotate the rotatable member 3700 in one direction and the other lever 3512 rotate the rotatable member 3700 in the opposite direction, other configurations can also be utilized. For instance, as shown in FIG. 43, a push-push configuration can be used whereby a rotatable member 4312 is rotated in one direction or another (e.g., r1 or r2) by two different push buttons or levers 4304, 4308. A first push button or lever 4304 may, in response to a pushing force P1, cause the rotatable member 4312 to rotate in the first rotational direction r1, whereas a second push button or lever 4308 may, in response to a pushing force P2, cause the rotatable member 4312 to rotate in a second rotational direction r2 that opposes the first rotational direction r1. This push-push configuration can be facilitated by using a coupling 4316 between the rotatable member 4312 and one of the push buttons or levers. The coupling 4316 helps to reverse the direction of rotational force applied to the rotatable member 4312.

With reference now to FIGS. 38A-42C, an alternative configuration of a controller will be described in accordance with at least some embodiments of the present disclosure. The controller is shown as being mounted to a handle bar 3800 of a bicycle, similar to the way that other controllers described herein can be mounted to the handlebar 3800. The controller is mounted inward from the handlebar grip 3804 with a mount 3816 or the like. The controller is shown to include a housing 3808 and one or more levers 3820 fixedly connected to a rotatable member 3824 contained within the housing 3808. Although the controller is shown as having two levers 3820, it should be appreciated that a controller may have a greater or lesser number of levers 3820 without departing from the scope of the present disclosure.

The housing 3804 may include a sheath 3904 or housing opening 4212 though which a cable is allowed to enter/exit the housing 3804 and wrap around the rotatable member 3824. In some embodiments, the cable may wrap around the rotatable member 3824 via a cable guide 3912, which may be configured as a notch or trough within the disk-shaped rotatable member 3824. The outer diameter of the rotatable member 3824 may be only slightly smaller (e.g., between 1 and 10 millimeters) than the inner diameter of the wall forming the housing 3808.

In particular, and with reference to FIG. 39B, the rotatable member 3824 is shown as being capable of fitting tightly within the housing 3808. A screw or similar type of mechanical coupling may be used to connect the rotatable member 3824 with the housing 3808. Furthermore, the rotatable member 3824 may rotate about the screw 3908 in a substantially un-restricted motion (in the absence of the cable) within the housing 3808. In some embodiments, the rotatable member may be configured with one or more recesses 4104 that substantially interface with a guide member 4208 in the housing 3808. The interface between the guide member 4208 and recess 4104 may help to fix the rotatable member 3824 within the center of the housing 3808. The guide member 4208 may also allow the rotatable member 3824 to maintain a fixed rotational point within the receptacle 4204 of the housing 3808. The guide member 4208 may also be provided with female threading to accommodate male threading of the screw 3908, thereby enabling the rotatable member 3824 to be secured within the receptacle 4204 of the housing 3808.

With reference now to FIGS. 44A-C, yet another example of a controller 4400 will be described in accordance with at least some embodiments of the present disclosure. The controller 4400 shown may correspond to controller components that can be incorporated into any controller housing described herein. As a non-limiting example, the controller 4400 could be incorporated into the housing depicted in FIG. 35, the housing depicted in FIG. 40, or any other housing depicted or described herein.

In some embodiments, the controller 4400 includes a first rotatable member 4404 in the form of a disk attached to a second rotatable member 4408, which is also shown to be in the form of a disk. The first rotatable member 4404 may be secured or otherwise attached to the second rotatable member 4408 via welding, gluing, fastening, or any other attachment mechanism. In some embodiments, both members 4404, 4408 may be integrally formed from a single piece of material.

The members 4404, 4408 may both be configured to rotate about a common central axis of rotation 4412. In some embodiments, a pin or the like may be used to effect the connection between the members 4404, 4408 at this common central axis of rotation 4412. In some embodiments, the first rotatable member 4404 may provide an interface with the cable or control line 4428 that extends to the derailleur of the bicycle transmission system. As discussed hereinabove, the first rotatable member 4404 may have the cable 4428 wrapped around almost an entirety of its circumference. The cable 4428 may form a loop around the first rotatable member 4404. The result of such a configuration is that when the first rotatable member 4404 is rotated in a first direction (e.g., counter-clockwise), one end of the loop of the cable 4428 may be tensioned whereas the other end of the loop of the cable 4428 may be slacked, thereby resulting in a movement of the cable 4428 at the derailleur, which shifts the gear of the derailleur. Conversely, when the first rotatable member 4404 is rotated in a second direction opposite the first direction (e.g., clockwise), the cable 4428 may be tensioned in the other direction, causing the derailleur to shift in the opposite direction. Because the derailleur is equipped with a self-indexing mechanism, the controller 4400 does not need to have an indexer. Rather, the first rotatable member 4404 can simply be moved between various rotational positions in an analog (e.g., non-indexed or non-digital) manner.

The cable 4428 may be attached to or interface with the first rotatable member 4404 in any number of ways. As one non-limiting example, the cable 4428 could be under a sufficient amount of tension such that rotation of the first rotatable member 4404 translates to motion of the cable 4428. Another example would be to use two cables 4428 (instead of a single looped cable). Still another example would be to use one or multiple cables 4428 and fasten the cable(s) 4428 to the perimeter of the first rotatable member 4404 with a screw or the like. Still another method would be to utilize appropriately-sized blocks on the end of the cables 4428 and attach each block to the first rotatable member 4404 in some fashion.

Rotation of the first rotatable member 4404 may be imparted by movement of the second rotatable member 4408, which has external rotational forces applied thereto by one of a number levers 4416, 4420, 4424. The embodiment of FIGS. 44A-C shows a controller 4400 with a first lever 4416, a second lever 4420, and a third lever 4424. The first and second levers 4416, 4420 may be designed for actuation by a user's thumb whereas the third lever 4424 may be designed for actuation by a user's finger. This configuration could, of course, be reversed depending upon how the controller 4400 is mounted to the handlebars of the bicycle and/or the orientation of the rotatable members 4404, 4408.

In some embodiments, each lever 4416, 4420, 4424 may be mechanically coupled to a paddle 4440 that interfaces with gears 4432 on the second rotatable member 4408. The mechanical coupling may be achieved with arms 4436 or similar mechanical linkages. In the depicted embodiment, each lever 4416, 4420, 4424 has its own arm 4436 and corresponding paddle 4440 coupled thereto. The connection between the arm 4436 and paddle 4440 may be similar or identical to the ratchet and gear assembly depicted and described in connection with FIGS. 37A-C. Other mechanical linkages may also be utilized. In some embodiments, the paddles 4440 are spring biased against the arm 4436 (or a component connected thereto) such that the paddle 4440 may engage the gears 4432 when pushed and impart a rotational force onto the second rotatable member 4408. Once the lever 4416, 4420, 4424 is released, the paddle 4440 may no longer impart the rotational force on the gears 4432 and may travel back freely to its initial resting point (e.g., where the lever is in a non-depressed state).

In some embodiments, when a user engages the first lever 4416 (e.g., presses the first lever 4416 into a housing of the controller 4400), the paddle 4440 connected thereto may cause the rotatable members 4404, 4408 to rotate in a first direction (e.g., clockwise). Engagement of the second lever 4420 or third lever 4424 may cause the rotatable members 4404, 4408 to rotate in a second direction that opposes the first direction (e.g., counter-clockwise). When any of the levers are released, they may return (e.g., via spring biasing) to an original resting position. As the levers move back to this original resting position, the paddles 4440 may freely traverse across the gears 4432 until the two components are no longer in contact with one another.

With reference now to FIGS. 45A-C, another example of a controller 4500 will be described in accordance with at least some embodiments of the present disclosure. The controller 4500 may be similar or identical to controller 4400 except that controller 4500 is shown to include two oppositely-mounted levers 4516, 4520 as compared to the three levers included in controller 4400.

Like controller 4400, the controller 4500 may include a first rotatable member 4504 and second rotatable member 4508 coupled to one another. The second rotatable member 4508 may include gears 4528 or other features that provide an interface with paddles 4536 of the levers 4516, 4520. The levers 4516, 4520 may further include a mechanical coupling, such as an arm 4532, between a button or user engagement portion of the lever 4516, 4520 and the paddles 4536. Also like controller 4400, the controller 4500 may include a cable 4524 looped (partially or completely) around the first rotatable member 4504, thereby providing a mechanical coupling between the controller 4500 and a derailleur.

The levers 4516, 4520 are configured such that the first lever 4516 may be configured for engagement by a user's thumb when mounted on a handlebar whereas the second lever 4520 may be configured for engagement by a user's finger when mounted on the handlebar. Each lever 4516, 4520 may cause the rotatable members 4504, 4508 to rotate in opposite directions. Thus, a user may shift the derailleur to a higher gear by engaging one lever (e.g., the first lever 4516) and shift the derailleur to a lower gear by engaging the other lever (e.g., the second lever 4520).

FIGS. 46A-C depict yet another example of a controller 4600 in accordance with at least some embodiments of the present disclosure. The controller 4600 is similar to controllers 4400 and 4500 except that controller 4600 presents both levers 4616, 4620 to a common side (instead of having three levers or oppositely-mounted levers).

Like controllers 4400, 4500, the controller 4600 may include a first rotatable member 4604 and second rotatable member 4608 coupled to one another. The second rotatable member 4608 may include gears 4636 or other features that provide an interface with paddles 4632 of the levers 4616, 4620. The levers 4616, 4620 may further include a mechanical coupling, such as an arm 4628, between a button or user engagement portion of the lever 4616, 4620 and the paddles 4632. Also like controllers 4400, 4500, the controller 4600 may include a cable 4624 looped (partially or completely) around the first rotatable member 4604, thereby providing a mechanical coupling between the controller 4600 and a derailleur.

The levers 4616, 4620 are designed such that both levers are configured for engagement by a user's thumb (or a user's finger) when mounted on a handlebar. The levers 4616, 4620 may cause the rotatable members 4604, 4608 to rotate in opposite directions. Thus, a user may shift the derailleur to a higher gear by engaging one lever (e.g., the first lever 4616) and shift the derailleur to a lower gear by engaging the other lever (e.g., the second lever 4620).

Any of the embodiments of a derailleur described herein may be used in combination with any other type of bicycle feature. Certain features, however, may particularly benefit from the use of a derailleur or Gear Climb as disclosed herein. One example of such a bicycle transmission feature that may benefit from the functionality of the concepts described herein is a "Floating Front Ring", which is described in U.S. patent application Ser. No. 13/544,669, filed Jul. 9, 2012, the entire contents of which are hereby incorporated herein by reference. The Floating Front Ring, in some embodiments, provides the ability to have a sprocket or set of sprockets (e.g., front sprocket) that can freely slide horizontally in and out (e.g., substantially perpendicular to the rotational path of the sprocket) to substantially align the chain with the chosen sprocket on the rear cassette.

As one non-limiting example, a bicycle transmission system may be provided with a Floating Front Ring as well as one or more derailleurs having a Gear Climb as disclosed. More specifically, a bicycle transmission system may comprise at least a back derailleur that is capable of self-indexing. As the derailleur is shifted from one gear to another, the Floating Front Ring may slide horizontally to accommodate the newly selected gear.

Another illustrative bicycle transmission system may comprise a Floating Front Ring and one or both of the cables travelling to the rear derailleur (which may or may not have a Gear Climb device incorporated therein) may be used to help facilitate the lateral movement of the Floating Front Ring. Specifically, a cable guide may be provided that is also attached to the front sprocket or set of sprockets. As the rear derailleur is shifted from one gear to another, the lateral motion of the cable(s) may apply a force to the cable guide which is translated to the front sprocket or set of sprockets. Because the sprocket or set of sprockets is capable of floating and moving laterally in response to such a force from the cable guide, the sprocket or set of sprockets may be moved into alignment with selected rear gear. In some embodiments, if two cables travel to the rear derailleur, then one or both of those cables may be used to assist the manipulation/movement of the Floating Front Ring.

Another illustrative bicycle transmission system may utilize a front derailleur (with or without a Gear Climb device) to manipulate the Floating Front Ring. Alternatively, or in addition, a return spring can be used to facilitate the manipulation of the Floating Front Ring. Examples of derailleurs that may be used in combination with the Floating Front Ring are described in U.S. Pat. Nos. 7,341,532; 7,442,136; 7,527,571; 7,651,424; 7,666,111; 7,712,566; and 8,057,332, each of which are hereby incorporated herein by reference in their entireties.

While various portions of the present disclosure generally refer to "rear" derailleur systems or transmission systems for cassettes disposed on a rear wheel of a vehicle, it will be expressly recognized that various features as shown and described herein may be employed on various system, including "front" derailleur systems. For example, it is known that bicycles frequently include a plurality of cogs or chain rings in direct communication with a pair of crank arms to which pedals are attached, in addition to rear cogs connected to a hub of a rear wheel. Various features of transmission systems of the present disclosure may be provided to transmit a drive means from such a plurality of "front" chain rings. Known "front" derailleur systems typically comprise not more than three chain rings, making the transmission device for shifting a drive means between the front chain rings significantly less complex than "rear" systems which frequently comprise ten or more cogs. Nevertheless, features as shown and described herein are provided for simply and efficient transmission between front cogs with various improvements over the prior art.

While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims. Further, the disclosure(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A bicycle transmission system, comprising: a series of parallel drive sprockets fixedly attached to a bicycle wheel and driven by a drive member;
an electronic derailleur, comprising:
a mount for securing the electronic derailleur to a bicycle frame proximate the drive sprockets;
a housing containing a gear climb, the gear climb having a plurality of tapered features defining a plurality of positions characterized by the drive member being aligned with one of the drive sockets;
a biased member configured to bias the gear climb toward one of the plurality of positions;
an electric motor in force-transmitting communication with the gear climb, the electric motor configured to move the gear climb so that at least one of the plurality of tapered features displaces the biased member; and
a motor gear operably connected to the electric motor, the motor gear comprising an outer surface that engages the plurality of tapered features of the gear climb.

2. The bicycle transmission system of claim 1, further comprising a remote control for controlling the electric motor, wherein the remote control transmits signals to the electric motor via a wired connection.

3. The bicycle transmission system of claim 1, further comprising a remote control for controlling the electric motor, wherein the remote control transmits signals to the electric motor wirelessly.

4. The bicycle transmission system of claim 1, further comprising a gearbox that transmits force from the motor to the motor gear.

5. The bicycle transmission system of claim 1, wherein the motor gear is a disk-shaped gear.

6. The bicycle transmission system of claim 1, wherein the electric motor is a worm gear motor and the motor gear is a worm gear.

7. The bicycle transmission system of claim 1, wherein the housing is completely sealed.

8. The bicycle transmission system of claim 1, further comprising a speed controller and a motor sensor.

9. The bicycle transmission system of claim 8, wherein the motor sensor is at least one of an optical sensor, a magnetic sensor, and a capacitive sensor.

10. The bicycle transmission system of claim 1, wherein the remote control is mounted on a bicycle handlebar.

11. The bicycle transmission system of claim 1, wherein the electric motor is one of a servo motor, a stepper motor, a brushless motor and a worm gear motor.

12. An electronic derailleur, comprising:
a sealed housing containing a gear climb in force transmitting communication with a drive member, the gear climb movable among a plurality of positions, each of the plurality of positions aligning the drive member with one of a plurality of drive sprockets;
a series of alternating peaks and valleys on an outer surface of the gear climb, the peaks defining a maximum radius of the gear climb and the valleys describing a minimum radius of the gear climb, each valley corresponding to one of the plurality of positions;
an electric motor configured to rotate a motor gear in force transmitting communication with the gear climb, rotation of the motor gear causing the gear climb to move from one of the plurality of positions toward another of the plurality of positions; and
a biased member in contact with the outer surface of the gear climb, the biased member configured to bias the gear climb toward one of the plurality of positions when the gear climb is not in one of the plurality of positions.

13. The electronic derailleur of claim 12, further comprising:
a remote control in electronic communication with the electric motor.

14. The electronic derailleur of claim 12, further comprising a speed controller, and wherein the electric motor is a brushless motor.

15. The electronic derailleur of claim 12, further comprising a motor sensor.

16. The electronic derailleur of claim 12, further comprising a gear box attached to the motor, the gear box operably engaged with the motor gear.

17. A derailleur comprising:
a gear climb contained within a sealed housing and in force-transmitting communication with a drive member, the gear climb adjustable among a plurality of tapered features defining a plurality of positions to align the drive member with one of a plurality of drive sprockets;
an electric motor configured to selectively move the gear climb from one of the plurality of positions to another of the plurality of positions in response to signals received from a remote control;
a motor sensor configured to detect an absolute rotational position of the electric motor and relative rotational movement of the electric motor;
an integrated circuit operably connected to the motor sensor, the integrated circuit comprising logic for determining a location of the gear climb relative to at least one of the plurality of positions based on at least one of the absolute rotational position of the electric motor and the relative rotational movement of the electric motor; and
a motor gear operably connected to the electric motor, the motor gear comprising an outer surface that engages the plurality of tapered features of the gear climb.

18. The derailleur of claim 17, further comprising a speed controller, and wherein the electric motor is a brushless motor.

19. The derailleur of claim 17, wherein the motor sensor is one of an optical sensor, a magnetic sensor, and a capacitive sensor.

* * * * *